United States Patent [19]
Takita et al.

[11] Patent Number: 5,684,505
[45] Date of Patent: Nov. 4, 1997

[54] DISPLAY DEVICE INTEGRATED WITH AN INPUT DEVICE

[75] Inventors: Isao Takita, Fujisawa; Tsutomu Furuhashi, Yokohama; Hiroyuki Mano, Chigasaki; Shigeyuki Nishitani, Yokohama; Masaaki Kitajima, Hitachioota; Satoru Tsunekawa, Higashimurayama; Toshio Futami, Mobara; Tatsuzo Hamada, Hadano, all of Japan

[73] Assignee: Hitachi, Ltd., Tokyo, Japan

[21] Appl. No.: 492,520

[22] Filed: Jun. 20, 1995

[30] Foreign Application Priority Data

Jun. 21, 1994 [JP] Japan .................................. 6-138498
Aug. 18, 1994 [JP] Japan .................................. 6-193991

[51] Int. Cl.⁶ .................................. G09G 3/20
[52] U.S. Cl. .................................. 345/104; 345/179
[58] Field of Search .................................. 345/104, 174, 345/179; 178/18-20; 349/12

[56] References Cited

U.S. PATENT DOCUMENTS

| | | | |
|---|---|---|---|
| 5,418,551 | 5/1995 | Ise | 345/174 |
| 5,528,267 | 6/1996 | Ise | 345/174 |
| 5,534,892 | 7/1996 | Tagawa | 345/174 |

FOREIGN PATENT DOCUMENTS 2-255911 10/1990 Japan .
3-294919 12/1991 Japan .

*Primary Examiner*—Jeffery Brier
*Attorney, Agent, or Firm*—Antonelli, Terry, Stout & Kraus, LLP.

[57] ABSTRACT

A display device integrated with an input device comprises a display panel having picture elements being scanned line-at-a-time, a detector for detecting a voltage pulse applied on one of the picture elements through electrostatic coupling, a first circuit for applying a voltage pulse of a type differing with a plurality of regions into which the display panel are divided, on electrodes associated with the picture element in one of the plurality of regions during the non-display period, a second circuit for determining a region of the picture element by the type of the voltage pulse detected by the detector, a fourth circuit for determining a relative X coordinate in the determined region by counting clock pulses synchronized with sequential application of a voltage on electrodes until the fourth circuit receives the voltage pulse detected by the detector during the non-display period, and a fifth circuit for determining an absolute X-coordinate by the determined region and the relative X-coordinate.

35 Claims, 60 Drawing Sheets

DISPLAY DEVICE INTEGRATED WITH AN INPUT DEVICE

BACKGROUND OF THE INVENTION

This invention is related to a display device integrated with an input device having a display element integrated with a tablet (digitizer) used to enter coordinate data. Especially, it is related to a display device integrated with an input device that can determine coordinates within a short period without complicating its structure so much.

A conventional technology related to a tablet-integrated display device used to determine coordinates by detecting driving voltage pulses for a display device, without a coordinate determination tablet separate from the displace device, was disclosed in Japanese patent Laid-Open No. 255911/1990 "a tablet integrated with a display device" and Japanese Patent Laid-Open No. 294919/1991 "a display device having a tablet function".

The outline of the conventional technology will be explained below using FIGS. 10 and 36.

FIG. 10 shows the block diagram of the configuration of a prior art tablet integrated with a display device described in Japanese Patent Laid-Open No. 255911/1990.

FIG. 36 shows the timing chart indicating the operation of the tablet integrated with a display device described in Japanese Patent Laid-Open No. 255911/1990.

At first, the configuration of the conventional tablet integrated with a display device will be explained briefly using FIG. 10.

A thin film EL panel 2201 is provided with Y-electrodes y0, y1, ... yn−1 and X-electrodes x0, x1, ... xm−1. Each X electrode is connected with an X-electrode driver circuit 2203, and each Y-electrode is connected with a Y-electrode driver circuit 2202.

Positions on the panel can be specified by touching them with a pencil-like conductor (hereafter, to be referred to as "a pen") 2205 used to determine coordinates.

Next, the display operation and coordinate determination of the conventional tablet integrated with a display device will be explained using FIGS. 10 and 36.

As shown in FIG. 36, one frame period necessary to display one entire screen is divided into the Y-coordinate detection mode period which is the same as the display period and the X-coordinate detection mode period. Thus, it would be appropriate to explain first the display control of the conventional technology.

The Y-coordinate driver circuit 2202 is connected to Y-electrodes y0, y1, y2, ..., and yn−1. As shown in FIG. 36, the select voltage VyON (H) or VyON (L) is applied to Y-electrodes y0, y1, y2, ..., and yn−1 electrode by electrode sequentially. The X-electrode driver circuit 2203 is connected to the X-coordinates x0, x1, x2, ..., and xm−1. Synchronously with the 10 scanning operation of the Y-electrode driver circuit, the X-electrode driver circuit 2203 supplies voltage to X-coordinates x0, x1, ..., and xm−1, corresponding to display data. This operation controls a display corresponding to a line in a frame.

Next, the Y-coordinate determination in the Y-coordinate detection mode period, that is, a display period, by the conventional technology will be explained.

Y coordinates are determined by detecting the voltage pulses applied to the Y-electrodes y0, y1, y2, and yn−1 using the pen 2205. Since the select voltage VyON is applied to those Y-electrodes y0, y1, y2, ..., and yn−1 electrode by electrode sequentially, when the select voltage is applied to an electrode just under the pen, a voltage pulse detected through electrostatic coupling between the pen 2205 and the electrode among Y-electrodes y0, y1, y2, ..., and yn−1 for coordinate determination is supplied to the Y-coordinate detection circuit 2207 through an amplifier 2206.

If a device such as a counter is provided in this Y-coordinate detection circuit 2207 to count clock pulses in synchronism with sequential application of the select voltage VyON on the Y-electrodes y0, y1, y2, ..., and yn−1, the Y coordinate pointed to by the pen 2205 is determined by storing the number of the counted clock pulses temporarily upon receipt of a voltage pulse from the pen 2205 through the amplifier 2206.

Next, the X coordinate determination in the X coordinate detection mode period in the conventional technology will be explained.

X coordinates pointed to by the pen 2205 can be determined by detecting the voltage pulses applied to X-electrodes x0, x1, x2, ... and xm−1.

The X-electrode driver circuit 2203, which has been generating voltages corresponding to display data during the display and Y-coordinate detection mode period, is operated to shift a voltage from one X-electrode to the next X-electrode just like the Y-electrode drive circuit 2202.

The X-electrode driver circuit 2203 applies the select voltage VxON to X-electrodes x0, x1, x2, ..., and xm−1 sequentially. And just like in the Y-electrode determination, the voltage pulse for coordinate determination is entered to the X-coordinate detection circuit 2208 through the amplifier circuit 2206 through electrostatic coupling detected between the pen 2205 and one of the X-electrodes x0, x1, x2, ..., and xm−1 on which the select voltage VxON is applied.

If a device such as a counter is provided in this X-coordinate detection circuit 2208 to count clock pulses in synchronism with sequential application of the select voltage VyON on the X-electrodes x0, x1, x2, ..., and xm−1, the X coordinate pointed by the pen 2205 is determined by storing the number of the counted clock pulses temporarily upon receipt of a voltage pulse from the pen 2205 through the amplifier 2206.

SUMMARY OF THE INVENTION

The said conventional technology intended to allow display of data and entry of positional data to be made concurrently by dividing one frame into the display/Y-coordinate detection period and the X-coordinate detection period and changing the operations in each of those periods.

This X-coordinate detection mode period can be considered as follows; for example, if X coordinates are to be determined on a matrix of 640 dots (horizontal direction)× 480 dots (vertical direction), which is the standard resolution of personal computers with a frame frequency of 70 Hz, the X-electrode drive circuit 2203 must shift a voltage 640 times within this X-coordinate detection mode period to apply the select voltage VxON to the X-electrodes x0, x1, x2, ..., and xm−1 sequentially.

In an ordinary display operation, the X-coordinate detection mode period is a period called a vertical retrace period, and about 5% of one frame period is assigned to that period. In case of a matrix of 640 dots×480 lines, which is the standard resolution of personal computers with a frame frequency of 70 Hz, the X-coordinate detection mode period becomes about 700 μs, and a period for one of X electrodes x0, x1, x2, ..., and xm-1 to be selected becomes about 1 μs. It is difficult to apply the select voltage to each of the X electrodes x0, x1, x2, ..., and xm-1 sequentially within about 1 μs as long as conventional electrode drive circuits are used.

To charge an X electrode up to a voltage enough to be detected within this period, a high performance X-electrode drive circuit is needed, and a tablet integrated with a display device that will realize such high performance becomes very expensive. Those have been problems in the conventional technology.

Furthermore, in the conventional technology, for a voltage induced on the pen to synchronize only with a pulse applied to an electrode pointed to by the pen, the influence of electrostatic coupling with adjacent electrodes must be eliminated. For this purpose, therefore, the tip of the pen must be as sharp as possible. Concretely, the diameter of the tip of the pen must be made smaller than one picture element to minimize the influence of the adjacent drive lines. For example, the tip of the pen must be about 0.33 mm or under in diameter if it is used for a TFT liquid crystal panel having a diagonal of 10 inches and a resolution of 640 dots (horizontal direction) and 480 lines (vertical direction). And, plastic is often used as the material for the tip of the pen so that the pen may not damage the surface of the liquid crystal panel. To sharpen the plastic tip of such a pen, the number of processes must be increased, as well as the accuracy of processing must be more improved. And, this increases the production cost of the pen. Those have been other problems in the conventional technology. In addition, for the said conventional display device, if the tip of the pen is worn and becomes thick, the specified waveform may not be obtained at the positions pointed to by the pen. This problem has not be taken into account in the said conventional display device.

This invention has been made to solve the said problems of the conventional technology. The purpose of this invention is therefore to provide a display device integrated with an input device, which can determine coordinates quickly by shortening the X coordinate detection mode period by dividing one frame into the Y-coordinate detection mode and the X-coordinate detection mode. According to this invention, the circuitry configuration of the said liquid crystal display device integrated with an input device is not complicated so much to materialize the said purpose.

To achieve the purpose of this invention, a display device integrated with an input device comprises:

a display panel having M×N picture elements arranged in a matrix of M rows×N columns, said M×N picture elements being scanned line-at-a-time at a period comprising a display period and a non-display period, a detector for detecting a voltage pulse applied on one of said M×N picture elements through electrostatic coupling by being pointed to said one of said M×N picture elements, a first circuit for applying a voltage pulse of a type differing with a plurality of regions into which said matrix of M rows×N columns are divided column-wise, on electrodes associated with corresponding ones of said N columns in one of said plurality of regions during said non-display period, a second circuit for determining a region in which said one of said M×N picture elements pointed to by said detector lies, by said type of said voltage pulse detected by said detector, a third circuit for determining a relative Y coordinate in said determined region by counting clock pulses synchronized with sequential application of a voltage on electrodes associated with said M rows until said third circuit receives said voltage pulse detected by said detector during said display period, a fourth circuit for determining a relative X coordinate in said determined region by counting clock pulses synchronized with sequential application of a voltage on electrodes associated with said N columns until said fourth circuit receives said voltage pulse detected by said detector during said non-display period, and a fifth circuit for determining an absolute X-coordinate and an absolute Y-coordinate by said determined region, said relative X-coordinate and said relative Y-coordinate.

An other purpose of this invention is to supply a display device integrated with an input device that can determine the positions pointed to by the pen accurately even when the tip of the pen is thick.

To achieve the said other purpose of this invention, a display device integrated with an input device comprises a display panel having Y electrodes and X electrodes arranged in a matrix; a common electrode driver circuit (hereafter, to be referred to as a common circuit) for scanning the Y electrodes sequentially; a column electrode driver circuit (hereafter, to be referred to as a column circuit) for applying a voltage on X electrodes; a detector for detecting voltage changes on each of the X and Y electrodes through electrostatic coupling with the electrodes; an X-coordinate detection circuit for converting detected X coordinate signals from the detector to digital ones and having an integrator; a Y-coordinate detection for converting detected Y coordinate signals from the detector to digital ones and having an integrator; a coordinate detection control circuit for detecting X and Y coordinates synchronously with the signals from the X-coordinate detection circuit and the Y-coordinate detection circuit; and a display controller for displaying data and determining coordinates by controlling the common and column circuits.

DETAILED DESCRIPTION OF PREFERRED EMBODIMENTS

In one of the embodiments of this invention, the type of the coordinate detection pulse in the X coordinate detection mode is changed in each display region. This is why both the X coordinate detection mode period and the coordinate detection period can be shortened without making the circuitry complicated so much. Furthermore, coordinates in a particular display region and the particular display region can be determined concurrently, so that it can be avoided that the calculation time for those processings becomes an overhead time.

Furthermore, screen flickering can be reduced by reversing the polarity of coordinate detection voltage pulses corresponding to a display region for each frame in another embodiment of this invention.

Furthermore, in another embodiment of this invention, noise and detection errors can be reduced when coordinates are detected by providing a coil in the pen, generating high frequency pulses as coordinate detection waveforms, and passing the waveforms through a filter that eliminates low frequencies.

Furthermore, in another embodiment of this invention, the influence of trigger noise, which is the side effects of DC/AC conversion of signals can be reduced by using a control signal for AC driving whose polarity is changed for each line when the pen is pulled back from the panel, and by using a control signal for AC driving whose polarity is changed for each frame when the pen touches the panel.

Furthermore, in another embodiment of this invention, the phase shift of a coordinate detection waveform caused by electrostatic coupling among an electrode pointed to by the pen and its adjacent electrodes can be prevented with an integrator provided in the coordinate detector circuit, so that coordinates can be determined accurately even when a tip of the pen, which is a coordinate pointer, is thick. Furthermore, in another embodiment of this invention, the accuracy of detecting signals from the pen can be improved significantly against external noise with an amplifier, an X coordinate detection circuit, and a Y coordinate detection circuit provided in the pen casing.

Hereafter, each embodiment of this invention will be explained using FIGS. 1 through 60.

Embodiment 1

A first embodiment of this invention will be explained below using FIGS. 1, 11, 13, 14, 24 to 27 and 37.

(I) Overall system configuration and individual circuit configuration

In this (I), the overall display unit configuration and individual circuit configuration will be explained for understanding this invention.

Figure 1:
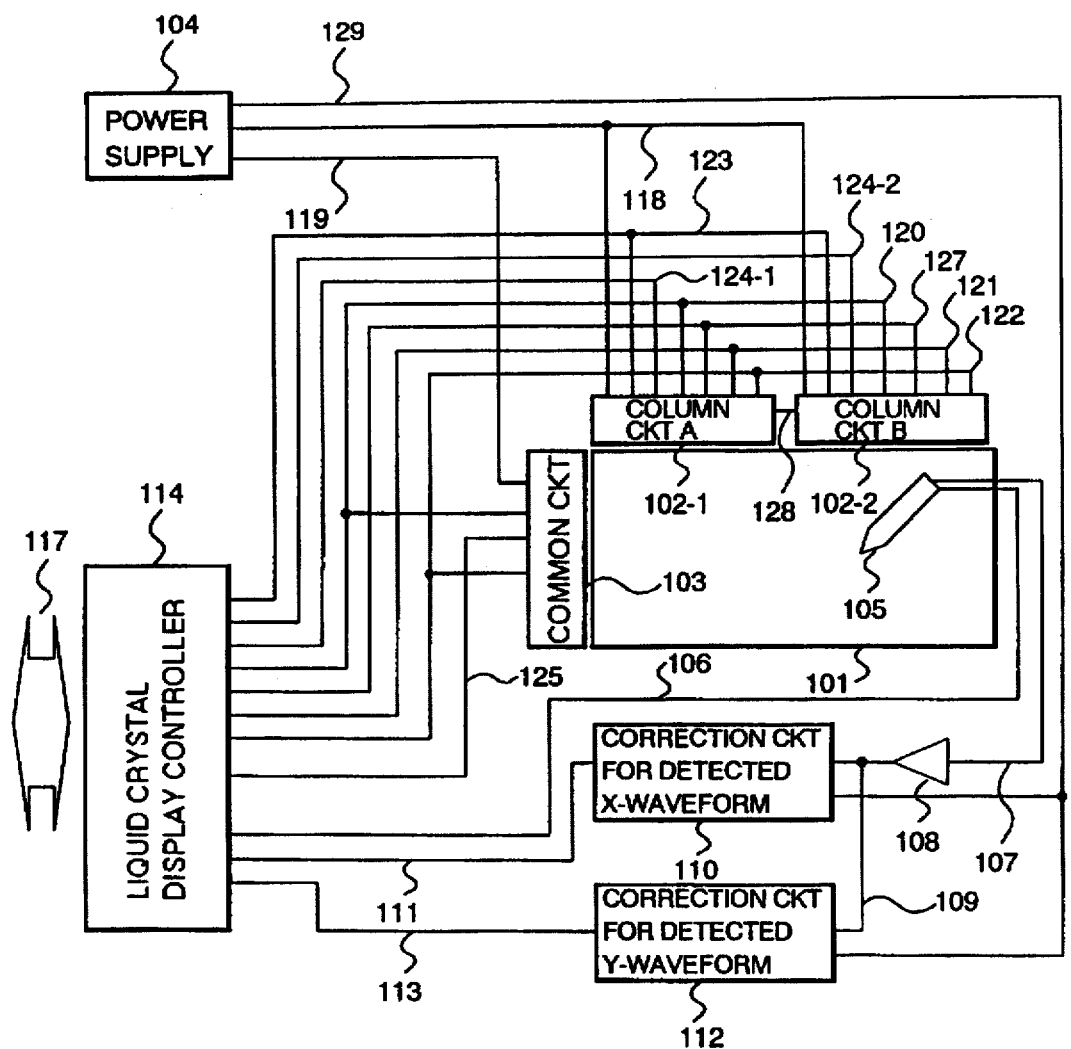
FIG. 1 shows a block diagram of a configuration of a liquid crystal display device integrated with an input device of a first embodiment of this invention.

At first, FIG. 1 is used to explain the overall configuration of the liquid crystal display device integrated with an input device of the first embodiment of this invention.

FIG. 1 shows the block diagram of the liquid crystal display device integrated with an input device of first embodiment of this invention.

The liquid crystal panel 101 has a plurality of electrodes arranged orthogonally with each another on a pair of glass or plastic substrates and liquid crystal filled between those substrates to form a matrix of 160 dots×80 lines.

The column electrode driver circuits (hereafter, to be referred to as column circuits) 102-1 and 102-2 supply voltage to the X electrodes in one direction of the liquid crystal panel 101. The common electrode driver circuit 103 (hereafter, to be referred to as a common circuit) supplies voltage to the Y electrodes in the other direction of the liquid crystal panel 101. The power supply circuit 104 supplies voltage to the column circuit 102 and the common circuit 103.

The pencil-like coordinate pointer 105, which uses electrostatic coupling, works as a detector to determine the positions touched by the tip of the pen.

The detection signal 106 is used to detect whether or not the tip of the pen 105 touches the liquid crystal panel. The coordinate detection signal 107 indicates the change of potential of the pen tip.

This invention premises that the device comprises digital circuits. Thus, the lines and signals between devices are designated as the same. This applies to the subsequent description in this specification. The buffer circuit 108 amplifies this coordinate detection signal 107.

The liquid crystal display controller 114 converts and transfers control signals to the column circuit 102 and the common circuit 103. The controller 114 also has functions to process coordinate detection data.

The system bus 117 transmits display/control signals and coordinate detection data.

The gray scale voltage bus 118 is supplied with four levels of gray scale voltages, V1on and V1off of positive polarity and V2on and V2off of negative polarity, generated in the power supply 104.

The scan voltage bus 119 is supplied with four levels of voltages, a scan voltage V1 and a non-scan voltage V2 of positive polarity, a scan voltage V3 and a non-scan voltage V4 of negative polarity, generated in the power supply 104.

The control signal for AC driving 120 converts signals into alternating voltages. Its "high" indicates negative polarity and "low" indicates positive polarity.

The latch clock 122 is a latch clock signal having a period corresponding to one horizontal scanning period.

The display control signal 123 is used to direct display and coordinate detection. The shift data signal 124 is used to change the width of pulses for X coordinate detection according to the subject region. The first line marker signal 125 is used to notify the timing of scanning the first scan line (hereafter, to be referred to as "FLM").

The display data bus 127 is used to transfer display data in synchronism with the shift clock 121.

The enable signal 128 is output from the column circuit 102-1 to the column circuit 102-2. It is used to enable I/O of display data. The reference voltage 129 is used to distinguish detected voltage from noise in the correction circuits for detected X and Y waveforms.

Next, the configuration of the column circuit of the liquid crystal display device integrated with an input device in this embodiment will be explained using FIG. 11.

Figure 11:
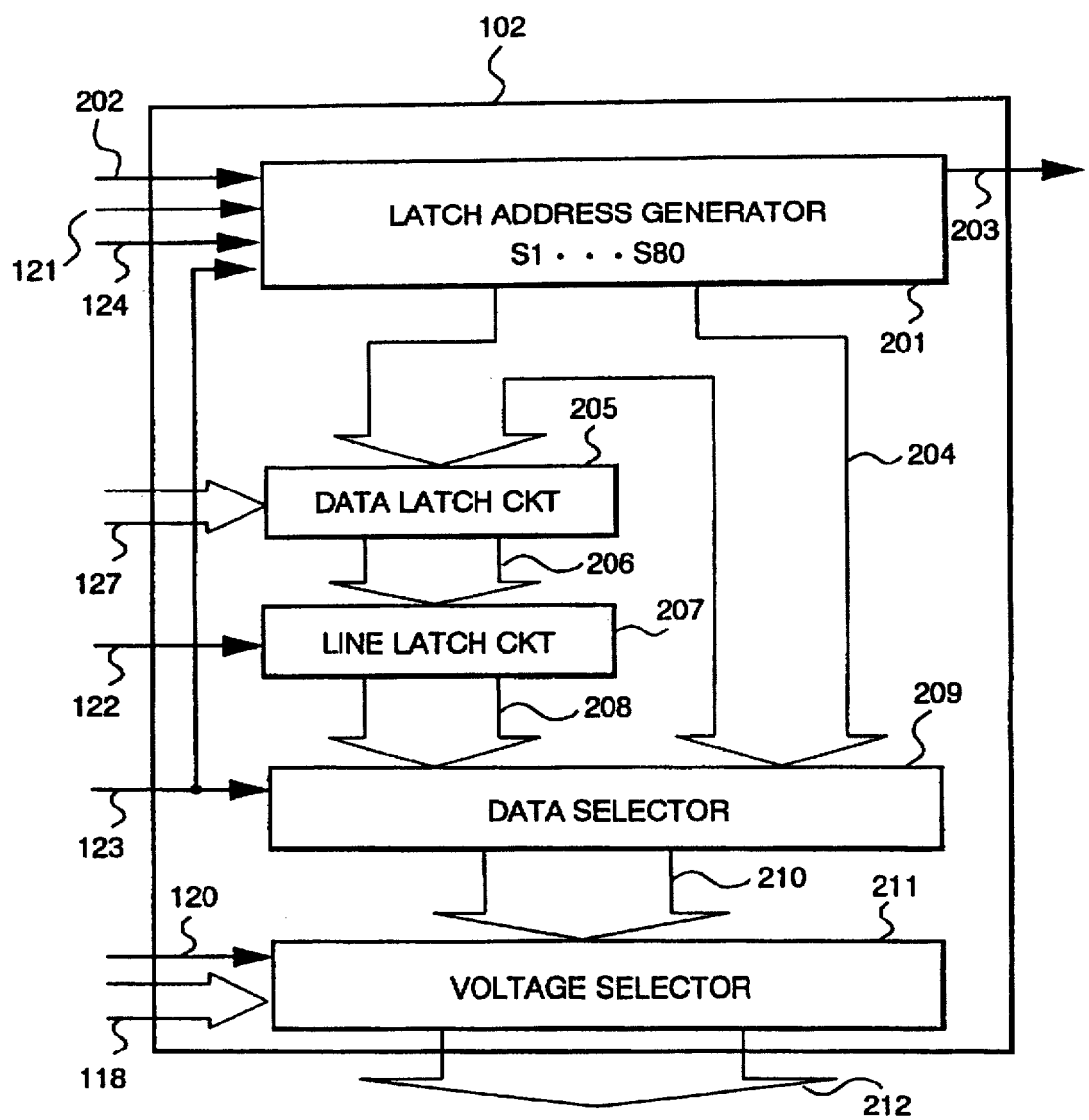
FIG. 11 shows a block diagram of a configuration of a column circuit related to the first embodiment of this invention.

FIG. 11 shows the block diagram of the column circuit configuration in the first embodiment of this invention.

The latch address generator 201, synchronized with the shift clock 121, drives the 80 outputs S1 to S80 into "high" sequentially. The enable signal 202 is used to enable display data from the previous stage. It is identical to the enable signal 128 in FIG. 1. The enable signal 203 is used to enable display data to the succeeding stage.

The latch address signal bus 204 transmits latch addresses output from the latch address generator 201.

The data latch circuit 205 and the line latch circuit 207 comprises 80 latches respectively.

The data latch circuit 205 receives display data transferred through the display data bus 127. Data from the latch address signal bus 204 is entered to each latch. The data latch circuit 205 latches display data from the said 80 latches sequentially according to the latch address signal from the latch address signal bus 204. Latched display data is output to the output bus 206 until the next data is latched. Data from the output bus 206 is stored in the line latch circuit 207 and output to the output bus 208 synchronously with the latch clock 122.

The voltage selector 211 selects the output voltage corresponding to data in accordance with the gray scale voltage supplied from the gray scale voltage bus 118 and the control signal for AC driving 120.

The output bus 212 is an output bus of the voltage selector 211 and connected so that voltages can be applied to each X electrode of the liquid crystal panel shown in FIG. 1.

The details of this column circuit operation will be explained later using FIG. 26.

Next, the X-coordinate detection circuit will be explained using FIG. 13.

Figure 13:
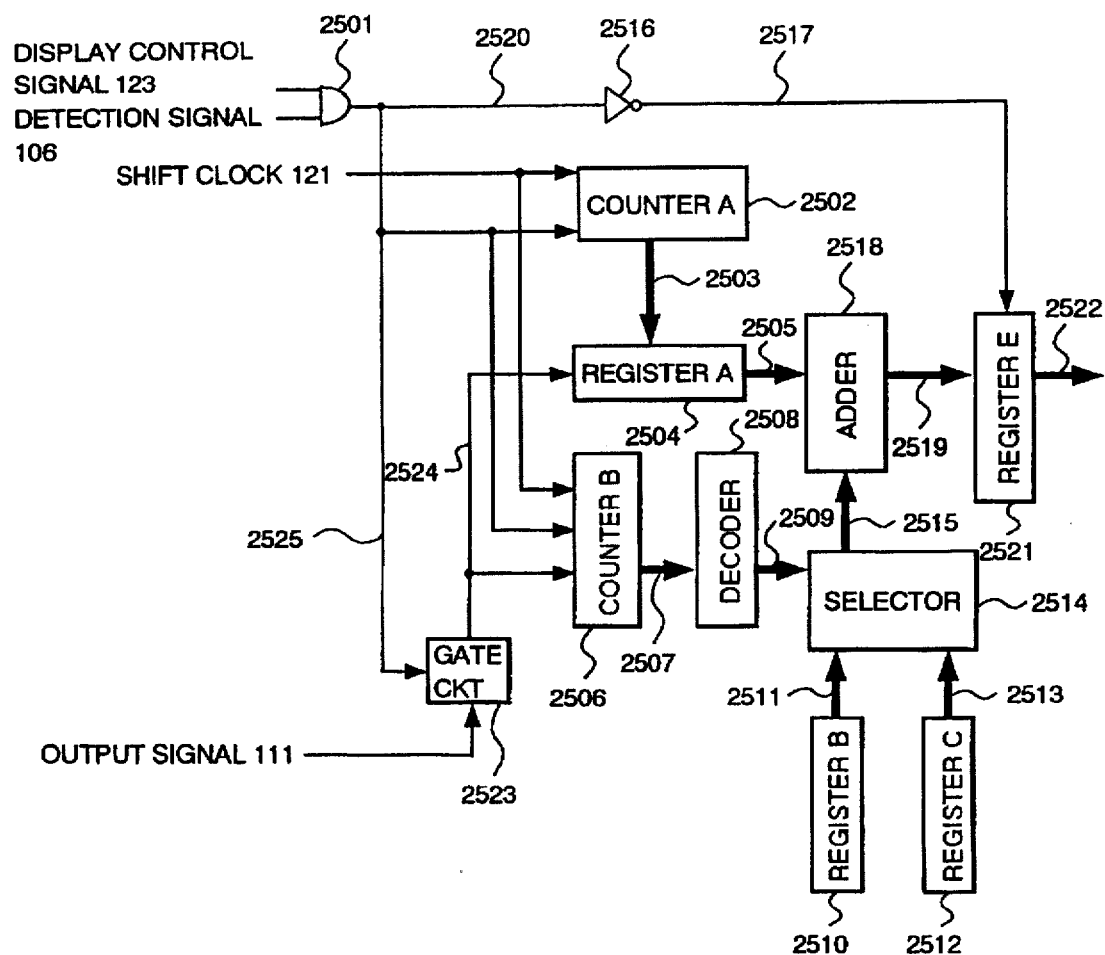
FIG. 13 shows a block diagram of a configuration of an X-coordinate detection circuit of the liquid crystal display device integrated with an input device related to the first embodiment of this invention.

FIG. 13 shows the block diagram of the configuration of the X-coordinate detection circuit used for the liquid crystal display device integrated with an input device of the first embodiment of this invention. In this embodiment, this X-coordinate detection circuit is assumed to be incorporated in the liquid crystal display controller 114.

The output from the AND circuit 2501 becomes "high" when the display control signal 123 is "high" and the detection signal 106 is "high".

The inverter circuit 2516 inverts and outputs this output signal 2520. The output signal 2517 is output from this inverter circuit 2516.

The counter A 2502 counts up the shift clocks 121 when the display control signal 123 becomes "high".

The gate circuit 2523 outputs the signal 111 as the output signal 2524 when the output signal 2525 becomes "high".

The register A 2504, synchronized with the positive edge of the output signal 2524, stores data from the output bus 2503.

The counter B 2506 counts up the shift clocks 121 while the output signal 2524 is "high". The count data of this counter B 2506 is transferred to the output bus 2507.

The decoder 2508 drives one of the outputs b0 of the output bus 2509 into "low" when the data from the output bus 2507 is "1". When the data from the output bus 2507 is "2", the decoder 2508 drives another output b1 of the output bus 2509 into "low".

The register B 2510 stores "0". The register C 2512 stores "80". This "80" indicates the number of picture elements in a region when X electrodes is divided into a plurality of groups. The meaning of "80" will be explained later.

The selector 2514 outputs data from the output bus 2511 when the output b0 of the output bus 2509 is "low". The selector 2514 outputs data from the output bus 2513 when the output b1 of the output bus 2509 is "low". The output bus 2515 is an output bus of the selector 2514. The adder 2518 adds data transferred to the output buses 2505 and 2515, then outputs the result.

The register E 2521, synchronized with the positive edge of the output signal 2517, stores data from the output bus 2519.

Next, the configuration of the Y-coordinate detection circuit will be explained using FIG. 14.

Figure 14:
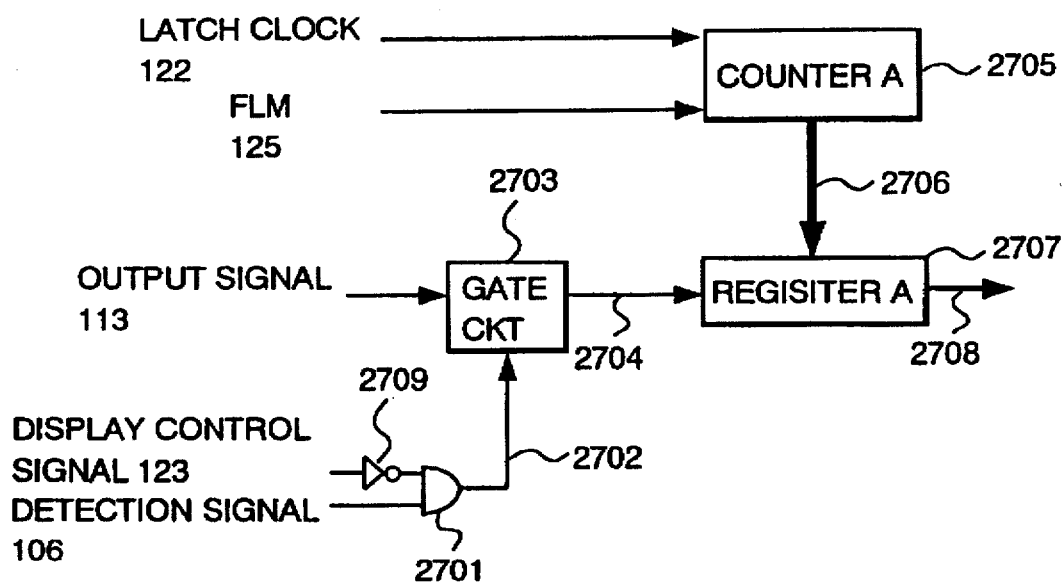
FIG. 14 shows a block diagram of a configuration of a Y-coordinate detection circuit of the liquid crystal display device integrated with an input device related to the first embodiment of this invention.

FIG. 14 shows the block diagram of the configuration of the Y-coordinate detection circuit used for the liquid crystal display device integrated with an input device of the first embodiment of this invention. This Y-coordinate detection circuit is also assumed to be incorporated in the liquid crystal display controller 114.

The output from the AND circuit 2701 becomes "high" when the display control signal 123 and the detection signal 106 are "high". The output signal 2702 is output from the AND circuit 2701. The gate circuit 2703 is opened to output the output signal 2702 as the signal 2704 when the output signal 2702 is "high".

The register A 2707 stores data from the output bus 2706.

(II) The operation of the liquid crystal display device integrated with an input device of this embodiment (1) Display operation At first, the display operation of the liquid crystal display device integrated with an input device of this embodiment will be explained using FIGS. 1, 11, 25, and 26.

Figure 25:
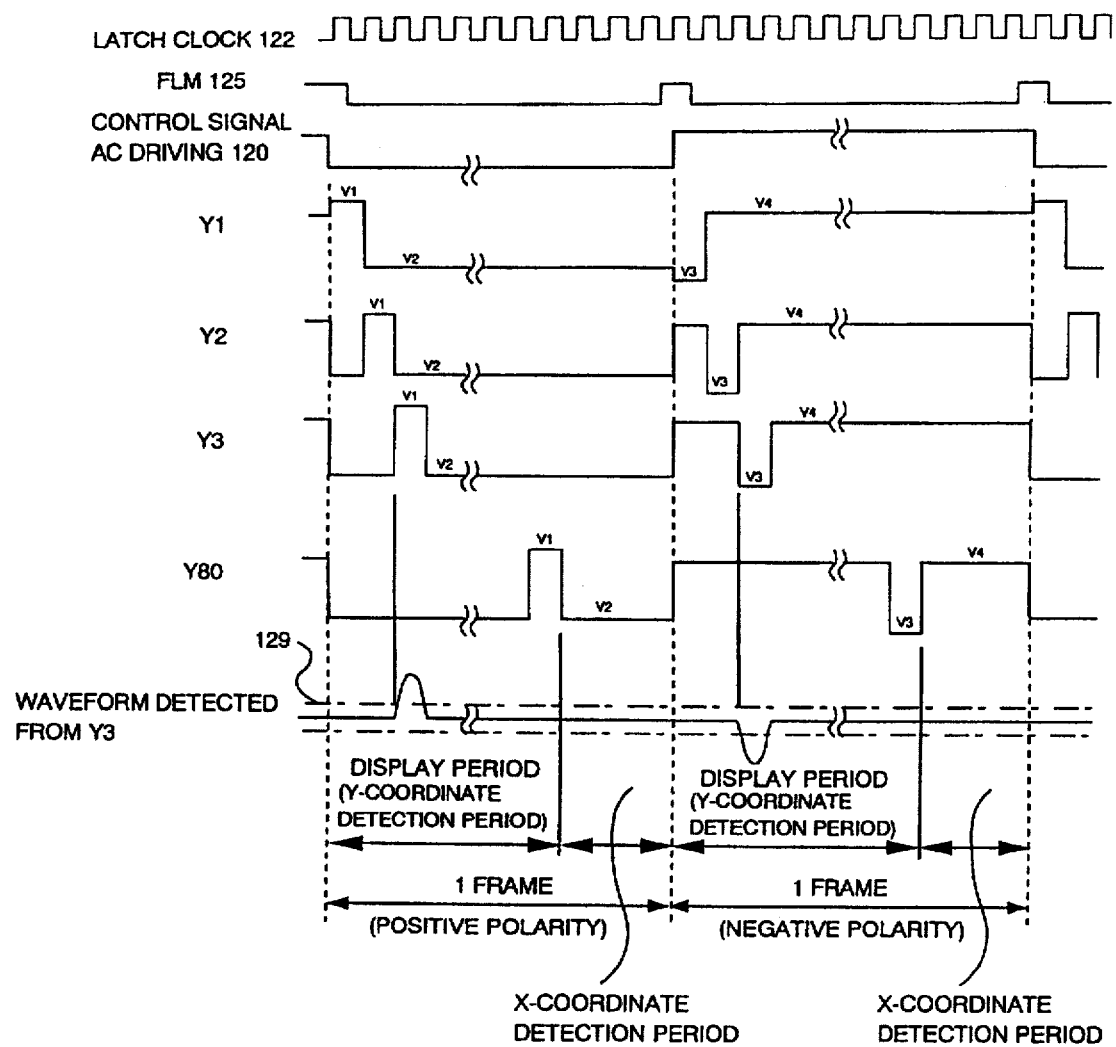
FIG. 25 shows a timing chart of an operation of the liquid crystal display device integrated with an input device related to the first embodiment of this invention, for explaining a relationship between a frame period and display and coordinate detection periods in detail.

FIG. 25 shows the timing chart indicating the operation of the liquid crystal display device integrated with an input device of the first embodiment of this invention. It illustrates the relationship among a coordinate detection period, a display period, and a frame period in detail.

Figure 26:
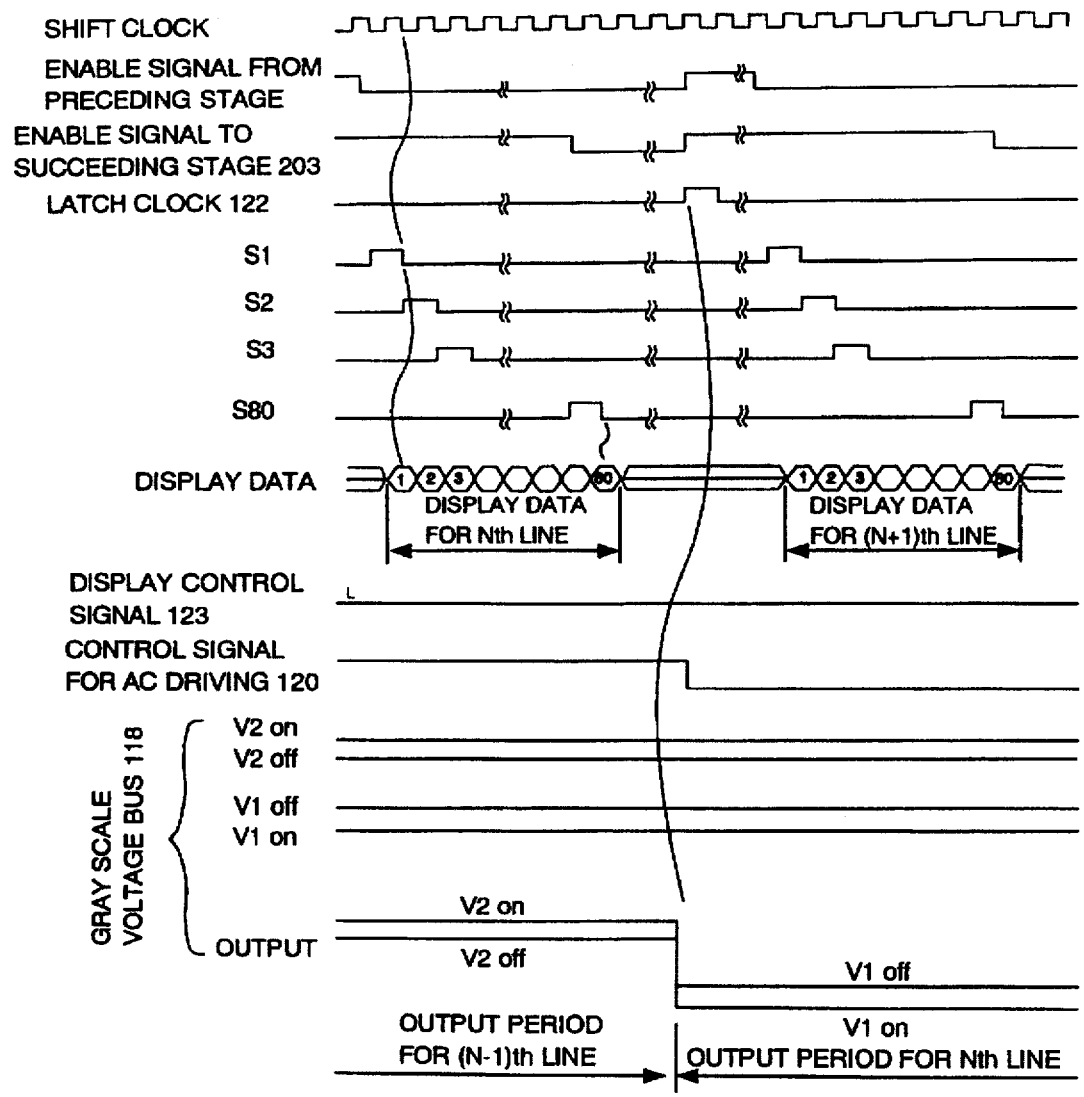
FIG. 26 shows a timing chart of a column circuit operation during a display period in the first embodiment of this invention.

FIG. 26 shows the timing chart of the column circuit operation during a display period in the first embodiment of this invention.

In the liquid crystal panel 101 of FIG. 1, the scan voltage generated in the common circuit 103 and the gray scale voltage generated in the column circuit 102 are supplied to each of liquid crystal picture elements to display data in black, white, or an intermediate gray scale according to the effective value determined with the applied voltage and the applying time.

In this section, 2 levels of gray scale (white and black) will be used to simplify the explanation.

As shown in FIG. 25, the common circuit 103, synchronized with the latch clock 122 after the FLM 125 for indicating a start of a frame period becomes "high", selects the Y electrodes from Y1 to Y80 of the liquid crystal panel 101 sequentially to apply the scan voltage to each of them, while common circuit 103 applies the non-scan voltage to non-selected electrodes. Scan voltage is V1 and non-scan voltage is V2 when the control signal for AC driving 120 is "low" and scan voltage is V3 and non-scan voltage is V4 when the control signal for AC driving 120 is "high".

The X electrodes opposing the Y electrodes selected by this common circuit 103 and supplied with a scan voltage are supplied with a voltage corresponding to the display data from the column circuit 102. When specified voltage are applied to both X and Y electrodes, the picture element of the display is turned ON.

Next, the display operation of the column circuit 102 will be explained using FIGS. 11 and 26.

As shown in FIG. 26, the latch address generator 201, synchronized with the shift clock 121 when the display control signal 123 is "low", drives the outputs S1 to S80 from the latch address signal bus 204 into "high" sequentially when the enable signal 202 from the preceding stage becomes "low".

As explained using FIG. 11, each latch of the data latch circuit 205 corresponding to the data from this latch address signal bus 204 stores display data from the display data bus 127 synchronously with the latch address signal bus 204.

After S80 is driven into "high", the latch address generator 201 changes the status of the enable signal 203 to the succeeding stage from "high" to "low". With this operation, 80-piece display data is stored in the data latch circuit 205. The stored data is then transferred to the line latch circuit 207 through the output bus 206.

The operation of this column circuit is sequential. When scan voltage is applied to the Yn−1 electrode, the display data on the n-th line, that is, the next Yn electrode is stored in the data latch circuit 205.

After this, when the latch clock 122 becomes "high", the line latch circuit 207 latches the data from the output bus 206 at the same time, then outputs it to the output bus 208. Unlike the operation of the data latch circuit 205 mentioned above, this latching operation latches 80 pieces of data concurrently.

The display data transferred to this output bus 208 is entered to the data selector 209. It is then output to the output bus 210 when the display control signal 123 becomes "low" during a display period.

The display data transferred to the output bus 210 is entered to the voltage selector 211, then a voltage is selected and output from the gray scale voltage bus 118 according to the display data entered for the n-th line and the control signal for AC driving 120, and is output from the voltage selector 211.

The voltage V2on or V2off corresponds to the display data when the AC driving signal 120 is "high". For example, if it is assumed that V2on represents "white" and V2off represents "black", V2on is selected and output to display "white" and V2off is selected and output to display "black".

On the contrary, when the control signal for AC driving 120 is "low", the voltage V1on of V1off corresponding to display data is selected and output. In this case, V1on is selected and output to display "white" and V1off is selected and output to display "black". To convert output voltages into alternating voltages, 4 types of voltages are output. With the operations of the common circuit 103 and the column circuit 102, the scan voltage becomes V1 when the control signal for AC driving 120 is "low", that is, positive polarity. Thus, a positive voltage of V1−V1on or V1−V1off is applied to each of the picture elements on the selected Y electrodes.

On the contrary, when the control signal for AC driving 120 is "high", that is, negative polarity, the scan voltage becomes V3. Thus, a negative voltage of V2on−V3 or V2off−V3 is applied to each of picture elements on the selected Y electrodes.

In this way, the liquid crystal display device integrated with an input device displays images when a voltage is applied to each picture element in the liquid crystal panel. The degradation of liquid crystal is prevented by changing the polarity of the applied voltage periodically according to the control signal for AC driving 120. The technology to convert this output voltage into an alternating voltage is already known in public in case of liquid crystal display devices. The liquid crystal display controller 114 shown in FIG. 1 controls those clock and display data.

Repeating the display operation of each of the picture elements, images can be displayed on the liquid crystal panel 101.

(2) Determination of coordinates

Next, determination of coordinates in which the features of this invention appear most significantly will be explained.

(a) Features of the determination of coordinates in this invention

At first, the features of the determination of coordinates in this invention will be explained briefly using FIGS. 24, 25, 27, 37, and FIG. 36 which shows the timing chart of the conventional technology.

Figure 24:
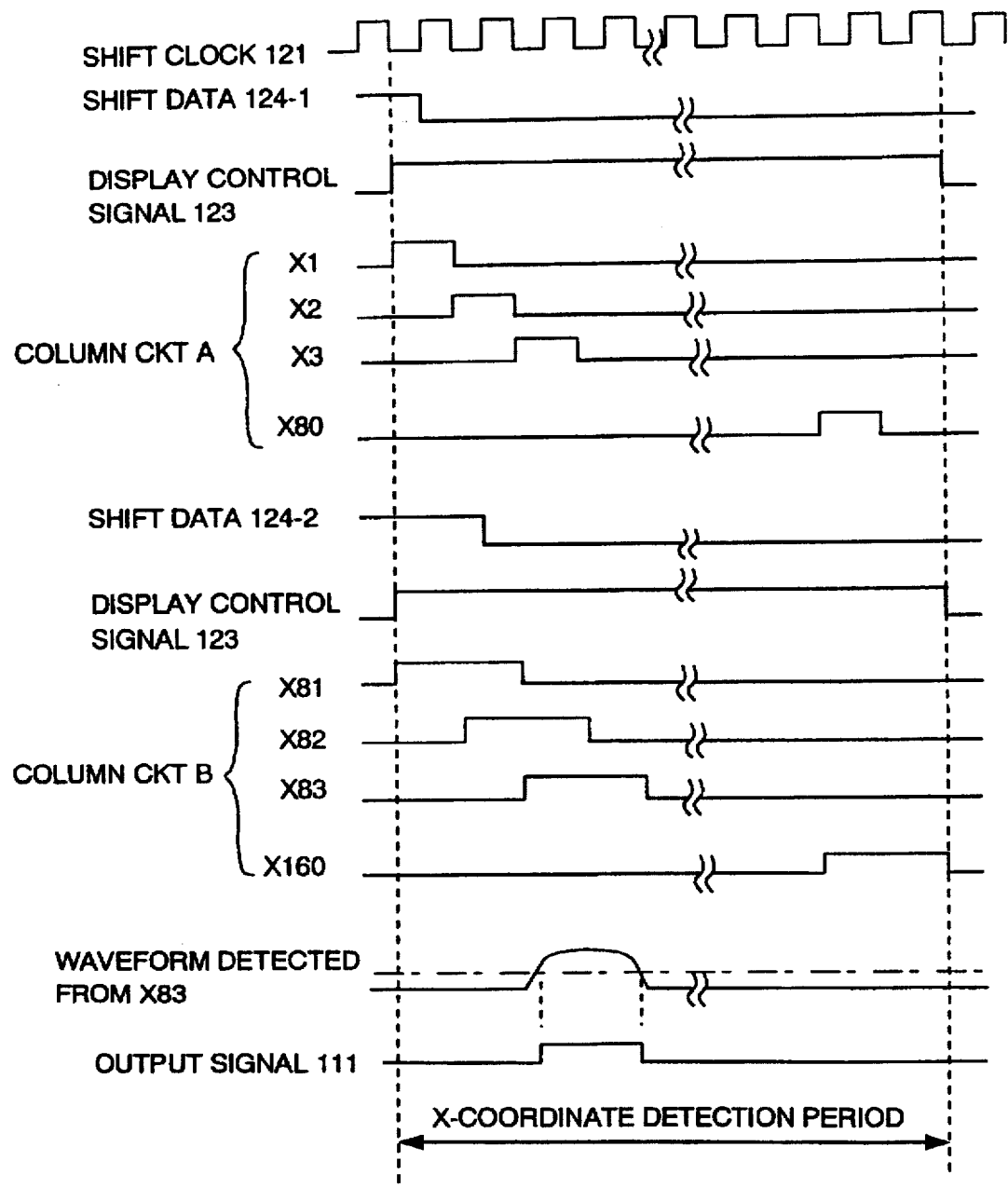
FIG. 24 shows a timing chart of an operation for coordinate detection in a column circuit related to the first embodiment of this invention.

FIG. 24 shows the timing chart of the signals from the column circuit related Go the 1st embodiment of this invention for coordinate detection.

Figure 27:
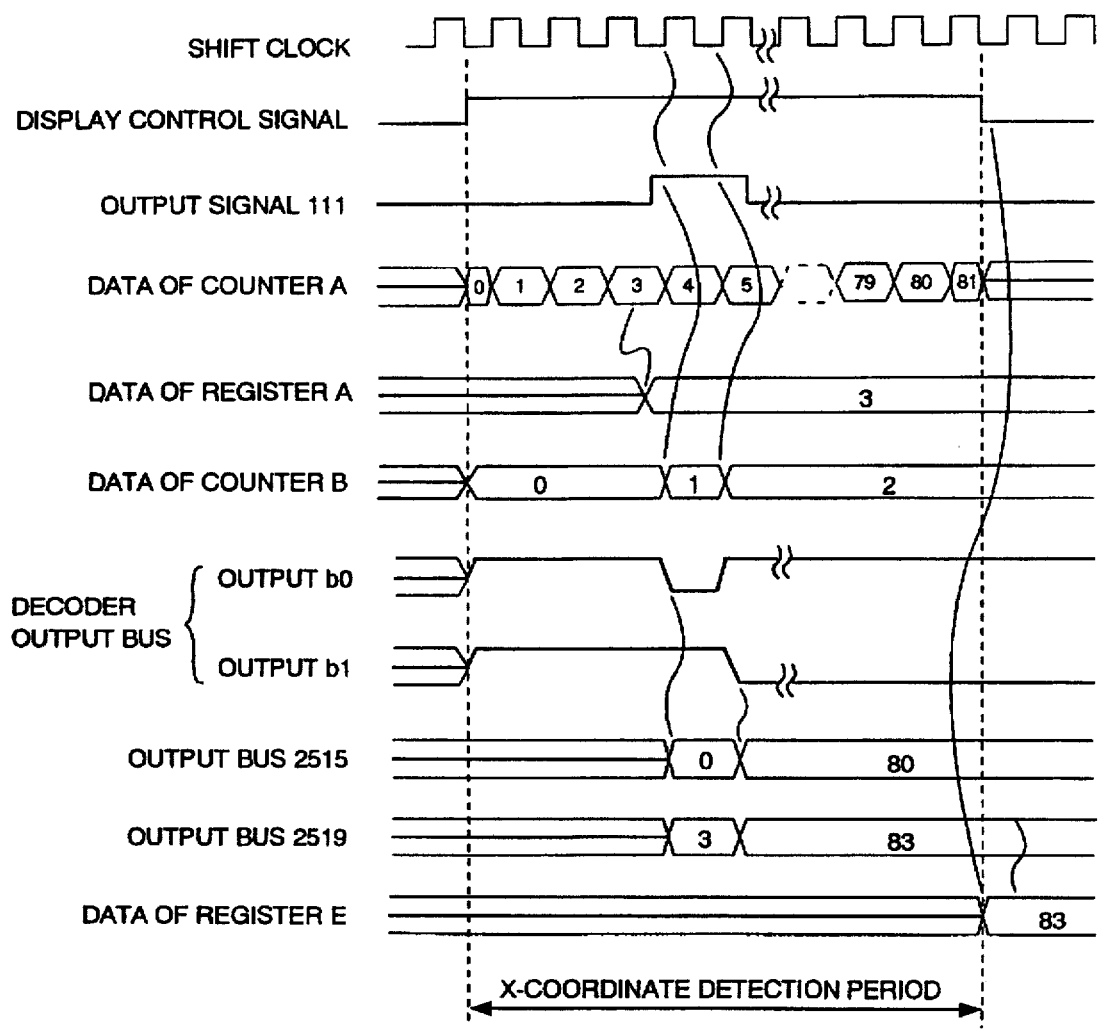
FIG. 27 shows a detailed timing chart of the signal output from the X-coordinate detection circuit related to the first embodiment of this invention, focusing on the relationship between counter data and outputs.

FIG. 27 shows the detailed timing chart of the signal output from the X-coordinate detection circuit of the first embodiment of this invention, focusing on the relationship between counter data and outputs.

Figure 37:
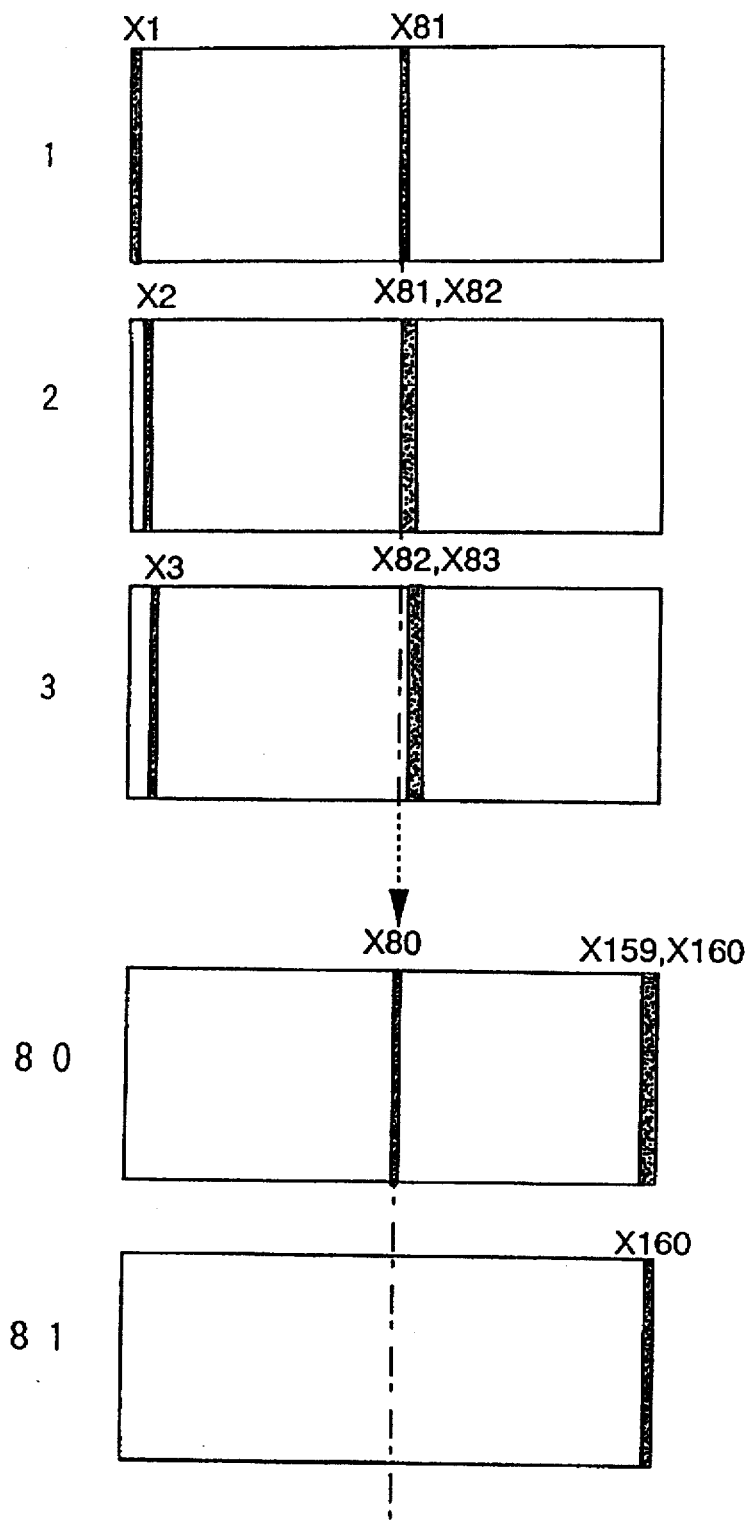
FIG. 37 shows a schematic diagram indicating a relationship between a liquid crystal display panel and a scan type of the liquid crystal display device integrated with an input device of the first embodiment of this invention.

FIG. 37 shows a schematic diagram of the relationship between the liquid crystal display panel and the scan system adopted for the display device integrated with an input device of the first embodiment of this invention.

Figure 36:
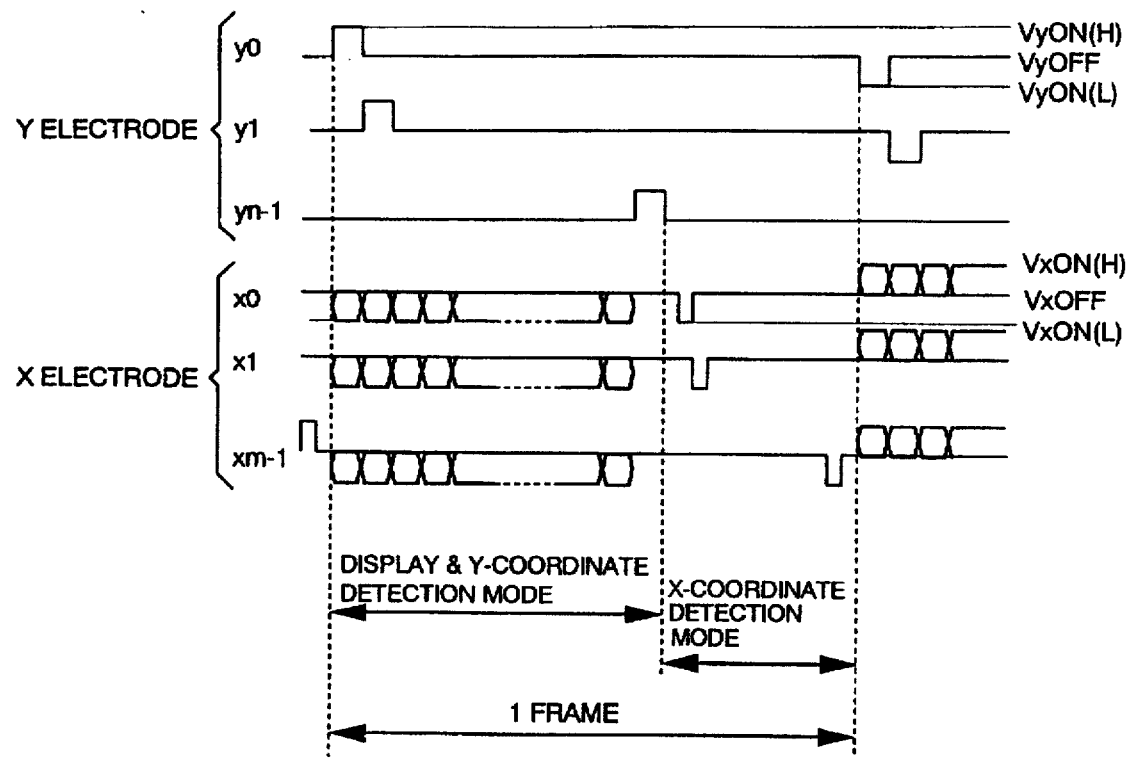
FIG. 36 shows a timing chart of a conventional tablet integrated with a display device.

As shown in FIG. 36, one frame period is resolved into a display/Y-coordinate detection period and an X-coordinate detection period. This one frame period is used to scan the coordinates pointed to by the pen. This is also true in this embodiment as shown in the timing chart in FIG. 25. One of the features of this invention, as shown in FIG. 37, is dividing the display screen into a plurality of regions (2 regions in this embodiment), and changing the waveforms with regions, so that the X-coordinate detection period can be shortened to speed up the scanning speed. In other words, as shown in FIG. 24, the pulse width of the waveforms for X81 to X160 from the column circuit is double the pulse width of the waveforms for X1 to X80 from the column circuit. This difference determines if the position pointed to by the pen is in region 1 or region 2. The X-coordinate detection period can be halved, enabling high speed scanning, although the circuit may become a little complicated in this case.

(b) Outline of coordinate determination

The pen 105 is electrostatically coupled with an electrode via a glass or plastic substrate of the liquid crystal panel 101. Potential outside a panel having a certain electrostatic capacity changes when a voltage is applied to an electrode at a position pointed to by the pen 105. The pen 105 outputs a voltage corresponding to the potential change as the coordinate detection signal 107.

Determination of the position of the electrode whose voltage is changed can determine coordinates pointed to by the pen 105. A method to determine coordinates, as shown in FIG. 25, is already explained above; a Y coordinate (a position of the common electrode) is determined during a display period and after the display period, an X coordinate is determined.

(c) Control of Y coordinate determination

Of the methods to determine coordinates as mentioned above, control of Y-coordinate determination will be explained first using FIGS. 14 and 25.

In the following explanation, the pen 105 is assumed to point to the Y3 electrode.

At first, the waveform used to determine Y coordinates will be explained using FIG. 25.

The detected waveforms are assumed to have positive polarity and negative polarity alternately at a frame period. When the waveform assumes positive polarity, the coordinate detection signal 107 from the pen 105 goes positive. On the other hand, when the waveform assumes negative polarity, the coordinate detection signal 107 from the pen 105 goes negative. This coordinate detection signal 107 is entered to the correction circuit for detected Y-waveform 112. This correction circuit for detected Y-waveform 112 receives the reference voltage 129 from the power supply 104 and use it to distinguish detected signals from external noise. In FIG. 25, the reference voltage 129 is indicated with dot-dash lines. If a detected waveform exceeds this reference voltage, detection pulses are output. The width of these detection pulses is a period during which the coordinate detection signal 107 exceeds the reference voltage 129. These detection pulses, for example, may be 5V for "high level" and 0V for "low level" in case of a 5V-driven liquid crystal display controller 114.

Next, the operation of the Y-coordinate detection circuit will be explained using FIG. 14.

This Y-coordinate detection circuit, incorporated in the liquid crystal display controller 114, determines Y coordinates with the detection pulses.

The counter 2705 initializes the counter value to "0" on receipt of FLM 125 and counts up the latch clock 122. The count data in this counter 2705 indicates the number of a scan (Y) electrode selected sequentially by the common circuit 103. It is output to the output bus 2706.

As shown in FIGS. 25 and 26, the display control signal 123 is "low" during Y coordinate detection. It is inverted to "high" in the inverter 2709 and entered to the AND circuit 2701. Therefore, the gate circuit 2703 outputs the output signal 113 from the correction circuit for detected Y-waveform 112 to the bus 2704 only during the Y-coordinate detection period. Synchronized with the positive edge of this detection pulse, the register A 2707 stores the counter value from the counter A 2705, which is data from the output bus 2706, then outputs it to the output bus 2708. In this explanation, of course, the counter value is 3. The counter value stored is the Y coordinate at the point pointed to by the pen 105. This method is effective to determine Y coordinates. The liquid crystal display controller 114 outputs this determined Y coordinate value to another system through the system bus 117.

(d) Control of X coordinate determination

Next, control of X coordinate determination will be explained using FIGS. 11, 13, 24, 27, and 37.

In this invention, X coordinates are determined by dividing the scan area into 2 regions as already explained in FIG. 37, changing the width of scan pulses with regions for identification of regions, and detecting relative coordinates in each region.

In FIG. 37, the square indicates the display area of the liquid crystal panel 101. The numbers on the left side indicate clocks for scanning and the black lines indicate the vertical electrodes on which ON voltage is applied, and the X coordinates of which are shown at the top of the display area.

The area having X1 to X80 electrodes on the left side of the screen is assumed as region 1. The area having X81 to X160 electrodes on the right side of the screen is assumed as region 2. As shown in FIG. 37, scanning is made vertical line by vertical line in the region 1. In the region 2, however, two consecutive vertical electrodes are scanned at once by supplying ON voltage on the electrodes and the scanned electrodes shift one vertical electrode to the right in synchronism with scan clocks. Although the time to apply ON voltage in region 1 is 1 clock, but the time to apply ON voltage in region 2 is 2 clocks. Thus, in this embodiment detected waveforms differ between two divided regions.

The difference between these detected waveforms is shown concretely in the timing chart in FIG. 24. The width of the scan pulses corresponding to waveforms detected in region 2 having x81 to x160 electrodes is one clock longer than the width of scan pulses in area 1 having X1 to X80 electrodes. This invention, as to be explained below, enables the X-coordinate detection circuit to identify the subject region according to the difference in the width of scan pulses corresponding to the detected waveforms, and to detect relative X coordinate in each region.

Next, the operation of the column circuit 102 will be explained using FIGS. 11, 24, and 26.

In FIG. 11, while an X coordinate is detected, the display control signal 123 becomes "high". The latch address generator 201 therefore latches the shift data signal 124 with the shift clock 121, then shifts a signal according to the shift data signal 124 and supplies it to the outputs S1 to S80 sequentially and synchronously with the shift clock 121 as shown in FIG. 26.

The period of the shift data signal 124-1 in the column circuit A 102-1 shown in FIG. 1 is set as 1 clock, and the address signal bus 204 shown in FIG. 11 outputs "high" signals in accordance with S1, S2, S3 ... and S80 shifting sequentially in synchronism with the shift clock 121.

The period of the shift data signal 124-2 in the column circuit B 102-2 is set as 2 clocks, and the address signal bus 204 shown in FIG. 11 outputs "high" signals in accordance with the S1, S1 and S2, and S2 and S3, ... S79 and S80 shifting sequentially in synchronism with the shift clock 121.

The data from this address signal bus 204 is entered to the data selector 209. The data selector 209 outputs the data from the latch address signal bus 204 to the output bus 210, since the display control signal 123 is "high" because an X coordinate is being detected. This data is then entered to the voltage selector 211. The voltage selector 211 selects a voltage from the gray scale voltage bus 118 according to the output bus 210 and the control signal for AC driving 120 and transfers it as the output 212.

As a result, the ON voltage equivalent to 1 clock of the shift clock 121 is applied to the X1 to X80 electrodes, and the ON voltage equivalent to 2 clocks of the shift clock 121 is applied to the X81 to X160 electrodes, as shown in FIG. 24. Thus, the voltage can be applied corresponding to the scan as shown in FIG. 37.

Next, the operation of the X-coordinate detection circuit will be explained using FIGS. 13 and 27.

In the embodiment to be explained below, it is assumed that the pen points to the X83 electrode.

This X-coordinate detection circuit, like the Y-coordinate detection circuit, is incorporated in the liquid crystal display controller 114. It is used to detect X coordinates using the detection pulses mentioned above.

As shown in FIG. 26, when the display control signal 123 becomes "high", the values in the counter A 2502 and the counter B 2506 shown in FIG. 13 become "0" respectively. Then, the gate circuit 2523 is opened. The opened gate circuit 2523 transfers the output signal 111 from the correction circuit for detected X-waveform 110 as the output 2524. The counter A 2502 counts up in synchronism with the negative edge of the shift clock 121. The count value is then entered to the register A 2504 through the output bus 2503. This register A 2504 stores the data ("3" in this embodiment) from the output bus 2503 synchronously with the positive edge of the output signal 2524 when the signal 2524 becomes "high". This data indicates a relative coordinate in the subject region.

The counter B 2506 counts up synchronously with the positive edge of the shift clock 121 only while the output signal 2524 is "high".

In this embodiment, the counter B 2506 counts up to "2" and outputs the data to the output bus 2507. This data, as shown in FIG. 24, indicates the pulse width of the output signal 111 and identifies the subject region.

Next, a process to determine an X coordinate from two data will be explained.

The data from the output bus 2507 is entered to the decoder 2508. The decoder 2508 drives the outputs b0 and b1 from the output bus 2509 into "low" in this order as shown in FIG. 27. As a result, the selector 2514 outputs "0" and "80" to the output bus 2515 in this order synchronously with the change of the data from the output bus 2509. The data from the output buses 2505 and 2515 are added in the adder 2518, then data "83" is output to the output bus 2519 as shown in FIG. 27. The data "83" from the output bus 2519 is stored in the register E 2521 synchronously with the positive edge of the output signal 2517, which is an inverted signal of the display control signal 123. The positive edge of the output signal 2517 means the end of the detection period. The data "83" is then output to the output bus 2522. This data "83" is the X coordinate pointed to by the pen 105.

In this embodiment, the register 2504 stores a relative X coordinate in the subject region, and the counter 2506 stores the data indicating the subject region. Then, the subject X coordinate is determined from those data.

The liquid crystal display controller 114 shown in FIG. 1 outputs this determined X coordinate to another system through the system bus 117.

Embodiment 2

Hereafter, a second embodiment of this invention will be explained using FIGS. 2, 12, 15, 28, 38, and Table 1.

(I) Features of this embodiment

Figure 28:
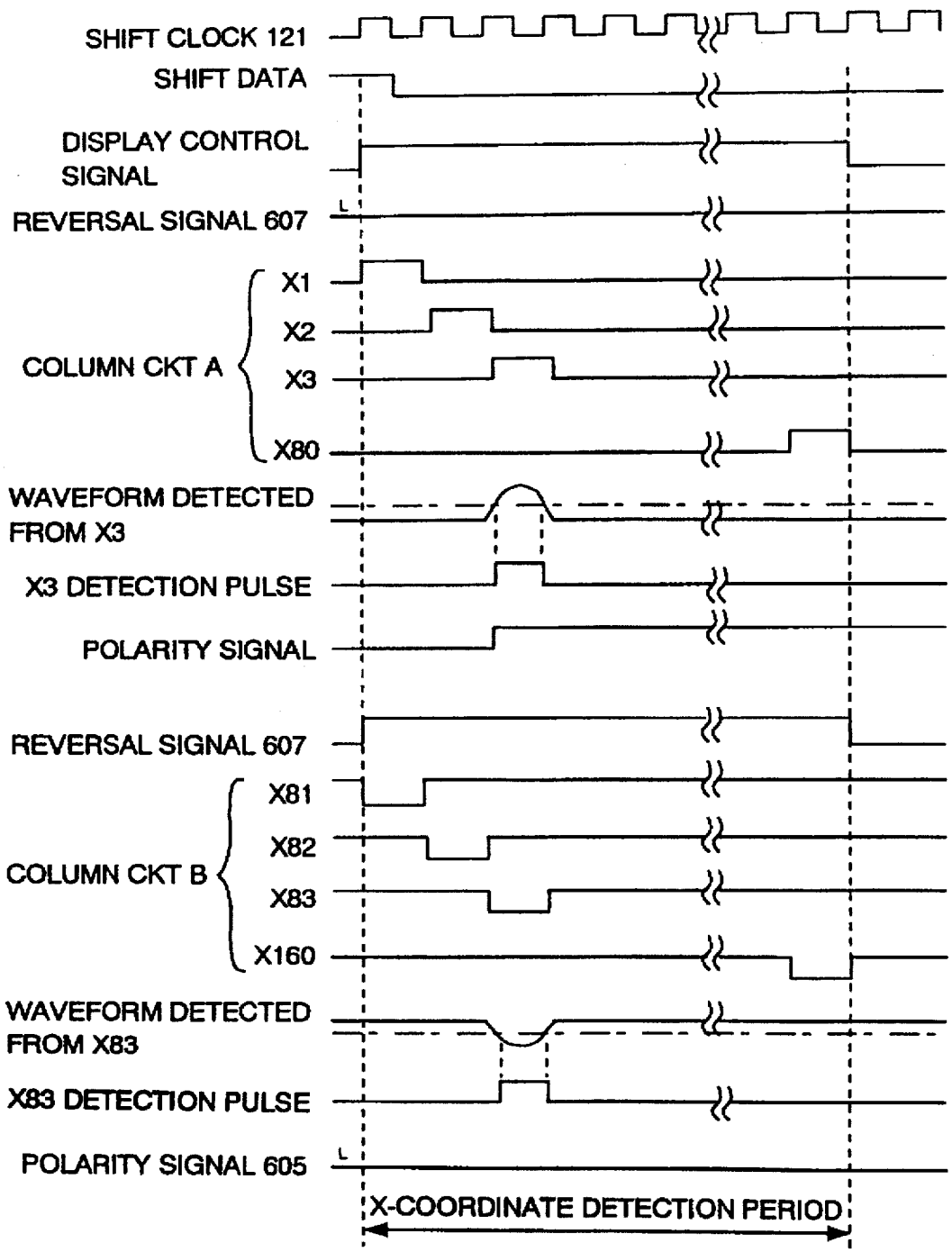
FIG. 28 shows a timing chart of signals from a column circuit for coordinate detection related to the second embodiment of this invention.

The features of this embodiment will be clarified by comparing them with those of the first embodiment using FIGS. 24 and 28. FIG. 28 shows the timing chart of the outputs from the column circuit related to the second embodiment of this invention when a coordinate is detected.

In this embodiment, the liquid crystal panel is divided into two regions. The width of scan pulses used to determine coordinates are changed with regions to determine the X coordinate pointed to by the pen. This process is the same as that in the first embodiment.

In the first embodiment, as shown in FIG. 24, the width of scan pulses is changed with two regions. In this embodiment, however, the scan area is divided into 2 regions and the polarity of scan pulses is changed with regions to identify the subject scan region. In this embodiment, the width of the scan pulses is fixed as shown in FIG. 28, and it is the same conception as that of the first embodiment that scan pulses are changed with regions.

(II) Overall configuration and individual circuits

Hereafter, the overall configuration and individual circuits of the liquid crystal display device integrated with an input device in the second embodiment of this invention will be explained briefly using FIGS. 2, 12, and 15.

Figure 2:
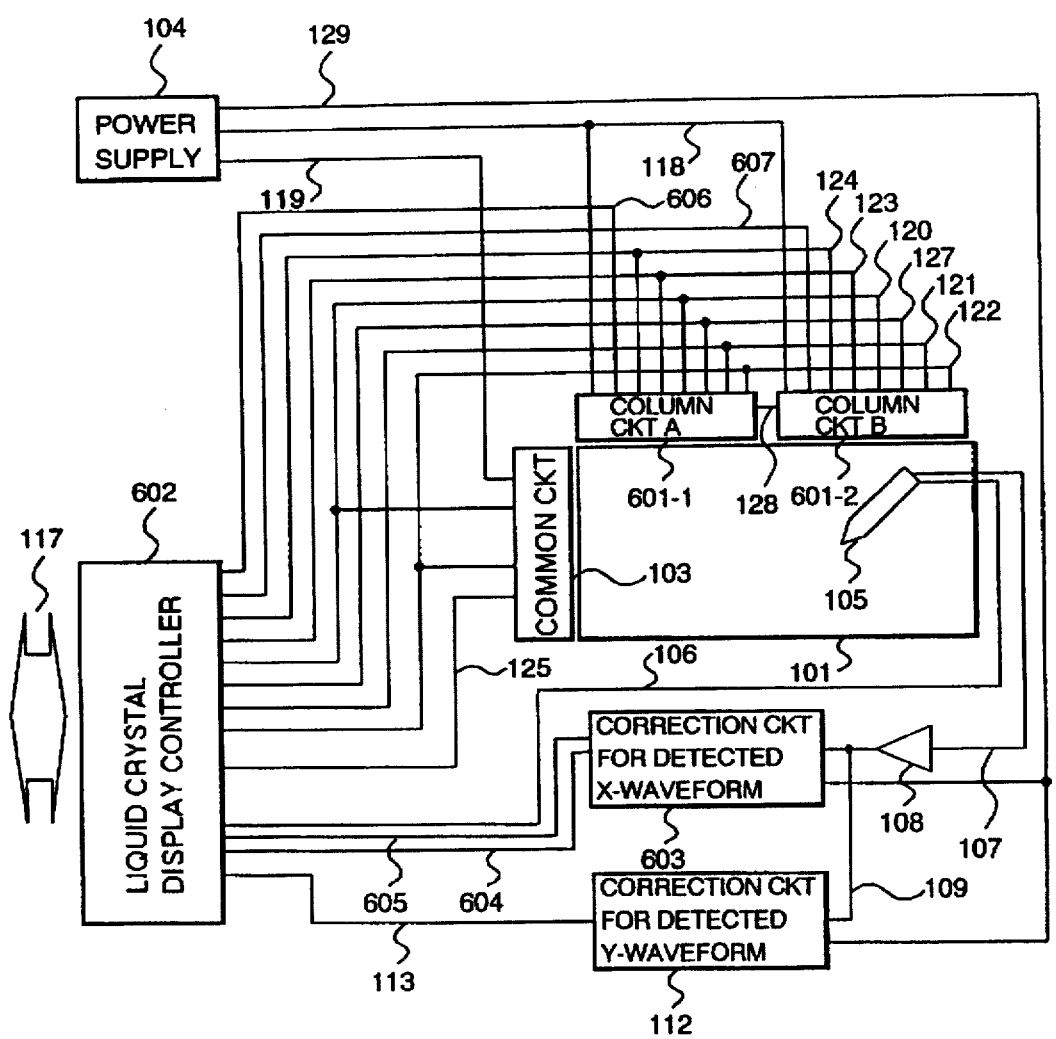
FIG. 2 shows a block diagram of a configuration of a liquid crystal display device integrated with an input device of a second embodiment of this invention.

FIG. 2 shows the block diagram of the liquid crystal display device integrated with an input device in the second embodiment of this invention.

Figure 15:
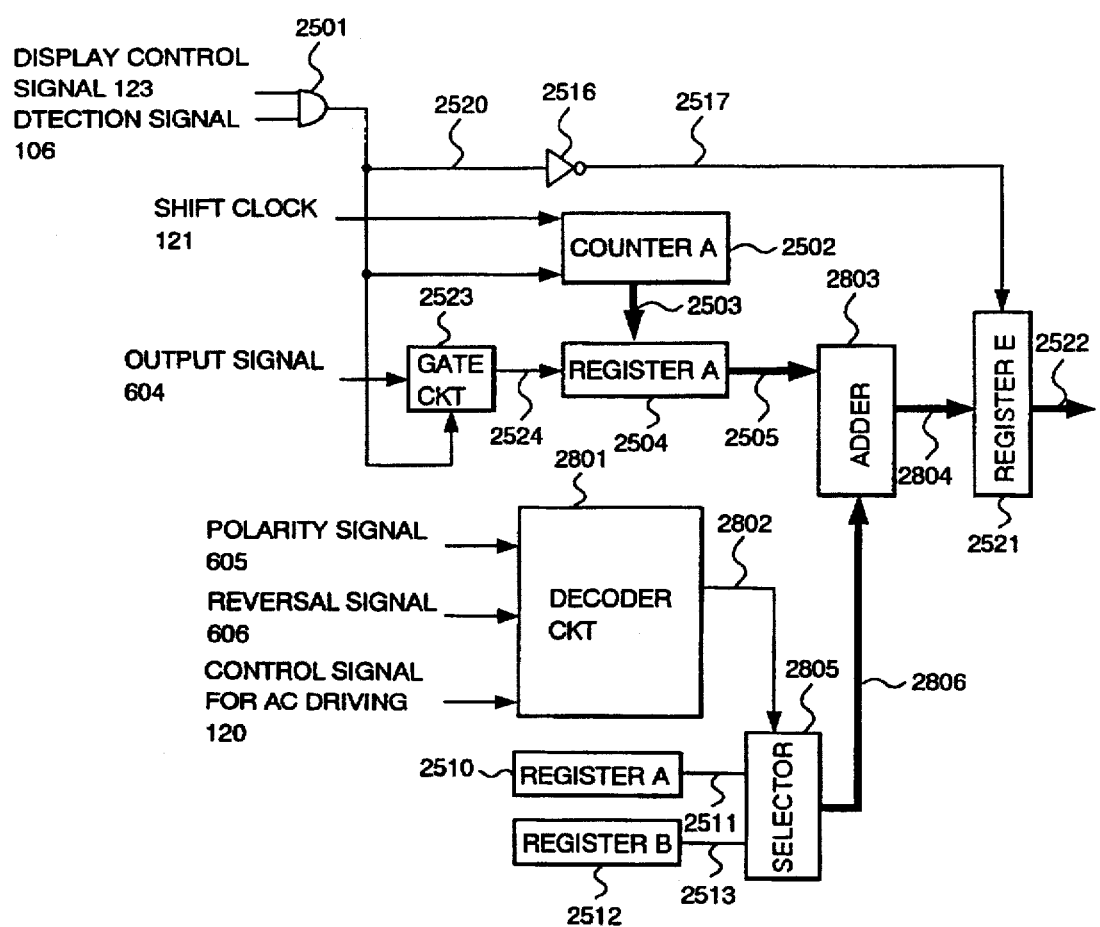
FIG. 15 shows a block diagram of a configuration of an X-coordinate detection circuit of the liquid crystal display device integrated with an input device related to the second embodiment of this invention.

FIG. 15 shows the block diagram of the X-coordinate detection circuit of the liquid crystal display device integrated with an input device in the second embodiment of this invention.

The overall configuration of the liquid crystal display device integrated with an input device in the second embodiment of this invention shown in FIG. 2 is almost the same as that of the first embodiment shown in FIG. 1.

However, the polarity signal 605 output from the correction circuit for detected X-waveform becomes "high" when the output signal 109 is changed in the positive direction and "low when the signal 109 is changed in the negative direction in this embodiment. The configuration of the column circuit of the liquid crystal display device integrated with an input device in the second embodiment of this invention shown in FIG. 2 is also almost the same as that of the first embodiment shown in FIG. 1.

However, the data selector 701 outputs the selected signal as it is when the reversal signal 702 is "high", and inverts and outputs the selected signal when the reversal signal 702 is "low". This reversal signal 702 indicates the reversal signal 606 from the column circuit 601-1 shown in FIG. 2 and the reversal signal 607 from the column circuit 601-2 respectively.

Furthermore, the configuration of the X-coordinate detection circuit of the liquid crystal display device integrated with an input device in the second embodiment of this invention shown in FIG. 15 differs a little from that of the first embodiment shown in FIG. 1 as follows.

The selector 2805 outputs "0" output from the output bus 2511 of the register A 2510 to the output bus 2806 when the output signal 2802 from the decoder is "low" and "80" output from the output bus 2513 of the register B 2512 to the output bus 2806 when the output signal 2802 is "high".

The adder 2803 adds data from the output bus 2805 to the data from the output bus 2806 and outputs the result to the output bus 2804.

Table 1 below is the truth table of the decoder shown in FIG. 15.

TABLE 1

| Polarity signal | Reversal signal | Control signal for AC driving | Output |
|---|---|---|---|
| H | H | H | H |
| L | H | H | L |
| H | L | H | L |
| L | L | H | H |
| H | H | L | L |
| L | H | L | H |
| H | L | L | H |
| L | L | L | L |

(III) The operation of the liquid crystal display device integrated with an input device in the second embodiment of this invention (1) Display operation Hereafter, the display operation of the liquid crystal display device integrated with an input device in this embodiment of this invention will be explained using FIGS. 2 and 12.

Figure 12:
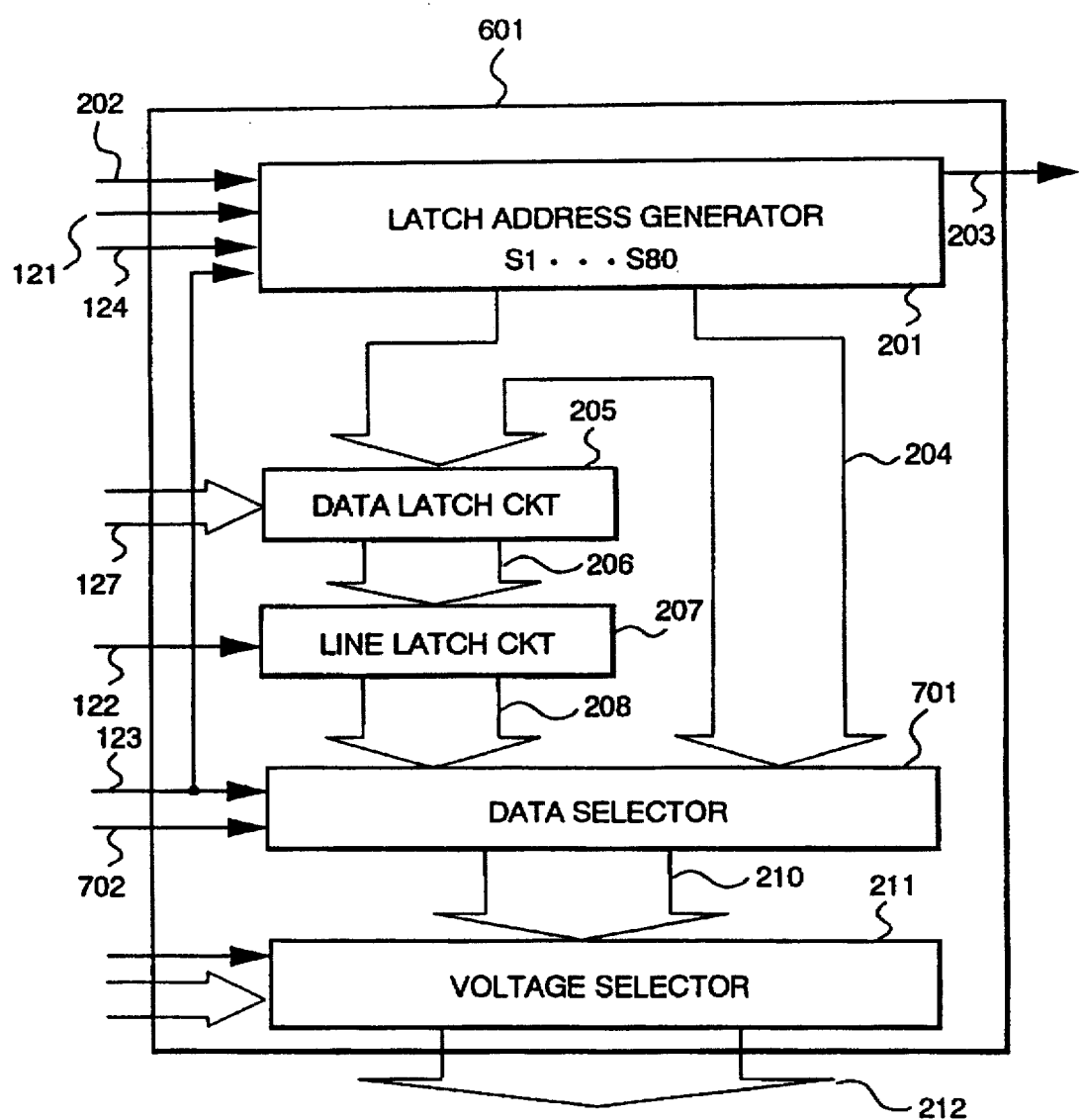
FIG. 12 shows a block diagram of a configuration of a column circuit related to the second embodiment of this invention.

FIG. 12 shows the block diagram of the column circuit configuration in the second embodiment of this invention.

The display operation is the same as that of the first embodiment, so this section will explain the operation just briefly.

When the liquid crystal display controller 602 drives the reversal signals 606 and 607 to be entered to the column circuit A 601-1 and the column circuit B 601-2 into "high" respectively, the data selector 701 shown in FIG. 12 outputs the data of the output bus 208 to the output bus 210 as is. Other display operations in this embodiment are also the same as those in the first embodiment.

(2) Determination of coordinates

Control of Y coordinate determination is the same as that in the first embodiment, so the explanation will be omitted here. In this section, only control of X coordinate determination will be explained using FIGS. 15, 28, and 38.

At first, how to scan for determination of coordinates will be explained using FIGS. 28 and 38.

Figure 38:
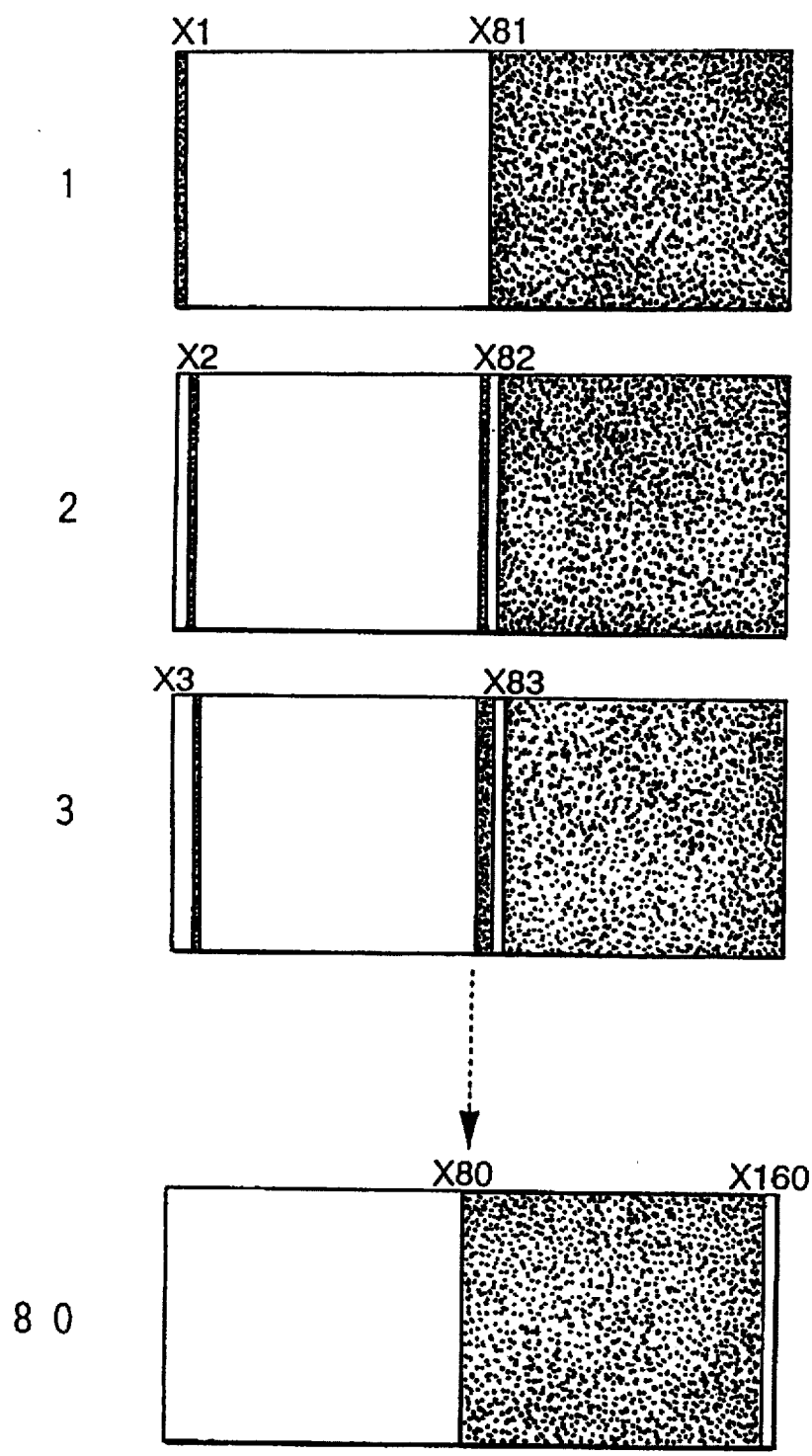
FIG. 38 shows a schematic diagram indicating a relationship between a liquid crystal display panel and a scan type of a liquid crystal display device integrated with an input device of the second embodiment of this invention.

FIG. 38 shows the schematic of the relationship between the liquid crystal display and the scanning of the liquid crystal display device integrated with an input device in the second embodiment of this invention.

As explained in the first embodiment, the scan area on the liquid crystal panel 101 is divided into 2 regions as shown in FIG. 38. One region is defined as region 1 that has X1 to X80 electrodes, while the other region is defined as region 2 that has X81 to X160 electrodes. The black portion in FIG. 38 indicates vertical lines on which the ON voltage is applied. The white portion in FIG. 38 indicates vertical lines on which the OFF voltage is applied. As shown in FIG. 38, scanning is done line by line in both regions 1 and 2. In region 1, ON voltage is used for scanning in region 1, and OFF voltage is used for scanning in region 2.

The detected waveform, as shown in FIG. 28, becomes convex to be driven from "low" into "high" for X1 to X80 electrodes and concave to be driven from "high" into "low" for X81 to X160 electrodes. In other words, while the reversal signal 607 is "low", the column circuit 601-1 outputs ON voltage and electrodes are scanned in order of X1, X2, ... X80 synchronously with the shift clock 121.

On the contrary, while the reversal signal 607 is "high", the column circuit 601-2 outputs OFF voltage, and scanning is made in order of X81, X82 ..., X160 synchronously with the shift clock 121.

If ON voltage is applied to the X3 electrode, a positive voltage is detected as a detected coordinate signal 107. And, as shown in FIG. 28, if the pen points to the X83 in region 2 and OFF voltage is applied to the X83 electrode, then a negative voltage is detected as a detected coordinate signal 107. Then, the correction circuit for detected X waveform 603 shown in FIG. 2 converts this detected coordinate signal 107 into pulses and outputs the signal to the liquid crystal display controller 602 as the output signal 604, and outputs the polarity signal 605 that indicates whether detected pulses go positive or negative. The polarity signal 605 is "high" if the detected pulse goes positive and the polarity signal 605 is "low" if the detected pulse goes negative, as shown in FIG. 28.

Next, the operation of the X coordinate detection circuit will be explained using FIGS. 15 and 28.

In the following example, it is assumed that the pen points to the X83 electrode.

As shown in FIG. 28, if OFF voltage is applied to the X83 electrode, the coordinate detection waveform 107 goes negative. The correction circuit for detected X waveform, therefore, outputs the "low" signal 604 and the "low polarity signal 605.

Data "3" output from the output bus 2503 of the counter A 2502 synchronous with the shift clock 121 is stored in the register A 2504 as shown in FIG. 15. This data is output to the output bus 2505 with the pulses of the output signal 604.

On the other hand, the decoder 2801 receives a "high" control signal for AC driving 120, a "low" reversal signal 606, and a "low" polarity signal 605, so the decoder 2801 outputs "high" signals to "2802" as shown in Table 1.

If the selector 2805 receives a "high" signal, it outputs data from the output bus 2513.

The register B stores "80" corresponding to region 2, and the data "80" is output to the output bus 2513. Therefore, the selector 2805 outputs "80" to the output bus 2806. The adder 2803 adds data "3" (indicating a relative coordinate in the subject region) from the output bus 2505 to data "80" (corresponding to region 2) from the output bus 2806 and outputs the result "83" to the output bus 2804.

The data "83" from this output bus 2804 is stored in the register E 2521 synchronously with the coordinate memory clock 2520, then output to the output bus 2522.

This data indicates the X coordinate pointed to by the pen 105, and the liquid crystal display controller 602 shown in FIG. 2 outputs the data to another system through the system bus 117.

Embodiment 2-1

Figure 39:
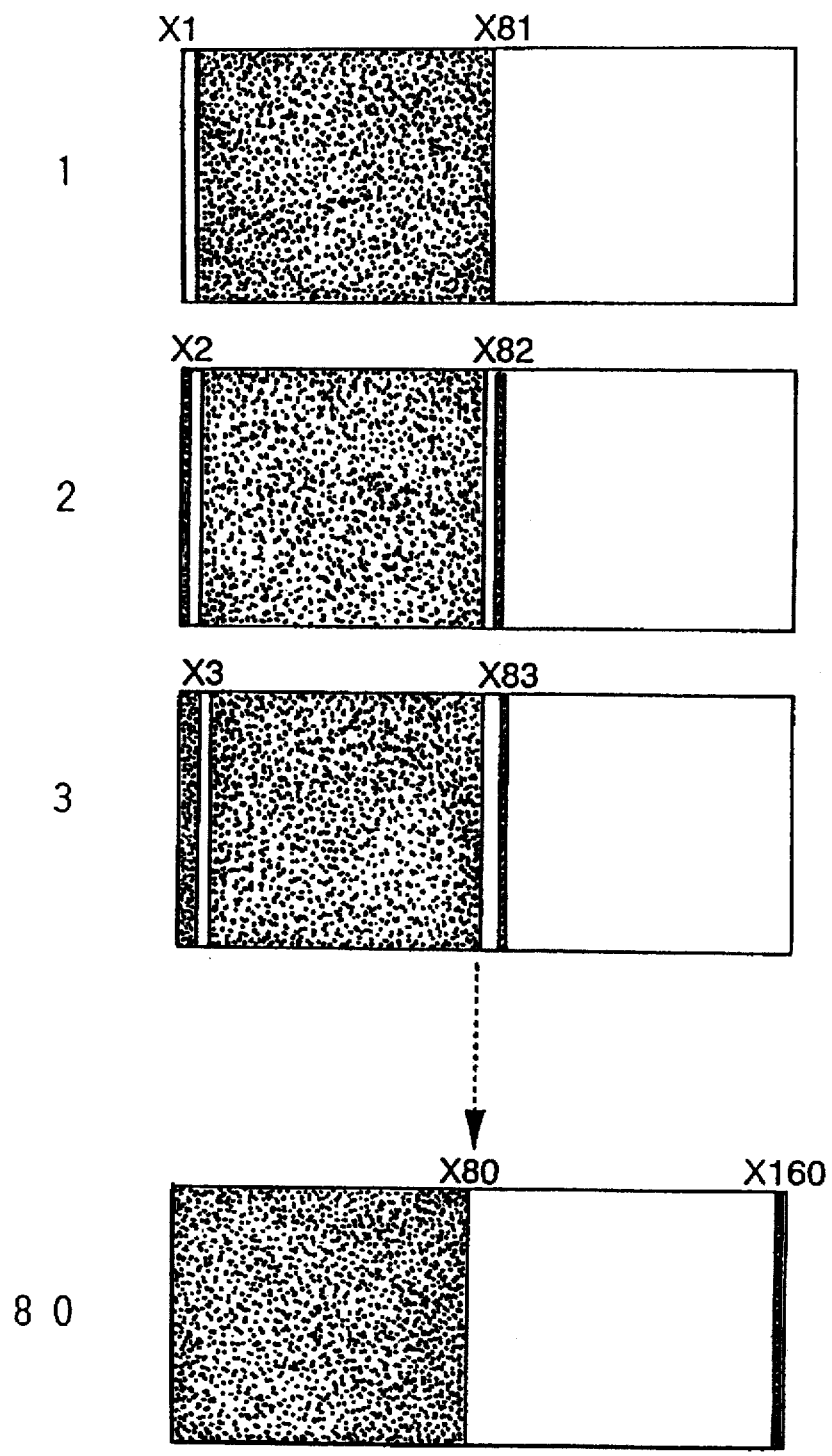
FIG. 39 shows a schematic diagram indicating a relationship between a liquid crystal display panel and a scan type of a liquid crystal display device integrated with an input device of a modified second embodiment of this invention.

A modification of Embodiment 2 will be explained using FIG. 39. FIG. 39 shows the schematic of the relationship between the liquid crystal display and the scan of another liquid crystal display device integrated with an input device in the Embodiment 2 of this invention.

In this embodiment, the polarity of scan voltages is inverted with respect to that in Embodiment 1.

The number of times to apply ON/OFF voltage during the X coordinate detection period during 2 frames can be equalized in both regions 1 and 2 by alternating the scan systems of the Embodiment 2 and this embodiment during two frame periods. This operation can also eliminate the difference between the contrasts of regions 1 and 2 caused by the influence of the scan voltage during the X coordinate detection period. As a result, screen flickering can be reduced for easier watching.

Embodiment 3

Next, the 3rd embodiment of this invention will be explained below using FIGS. 3, 16, 29, 40, and Table 2.

(I) Features of this embodiment

Figure 29:
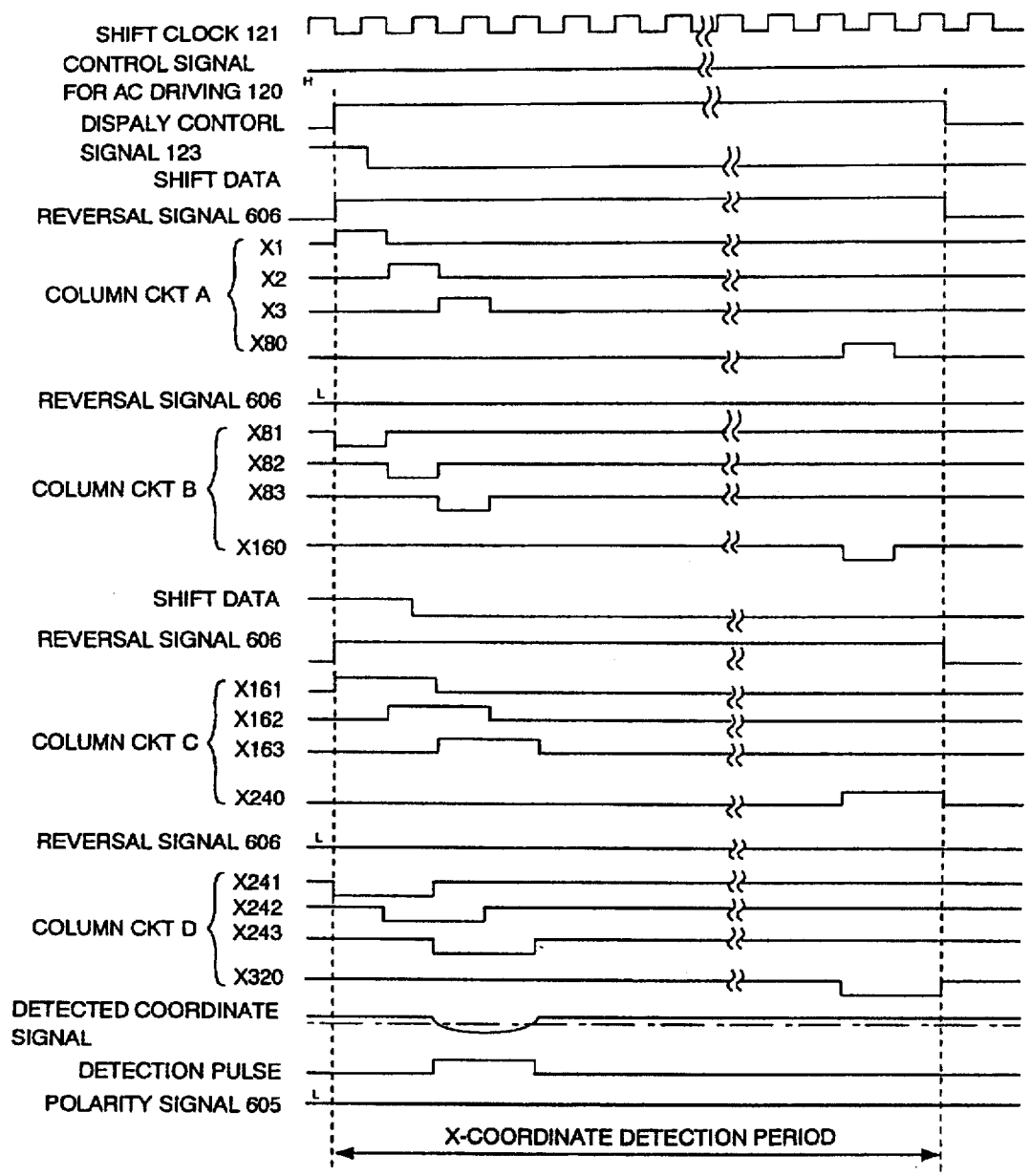
FIG. 29 shows a timing chart of signals from a column circuit for coordinate detection related to the third embodiment of this invention.

The features of this embodiment will be clarified using FIGS. 24, 28, and 29.

FIG. 29 shows the timing chart of the signal output from the column circuit in the 3rd embodiment of this invention when a coordinate is detected.

In the first embodiment, the width of scan pulses is changed with regions as shown in FIG. 24. In the second embodiment, the polarity of the scan pulse voltage is changed with regions as shown in FIG. 28.

In this embodiment, both the features are combined. As shown in FIG. 29, the width of scan pulses and the polarity of scan pulse voltage are changed with regions. In other words, the display area is divided into 4 regions. In region 1 corresponding to X1 to X80 electrodes, the pulse width is set to 1 and the voltage polarity is ON. In region 2 corresponding to X81 to X160 electrodes, the pulse width is set to 1 and the voltage polarity is OFF. In region 3 corresponding to X161 to X240 electrodes, the pulse width is set to 2 and the voltage polarity is ON, and in region 4 corresponding to X241 to X320 electrodes, the pulse width is set to 2 and the voltage polarity is OFF.

(II) Overall configuration and individual circuit configuration

Hereafter, the overall configuration and individual circuit configuration of the liquid crystal display device integrated with an input device in the 3rd embodiment of this invention will be explained briefly using FIGS. 3 and 16.

Figure 3:
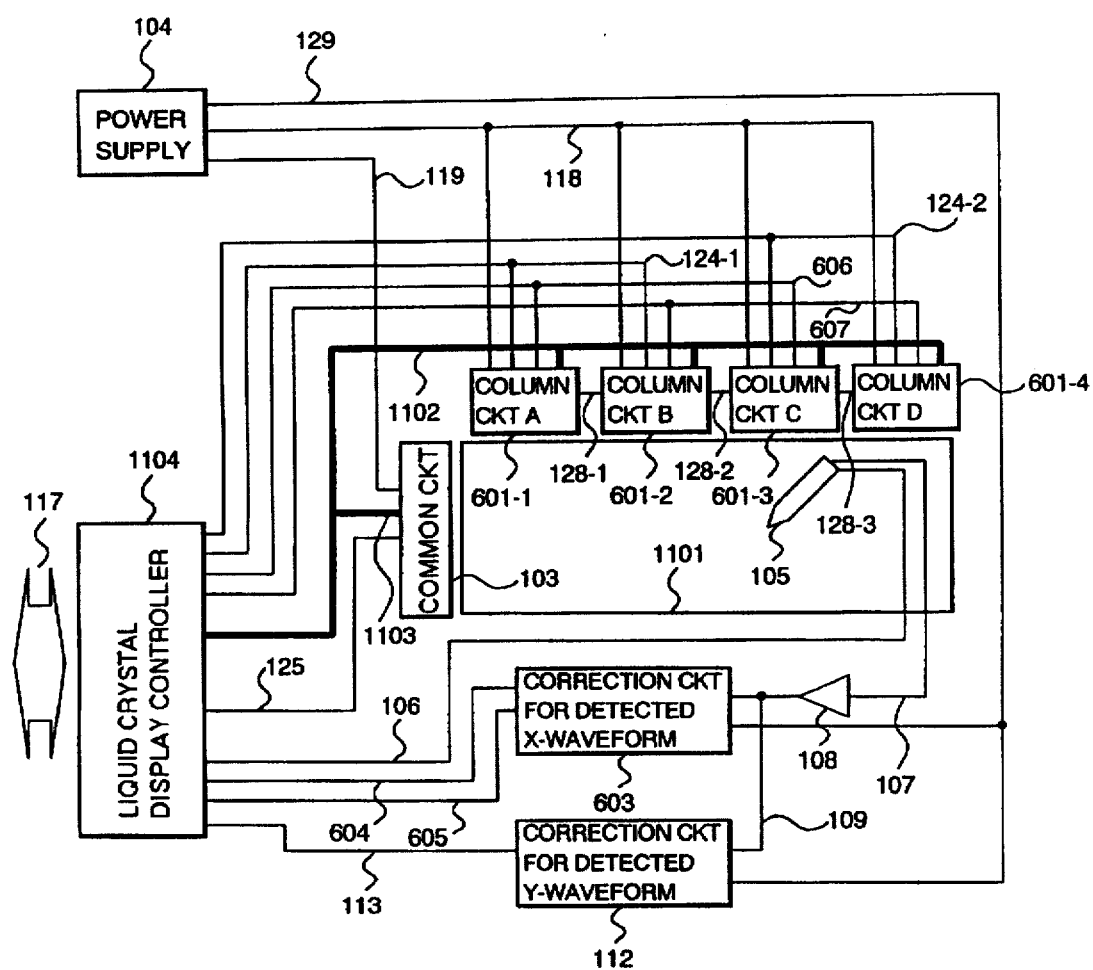
FIG. 3 shows a block diagram of a configuration of a liquid crystal display device integrated with an input device of a third embodiment of this invention.

FIG. 3 shows the block diagram of the configuration of the liquid crystal display device integrated with an input device in the 3rd embodiment of this invention.

Figure 16:
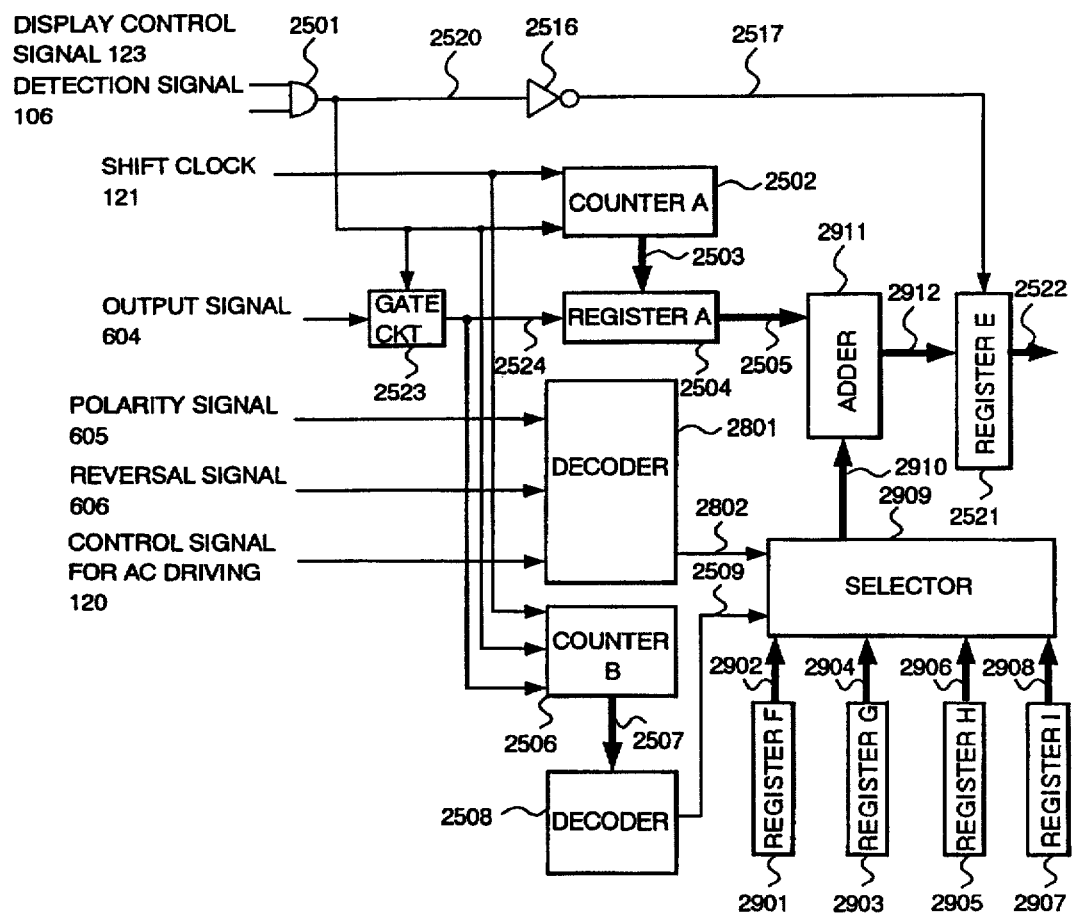
FIG. 16 shows a block diagram of a configuration of an X-coordinate detection circuit of the liquid crystal display device integrated with an input device related to the third embodiment of this invention.

FIG. 16 shows the block diagram of the X coordinate detection circuit configuration of the liquid crystal display device integrated with an input device in the 3rd embodiment of this invention.

The overall configuration of the liquid crystal display device integrated with an input device in the 3rd embodiment of this invention shown in FIG. 3 differs from those in the first and second embodiments shown in FIGS. 1 and 2 respectively in that 4 column circuits are provided in this embodiment.

In FIG. 3, the liquid crystal panel 1101 has electrodes arranged orthogonally with each another on two glass or plastic substrates. Liquid crystal is filled between those substrates, forming a matrix of 320 dots×80 lines.

In FIG. 16, the register F 2901 stores initial data "0" corresponding to region 1. The register G 2903 stores initial data "80" corresponding to region 2. The register H 2905 stores initial data "160" corresponding to region 3. The register I 2907 stores initial data "240" corresponding to region 4.

The selector 2909 selects one of the data from the output buses 2902, 2904, 2906, and 2908 according to the output signals 2802 and 2509. The output from the selector 2909 is as shown in Table 2.

TABLE 2

| Output Signal 2802 | Output Signal 2509 | Output from Selector 2909 |
|---|---|---|
| L | L | 0 |
| H | L | 80 |
| L | H | 160 |
| H | H | 240 |

(III) Operation of the liquid crystal display device integrated with an input device in this embodiment (1) Display operation The functions of the liquid crystal display controller 1104 are extended according to the changes of the display area including the increased number of clocks in the shift clock 121. The display operation is the same as those in the first and second embodiments, so the explanation will be omitted here.

(2) Determination of coordinates

The method to control the determination of Y coordinates in this embodiment is the same as that in the first embodiment, so the explanation will be omitted here. Thus, only controlling of determination of X coordinates will be explained in this section using FIGS. 3, 16, 29, and 40.

Figure 40:
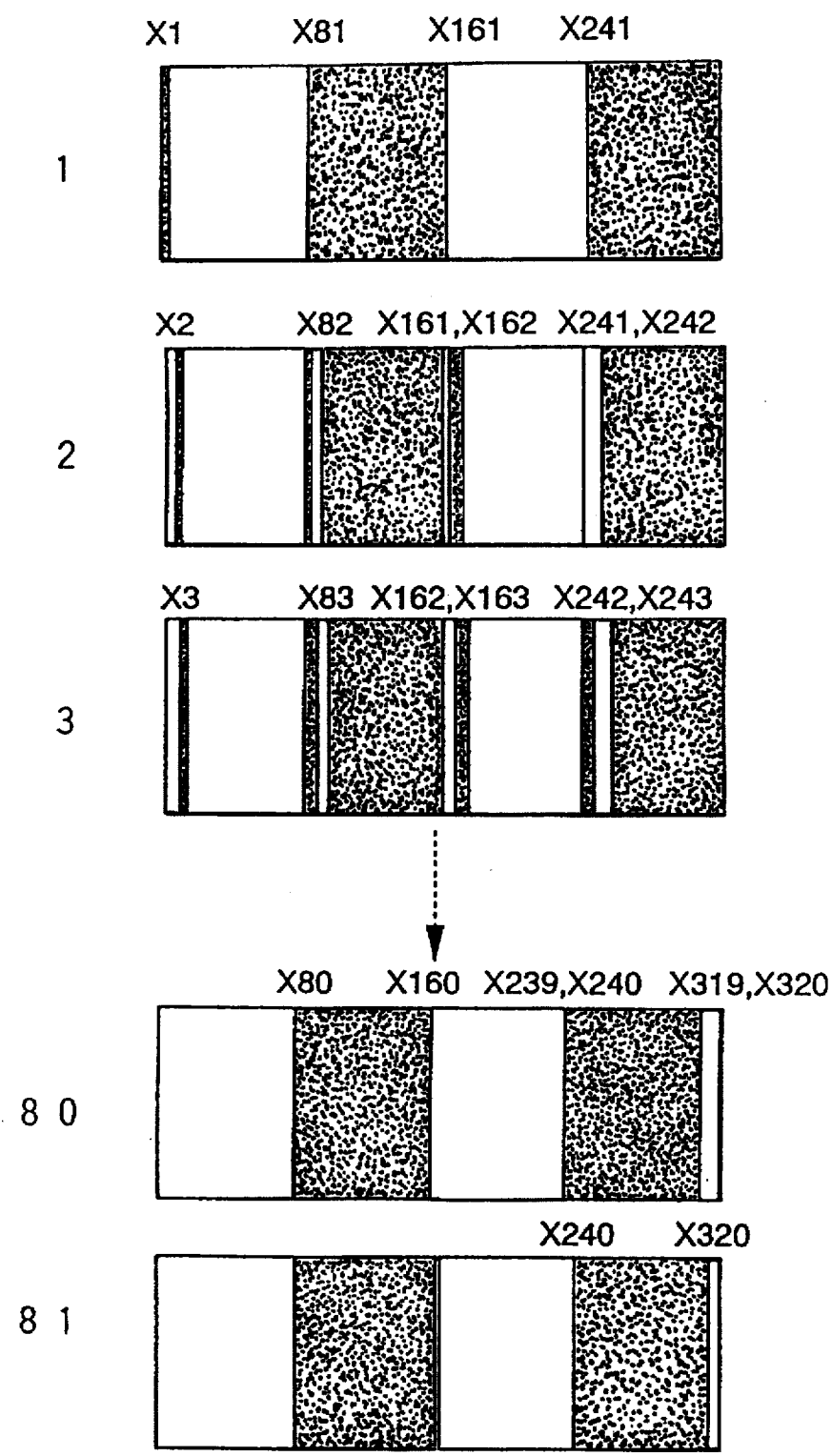
FIG. 40 shows a schematic diagram indicating a relationship between a liquid crystal display panel and a scan type of a liquid crystal display device integrated with an input device of the third embodiment of this invention.

FIG. 40 shows the schematic of the relationship between the liquid crystal display and the scan of the liquid crystal display device integrated with an input device in the 3rd embodiment of this invention.

In this embodiment, as explained above, the X-coordinate scan area is divided into 4 regions. The scan systems in the first and second embodiments are combined in this embodiment to determine coordinates. In other words, scan pulses are provided with ON voltage polarity and OFF voltage polarity corresponding to the subject region. Furthermore, the scan pulse width is divided into 2 types; 1 clock and 2 clocks. Those voltage polarities and pulse widths of scan pulses are combined to determine coordinates in each of the 4 divided scan regions.

As shown in FIG. 40, the 320-line scan area in the X direction is divided into 4 80-line regions. In this embodiment, region 1 has X1 to X80 electrodes, and ON voltage is assumed as the scan voltage in that region. The scan pulse width is of a vertical line. In region 2 that has X81 to X160 electrodes, OFF voltage is assumed as the scan voltage. The scan pulse width is of a vertical line. In region 3 that has X161 to X240 electrodes, ON voltage is assumed as the scan voltage. The scan pulse width is of 2 vertical lines. And, in region 4 that has X241 to X320 electrodes, ON voltage is assumed as the scan voltage. The scan pulse width is of 2 vertical lines. The scan pulse width and the scan pulse voltage polarity are changed with regions to identify the subject region and detect relative coordinates in the region. Absolute coordinates are calculated from those data. This is the conception of this embodiment.

FIG. 29 shows the timing chart of the AC driving signal 120, the shift clock 121, and the display control signal 123. Those signals are entered commonly to the column circuits from A 601-1 to D 601-4.

Since the "high" output reversal signal 606 and shift control signal 124-1 are entered to the column circuit A 601-1, ON voltage scan pulses equivalent to 1 shift clock for X1 to X80 are output onto electrodes from X1 to X80 sequentially as shown in FIG. 29.

Signals to be entered to the column circuit B 601-2 are the same as those to be entered to the column circuit A 601-1 except that the output reversal signal 606 is "low". Thus, OFF voltage scan pulses equivalent to 1 shift clock are output sequentially to X81 to X160.

Since "high" output reversal signal 606 and shift control signal 124-2 are entered to the column circuit C 601-3, ON voltage scan pulses equivalent to 2 shift clocks are output sequentially to X161 to X240.

Signals to be entered to the column circuit D 601-4 are the same as those to be entered to the column circuit C 601-3 except that the output reversal signal is "low". Thus, OFF voltage scan pulses equivalent to 2 shift clocks are output sequentially to X241 to X320.

Next, the operation of the X-coordinate detection circuit will be explained using FIGS. 16 and 29. In this embodiment, it is assumed that the pen 105 points to the X243 electrode.

The correction circuit for detected X-waveform 603 outputs detected pulses 604 equivalent to 2 clocks as shown in FIG. 29 when a voltage is applied to X243. The circuit 603 also drives the polarity signal 605 indicating whether the detected pulses 604 go positive or negative into "low".

The count value "3" of the counter A 2502 is stored in the register A 2504 shown in FIG. 16 according to the detected pulse of the output signal 604, then it is output to the output bus 2505.

Since the pulse width of the output signal 604 is 2 clocks, the decoder 2508 drives the output signal 2509 into "high".

The "low" polarity signal 605, the "low" reversal signal 606, and the "high" control signal for AC driving 120 are entered to the decoder 2801, and the output signal 2802 from the decoder 2801 becomes "high". As a result, the selector 2909 outputs "240", which is data corresponding to region 4, to the output bus 2910. The region data "240" (indicating region 4) from the output bus 2910 is added to the relative coordinate data "3" from the output bus 2505 in the adder 2911. The result "243" (absolute X coordinate) is output to the output bus 2912.

Then, synchronized with the negative edge of the display control signal 123, the X coordinate data "243" is stored in the register E 2521, then output to the output bus 2522.

This data indicates the X coordinate pointed to by the pen 105. Just like in the first and second embodiments, the liquid crystal display controller 1104 outputs the data to another system through the system bus 117 as shown in FIG. 3.

As shown in the Embodiment 2-1, ON voltage and OFF voltage can also be applied alternately as the scan voltage for each frame so that no difference in contrast may be generated between regions.

Embodiment 4

Next, the 4th embodiment of this invention will be explained using FIGS. 4, 17, 18, 30, and 41.

(I) Features of this embodiment

Next, the features of this embodiment will be explained using FIGS. 4, 30, and 41.

Figure 4:
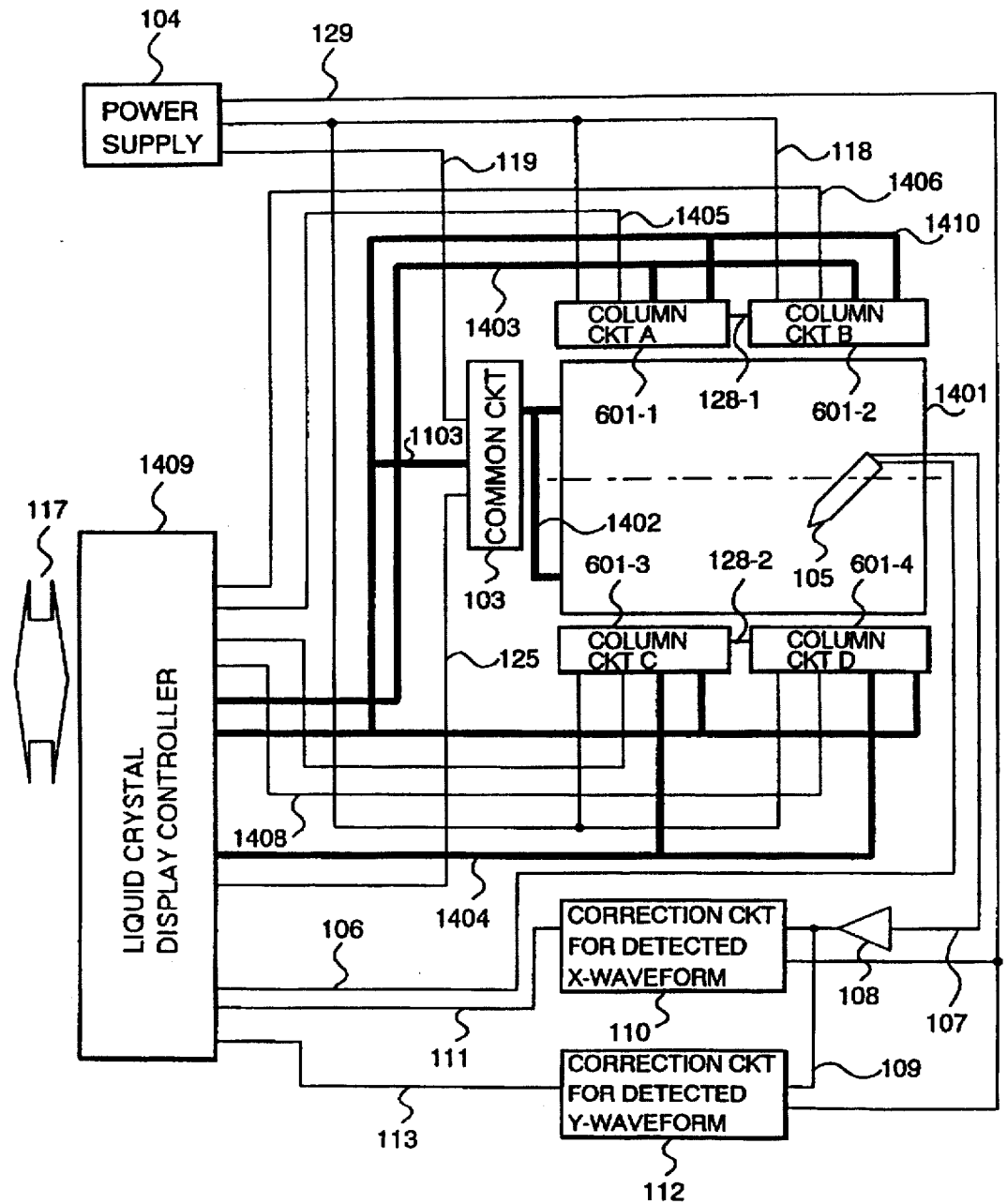
FIG. 4 shows a block diagram of a configuration of a liquid crystal display device integrated with an input device of a fourth embodiment of this invention.

FIG. 4 shows the block diagram of the liquid crystal display device integrated with an input device in the 4th embodiment of this invention.

Figure 30:
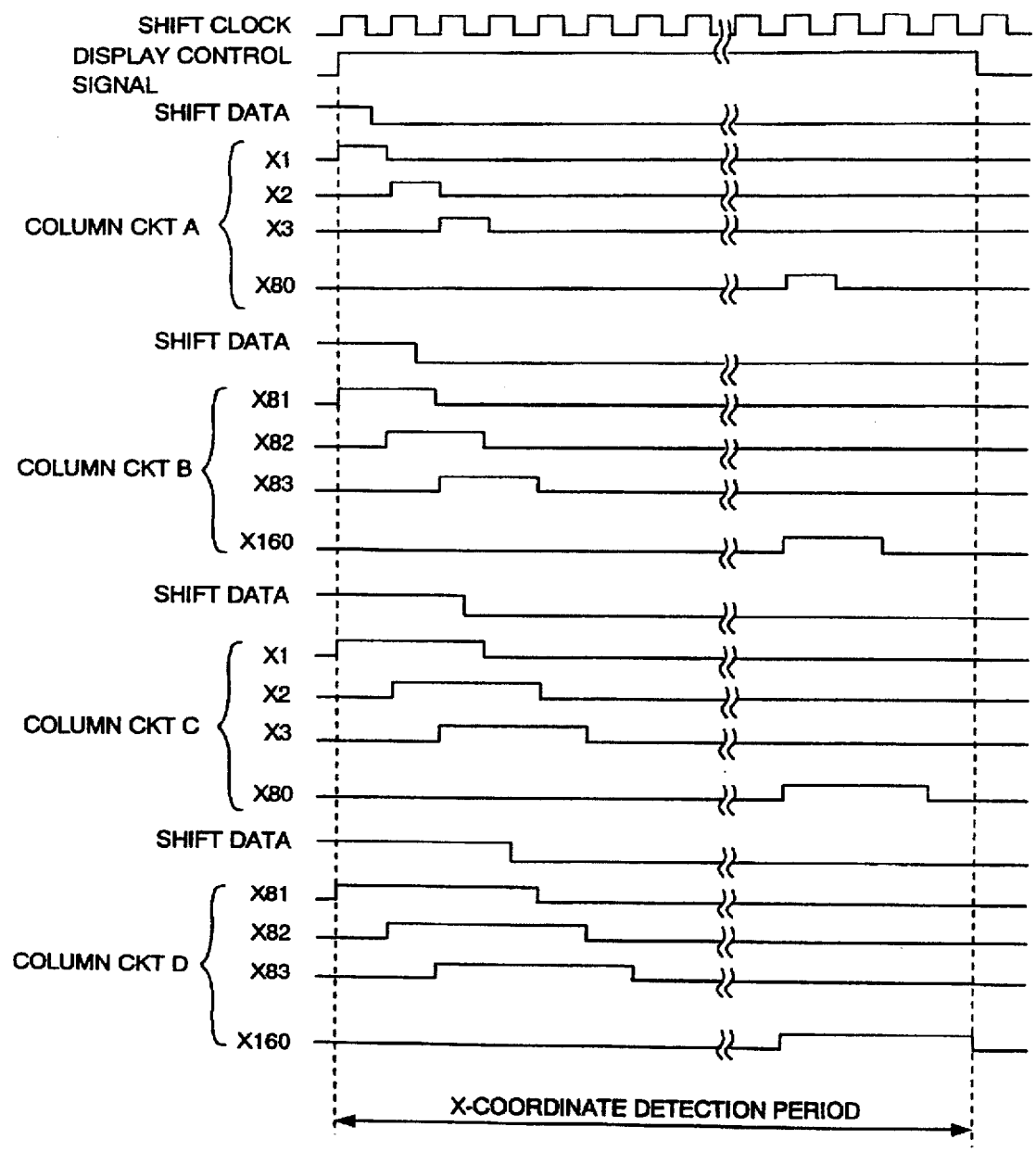
FIG. 30 shows a timing chart of signals from a column circuit for coordinate detection related to the fourth embodiment of this invention.

FIG. 30 shows the timing chart of the outputs from the column circuit in the 4th embodiment of this invention.

Figure 41:
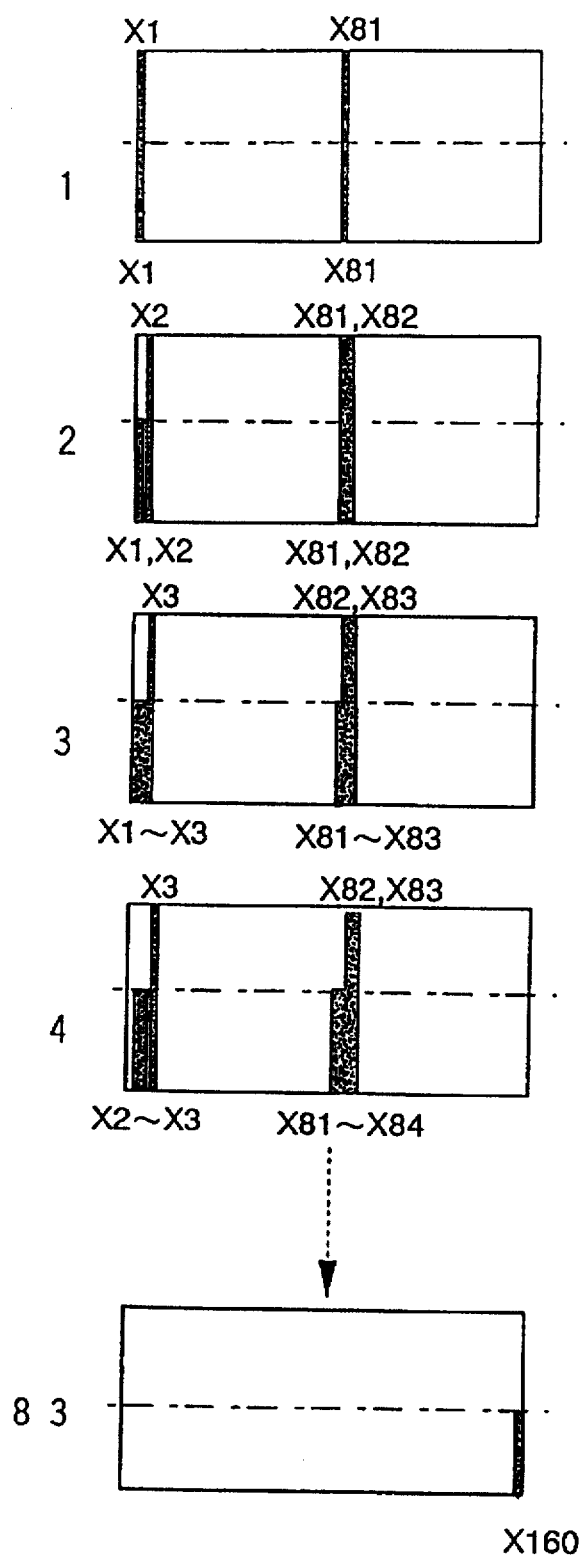
FIG. 41 shows a schematic diagram indicating a relationship between a liquid crystal display panel and a scan type of a liquid crystal display device integrated with an input device of the fourth embodiment of this invention.

FIG. 41 shows the schematic of the relationship between the liquid crystal display and the scan of the liquid crystal display device integrated with an input device in the 4th embodiment of this invention.

This embodiment is related to a controlling method for liquid crystal panels, which is the so-called driving scheme by division of a display area into upper and lower regions. In this controlling system as shown in FIG. 4, the display area is divided into 2 regions (upper and lower regions), and one common circuit is shared by those upper and lower regions to display and control the regions.

FIG. 41 shows the image of this screen display. In FIG. 41, the liquid crystal panel is divided into 4 regions to detect coordinates.

As shown in FIG. 4, therefore, there are 4 column circuits in this embodiment. The type of scan pulses is changed with those column circuits to identify the subject region. This is the same point in conception as those explained in the previous embodiments.

In this embodiment, the width of scan pulses is used to identify the subject region. In other words, as shown in FIG. 30, in region 1 corresponding to X1 to X80 in the upper regions, the scan pulse width is 1 clock. In region 2 corresponding to X81 to X160 in upper regions, the scan pulse width is 2 clocks. In region 3 corresponding to X1 to X80 in lower regions, the scan pulse width is 3 clocks. And, in region 4 corresponding to X81 to X160 in lower regions, the scan pulse width is 4 clocks. Determination of X coordinates is controlled with those different scan pulse widths.

(II) Overall configuration and individual circuit configuration

Next, the overall configuration and individual circuit configuration of the liquid crystal display device integrated with an input device in the 4th embodiment of this invention will be explained using FIGS. 4, 17, and 18.

Figure 17:
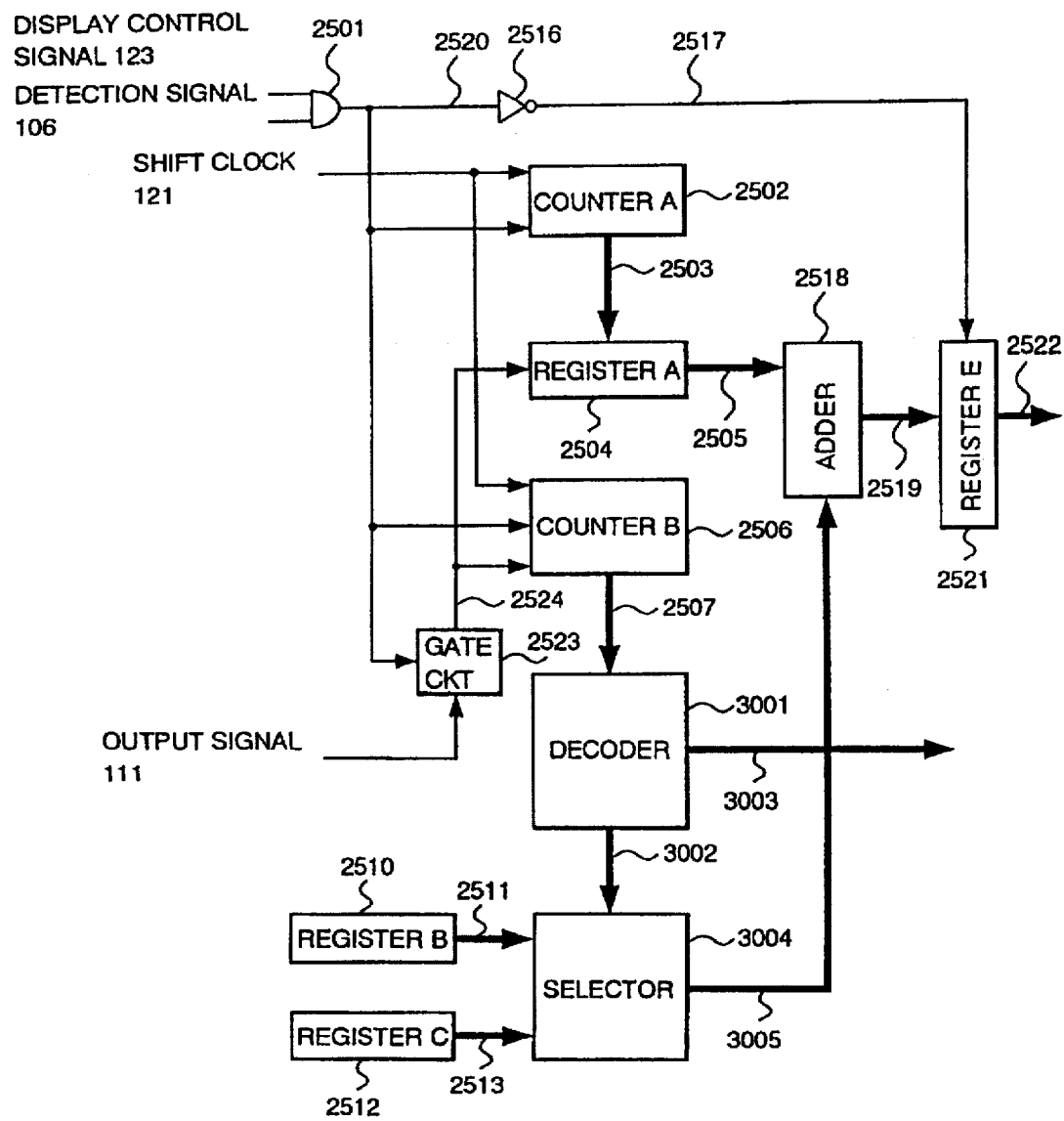
FIG. 17 shows a block diagram of a configuration of an X-coordinate detection circuit of the liquid crystal display device integrated with an input device related to the fourth embodiment of this invention.

FIG. 17 shows the block diagram of the X-coordinate detection circuit configuration of the liquid crystal display device integrated with an input device in the 4th embodiment of this invention.

Figure 18:
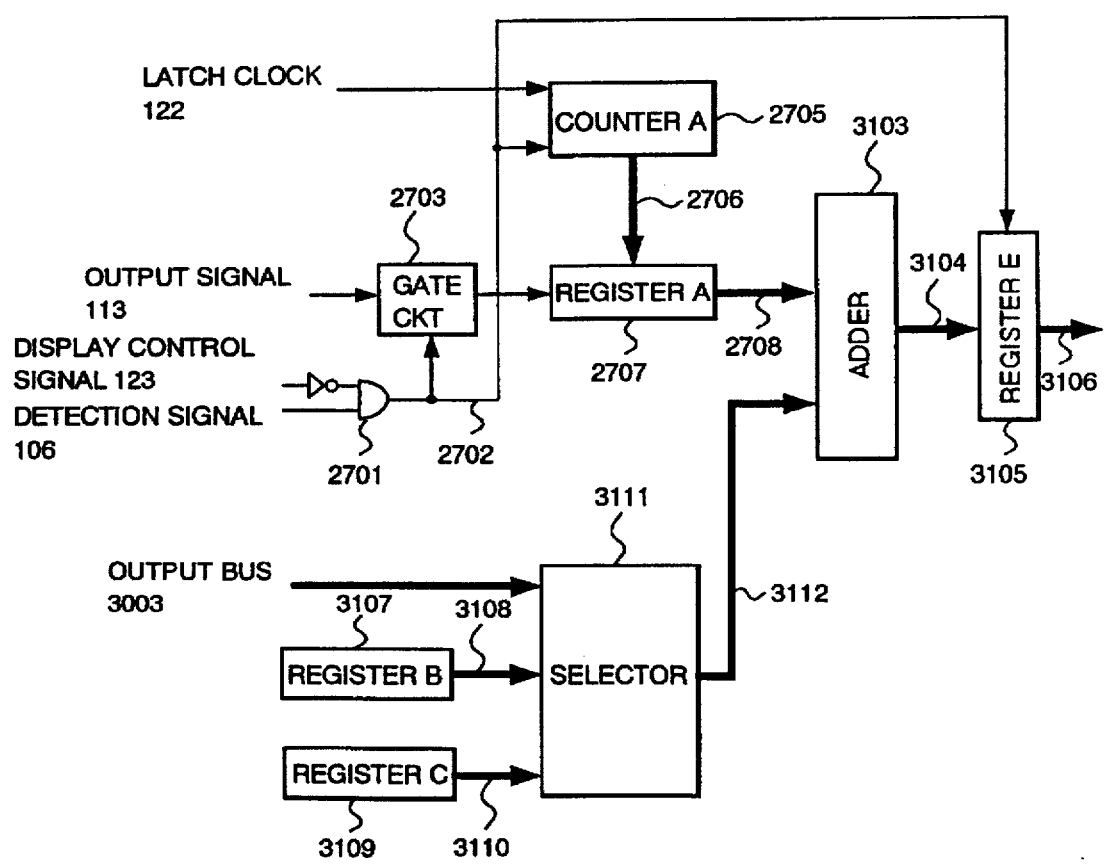
FIG. 18 shows a block diagram of a configuration of a Y-coordinate detection circuit of the liquid crystal display device integrated with an input device related to the fourth embodiment of this invention.

FIG. 18 shows the block diagram of the Y-coordinate detection circuit configuration of the liquid crystal display device integrated with an input device in the 4th embodiment of this invention.

As shown in FIG. 4, the liquid crystal panel 1401 is divided into 4 regions and X electrodes of upper regions are electrically independent of those of lower regions. The liquid crystal panel 1401, which is divided into 4 regions (upper 2 and lower 2 regions), forms a matrix of 160×160 driven by 4 column circuits (each region is driven by a column circuit).

The scan output bus 1402 from the common circuit 103 comprises 80 signal lines. This scan output bus 1402 is connected to each corresponding electrode in the upper and lower regions of the liquid crystal panel 1401. The electrodes make pairs and each pair is connected to the same output of the common circuit like Y1 and Y81, Y2 and Y82, . . . , Y80 and Y160; each electrode is separated by 80 electrodes from the other electrode. With this connection, one common circuit can drive 2 regions (upper and lower).

The control bus 1410 transmits the contro signal for AC driving 120, the shift clock 121, the latch clock 122, and the display control signal 123. The display controller 1409 generates display control signals and outputs them to the control bus 1410, and it outputs display data to the upper region display data bus 1403 and to the lower region display data bus 1403 separately. Next, the X-coordinate detection circuit of this embodiment will be explained using FIG. 17.

The decoder 3001 drives the output b0 from the output bus 3003 into "high" when "1" and "2" are output from the counter 2, which indicates upper regions and drives the output b1 from the output bus 3003 into "high" when "3" and "4" are output from the counter 2, which indicates lower regions. When the counter 2 outputs "1" and "3", which indicates the left region, the decoder 3001 drives the output b0 from the outputs bus 3002 into "high". When the counter 2 outputs "2" and "4", which indicates the right region, the decoder 3001 drives the output b1 from the output bus 3002 into "high". The output from the counter 2 corresponds to the scan pulse width of the subject region.

The selector 3004 outputs data "0" output from the output bus 2511 when b0, one of the outputs from the output bus 3002 is "high" and outputs data "80" output from the output bus 2513 to the output bus 3005 when another output b1 from the output bus 3002 is "high".

Next, the Y-coordinate detection circuit of this embodiment will be explained using FIG. 18.

The register 3107 stores data "0". The register 3109 stores data "80".

The selector 3111 outputs data from the output bus 3108 to the output bus 3112 when b0, one of the outputs from the output bus 3003 is "high" and outputs data from the output bus 3110 to the output bus 3112 when another output b1 from the output bus 3003 is "high".

The adder 3103 adds the data from the output bus 2708 to the data from the output bus 3112 and outputs the result to the output bus 3104. The register 3105, synchronized with the negative edge of the display signal 123, stores data of the output bus 3104. The output bus 3106 transfers the data stored in the register 3105.

(III) Operation of the liquid crystal display device integrated with an input device in this embodiment (1) Display operation Next, the driving scheme by division of a display area into the upper and lower regions adopted for the liquid crystal display device integrated with an input device in this embodiment will be explained briefly.

The common circuit 103 outputs scan voltage for both upper and lower regions to the output bus 1402 concurrently. For example, if a scan voltage is applied to the Y1 electrode, the scan voltage is also applied to the Y81 electrode at the same time. Then, the scan voltage is applied to the next pair of electrodes (Y2 and Y82) according to the next latch clock 122. Each one Y electrode in both upper and lower regions are selected at the same time synchronously with the latch clock 122 sequentially to apply a scan voltage to them.

If Y1 and Y81 electrodes are selected, the column circuits A 601-1 and B 601-2 output gray scale voltage corresponding to Y1 display data. The column circuits C 601-3 and D 601-4 output gray scale voltage corresponding to Y81 display data. The liquid crystal display controller 1409, therefore, outputs Y-electrode display data corresponding to the upper region display data bus 1403 and the lower region display data bus 1404 respectively. Other display operations are the same as those in the first embodiment. The explanation will therefore be omitted here.

(2) Determination of coordinates (a) Control of X coordinate determination

At first, control of X coordinate determination will be explained using FIGS. 17, 18, 30, and 41.

This scan system, as shown in FIG. 41, divides the display area of the liquid crystal panel 1401 into 4 regions (upper-left, upper-right, lower-left, and lower-right) and changes the number of lines to be scanned at the same time with regions. In other words, in region 1 (upper-left) corresponding to X1 to X80 in the upper region, the scan pulse width is set to 1 line. In region 2 (upper-right) corresponding to X81 to X160 in the upper region, the scan pulse width is set to 2 lines. In region 3 (lower-left) corresponding to X1 to X80 in the lower region, the scan pulse width is set to 3 lines. And, in region 4 (lower-right) corresponding to X81 to X160 in the lower region, the scan pulse width is set to 4 lines.

FIG. 30 shows the timing chart of the circuits of this scan system. The scan pulses are shifted a line to the right synchronously with the shift clock 121. The scan pulse width of regions 1, 2, 3, and 4 is 1 clock, 2 clocks, 3 clocks, and 4 clocks, respectively.

Next, the operation of the X-coordinate detection circuit will be explained using FIG. 17.

Among the operations to determine X coordinates, the register A 2504 used to store relative coordinates in regions and, the counter B 2506 used to measure the scan pulse width are the same as those in the first embodiment, so the explanation will be omitted here. This section will therefore explain only the determination of X coordinates according to the identification of a region.

The data of the output bus 2507 of the counter B 2506 is entered to the decoder 3001. The decoder 3001 drives either of the signals b0 and b1 output from the output buses 3002 and 3003 into "high" according to the pulse width of the output signal 111. For example, assume now that the pen 105 points to region 4. Since the scan pulse width in region 4 is 4 clocks, "4" is output to the output bus 2507. The decoder 3001 drives b1 output from the output bus 3002 and b1 output from the output bus 3003 into "high" respectively according to the value of this output bus 2507. The selector 3004 outputs data "80" (a value to be added to a relative coordinate in region 4) to the output bus 3005 according to the data of the output bus 3002. The data from this output bus 3005 is added to the data from the output bus 2505 (relative X coordinate in the subject region) in the adder 2518 to determine the X coordinate.

(b) Control of Y coordinate determination

Next, the operation of the Y-coordinate detection circuit will be explained using FIG. 18.

The Y-coordinate detection register A 2707 functions just like that in the first embodiment. The data stored in the Y-coordinate detection register A 2707 is relative coordinates in both the upper and lower regions in this embodiment. Hereafter, a method to determine Y coordinates from this relative coordinate will be explained.

It is assumed here that the pen 105 points to region 4. In this case, since b1 output from the output bus 3003 of the X-coordinate detection circuit is "high", the selector 3111 outputs data "80" to the output bus 3112. The adder 3103 adds the data of the output bus 2708 to the data of the output bus 3112, and the result is output to the output bus 3104. The data of the output bus 3104 is a Y coordinate, and it is stored in the register 3105 synchronously with the negative edge of the display control signal 123. The data is then output to the output bus 3106. Y coordinates can be determined by adding an initial coordinate value in each region according to a position of the subject region.

Embodiment 5

Next, the 5th embodiment of this invention will be explained using FIGS. 5, 19, 31, and 42.

Figure 31:
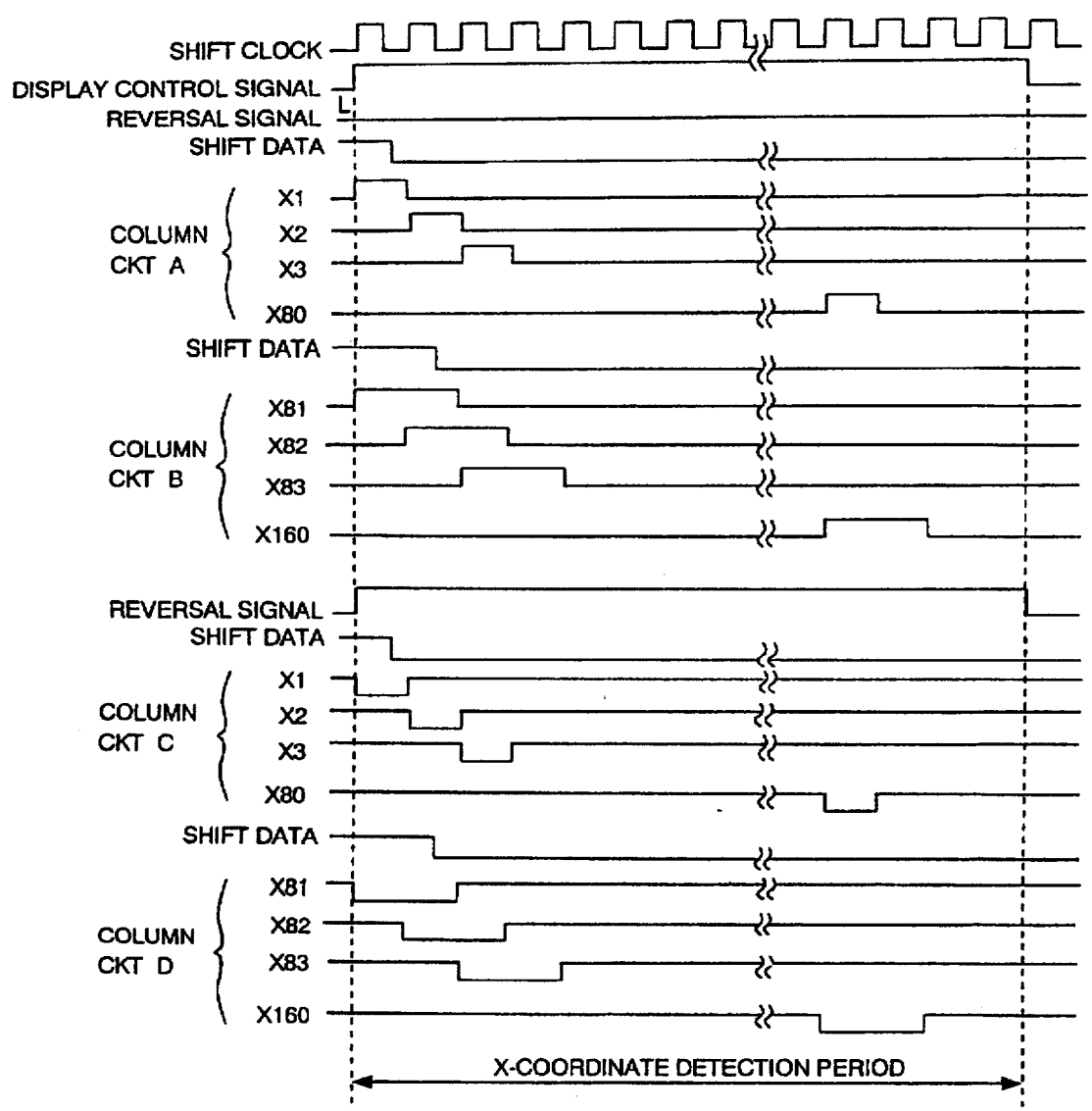
FIG. 31 shows a timing chart of signals from a column circuit for coordinate detection related to the fifth embodiment of this invention.
Figure 42:
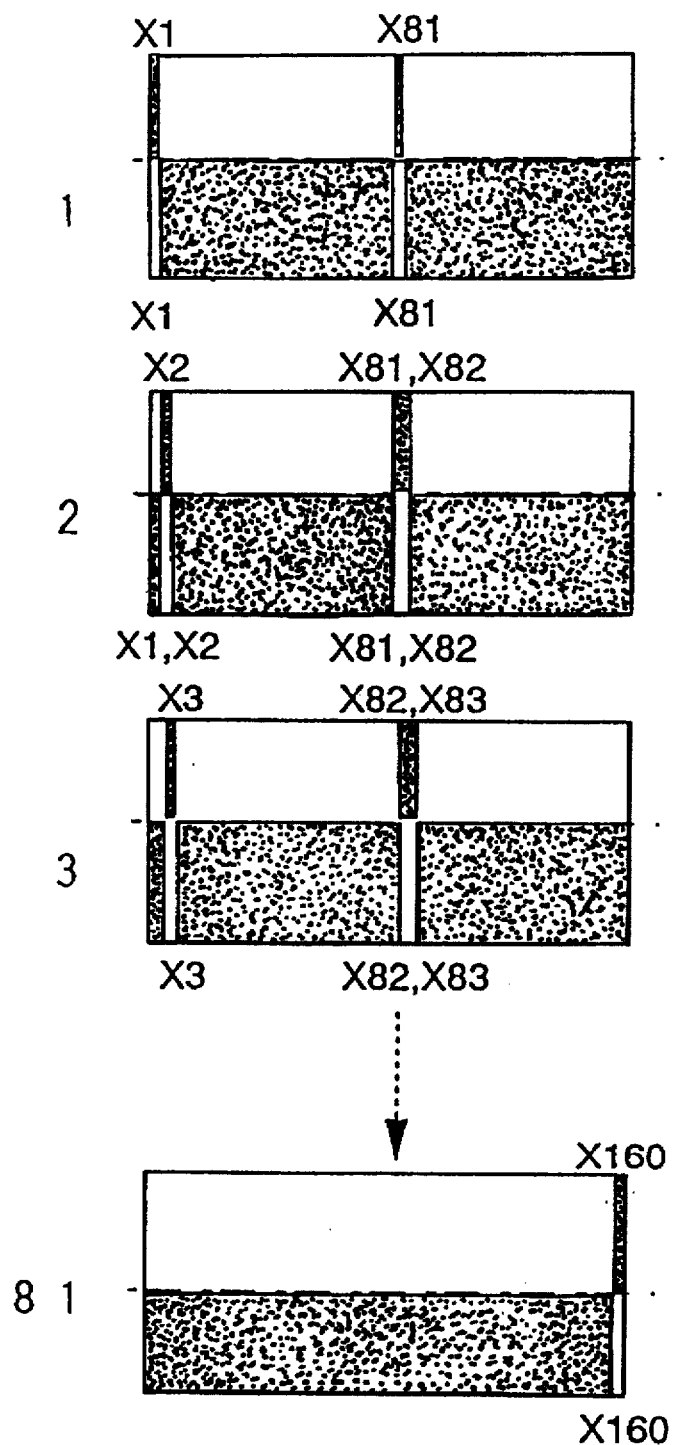
FIG. 42 shows a schematic diagram indicating a relationship between a liquid crystal display panel and a scan type of a liquid crystal display device integrated with an input device of the fifth embodiment of this invention.

At first, FIGS. 31 and 42 are used to explain the features of this embodiment.

FIG. 31 shows the timing chart of the outputs from the column circuit in the 5th embodiment of this invention when a coordinate is detected.

FIG. 42 shows the schematic of the relationship between the liquid crystal display and the scan of the liquid crystal display device integrated with an input device in the 5th embodiment of this invention.

This embodiment is almost the same as the 4th embodiment in configuration, but one type of scan pulses is distinguished from others with the pulse width and the voltage polarity. As explained in the display shown in FIG. 42, the methods in both embodiments 2 and 4 are combined in this embodiment. ON voltage is used to scan the upper regions and OFF voltage is used to scan the lower regions.

Concretely, in the embodiment 4, the scan pulse widths are 1 to 4 clocks. In this embodiment, however, the scan pulse widths are 1 clock and 2 clocks as shown in FIG. 31. The voltage polarities are ON and OFF.

In region 1 corresponding to X1 to X80 electrodes in the upper regions, the scan pulse width is 1 clock and the voltage polarity is ON. In region 2 corresponding to X81 to X160 electrodes in the upper regions, the scan pulse width is 2 clocks and the voltage polarity is ON. In region 3 corresponding to X1 to X80 electrodes in the lower regions, the scan pulse width is 1 clock and the voltage polarity is OFF. In region 4 corresponding to X81 to X160 electrodes in the lower regions, the scan pulse width is 2 clocks and the voltage polarity is OFF. With those combinations of scan pulse width and voltage polarity, determination of X coordinates is controlled.

Next, only the overall circuit configuration and the X-coordinate detection circuit will be explained briefly using FIGS. 5 and 19.

Figure 5:
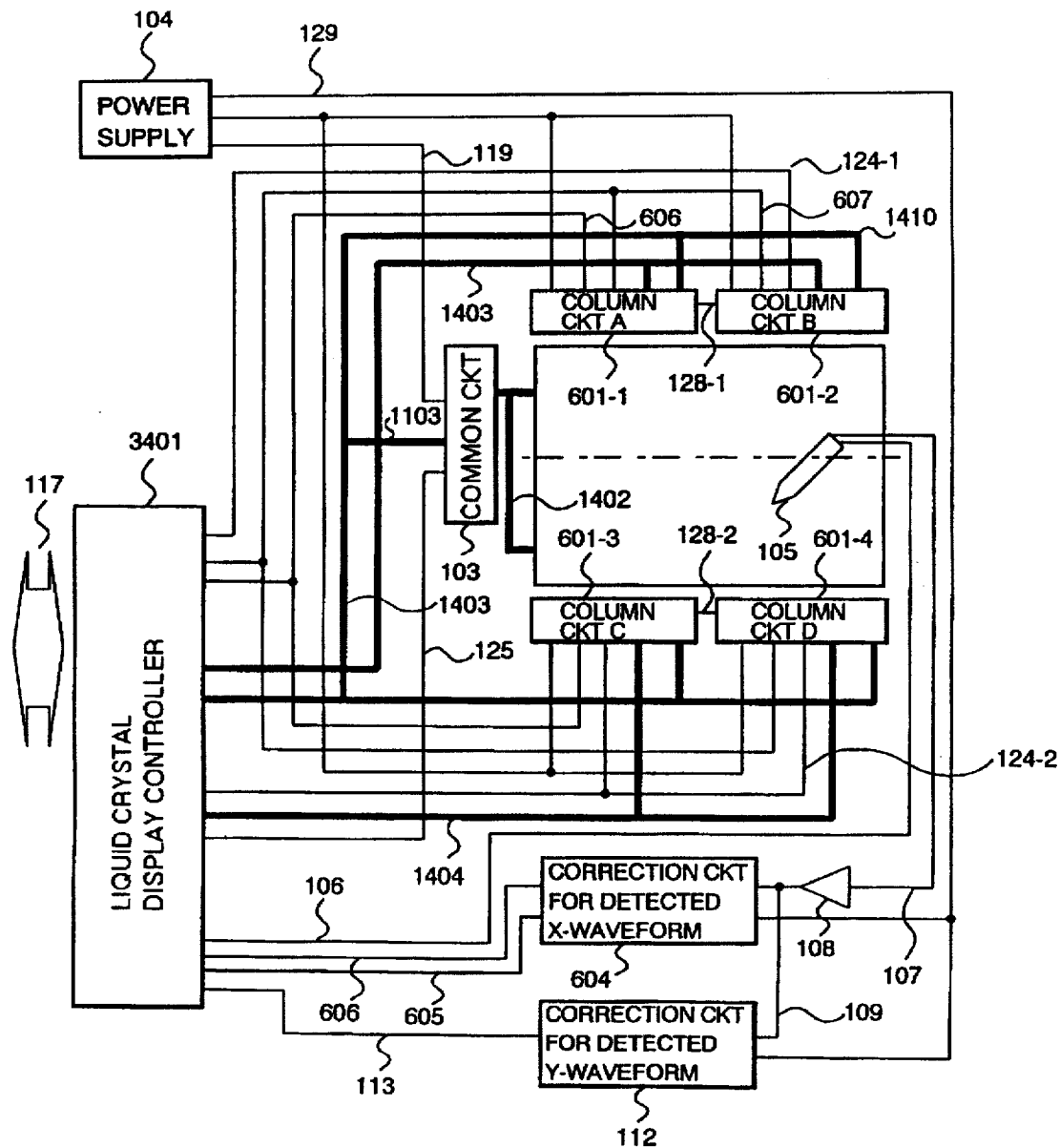
FIG. 5 shows a block diagram of a configuration of a liquid crystal display device integrated with an input device of a fifth embodiment of this invention.

FIG. 5 shows the block diagram of the configuration of the liquid crystal display and the scan system of the liquid crystal display device integrated with an input device in the 5th embodiment of this invention.

Figure 19:
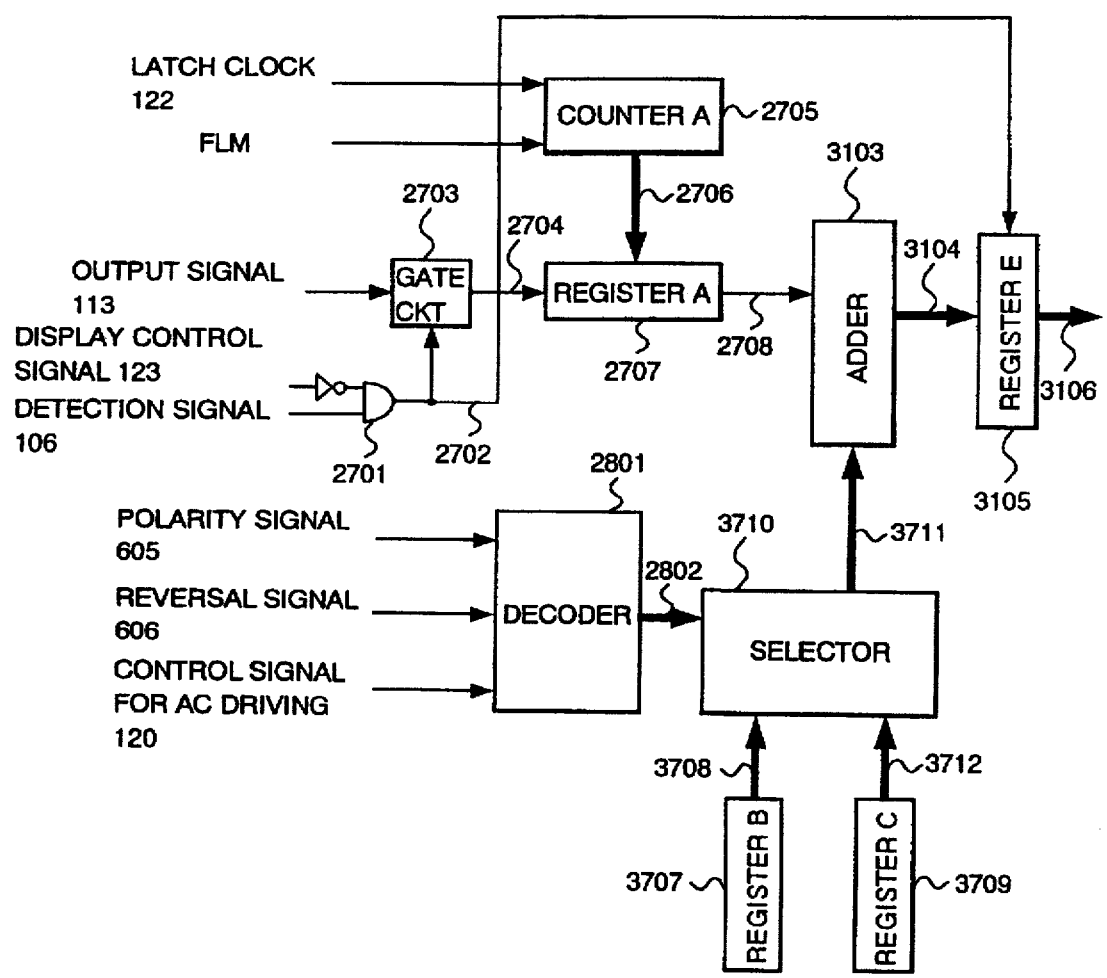
FIG. 19 shows a block diagram of a configuration of a Y-coordinate detection circuit of the liquid crystal display device integrated with an input device related to the fifth embodiment of this invention.

FIG. 19 shows the block diagram of the Y-coordinate detection circuit configuration of the liquid crystal display the liquid crystal display device integrated with an input device in the 5th embodiment of this invention.

In FIG. 5, the liquid crystal display controller 3401 converts and transfers control signals for the upper and lower regions to the column circuits A to D 601 and the common circuit 103, and processes coordinate detection data just like in the embodiment 4.

In FIG. 19, the register B 3707 stores data "0". The register C 3709 stores data "80". The selector 3710 outputs data "0" of the output bus 3708 when the output signal 2802 is "low" and data "80" of the output bus 3712 when the output signal 2802 is "high", to the output bus 3711.

The display operation in this embodiment is the same as that in the 4th embodiment, so the explanation is omitted here.

The methods to determine X coordinates and relative Y coordinates in regions are also the same as those in the 4th embodiment, so the explanation is omitted here.

In this section, the operation of the Y-coordinate detection circuit in this embodiment will be explained using FIG. 19, focusing on the identification of the subject region.

The relative Y coordinate stored in the register A 2707 is output to the output bus 2708.

The decoder 2801 outputs the signal 2802 used to identify whether the subject region is in the upper or lower region according to the polarity signal 605, the reversal signal 606, and the control signal for AC driving 120 obtained when an X coordinate is detected.

In this case, if the pen 105 points to a lower region, the polarity signal 605 becomes "low", the reversal signal 606 becomes "low", and the control signal for AC driving 120 becomes "high". Thus, the output signal 2802 becomes "high". And, the selector 3710 interprets data of the output signal 2802 to output "80" (a value to be added to relative Y coordinates in regions 3 and 4) to the output bus 3711. The adder 3103 adds the data of the output bus 3711 to the data of the output bus 2708 to calculate the Y coordinate and output the result to the output bus 3104. The Y coordinate value from the output bus 3104 is stored in the register 3105, then transferred to the output bus 3106.

Embodiment 6

This section will explain the 6th embodiment of this invention using FIGS. 6, 20, 21, 32, and 43.

At first, the features of this embodiment will be explained using FIGS. 6, 32, and 43.

Figure 6:
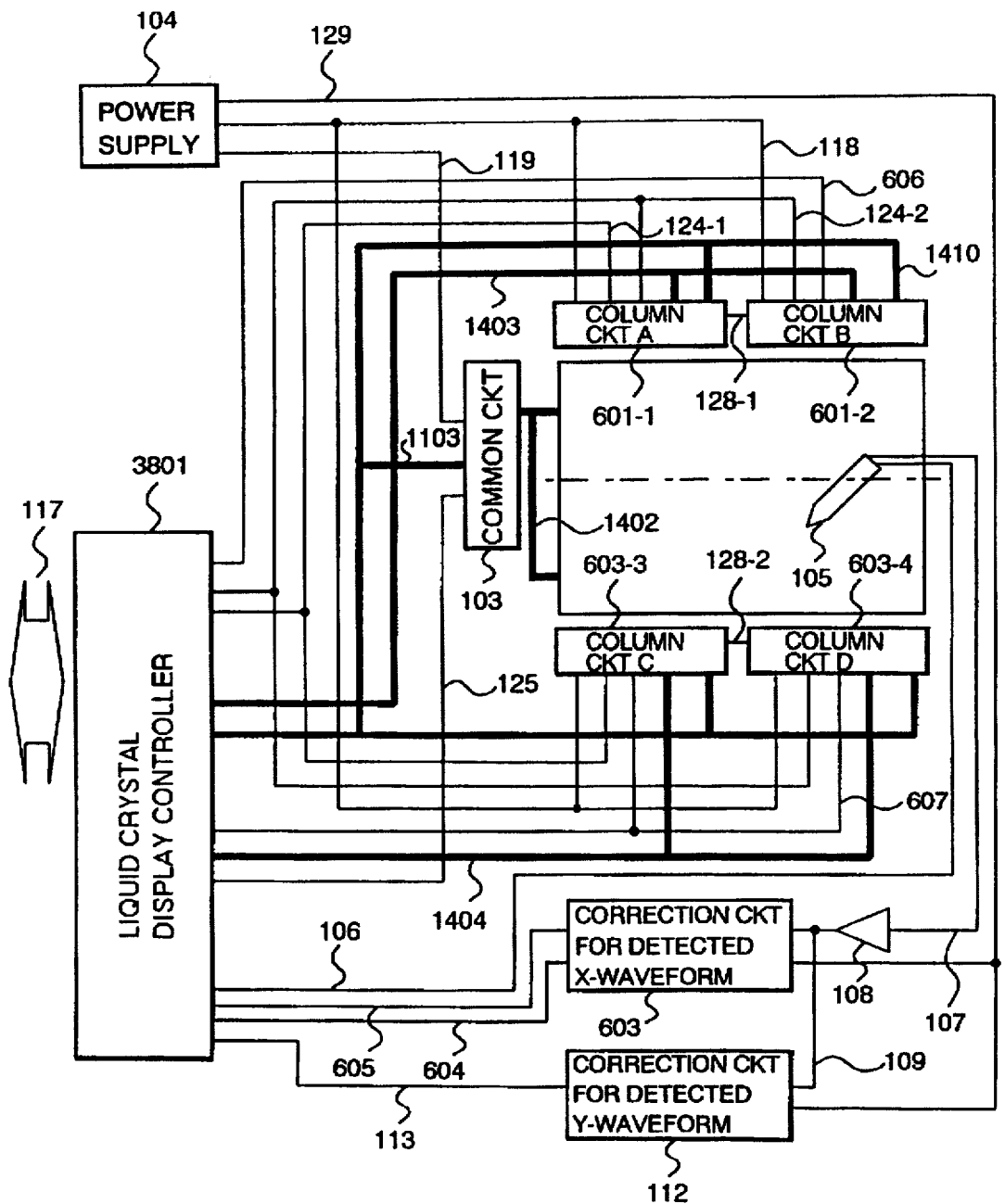
FIG. 6 shows a block diagram of a configuration of a liquid crystal display device integrated with an input device of a sixth embodiment of this invention.

FIG. 6 shows the block diagram of the configuration of the liquid crystal display and the scan system of the liquid crystal display device integrated with an input device in the 6th embodiment of this invention.

Figure 32:
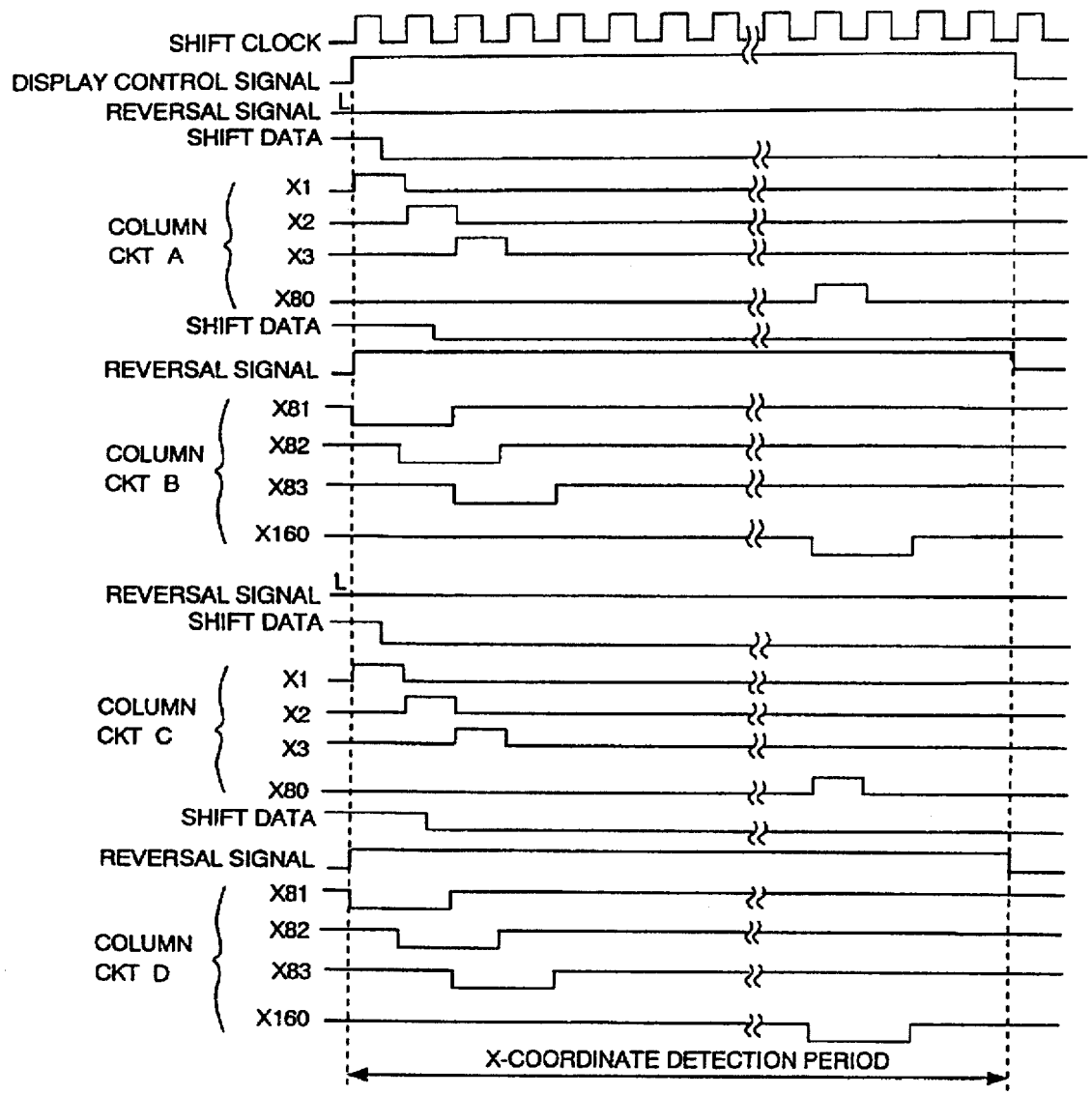
FIG. 32 shows a timing chart of signals from a column circuit for coordinate detection related to the sixth embodiment of this invention.

FIG. 32 shows the timing chart of the outputs from the column circuit in the 6th embodiment of this invention when a coordinate is detected.

Figure 43:
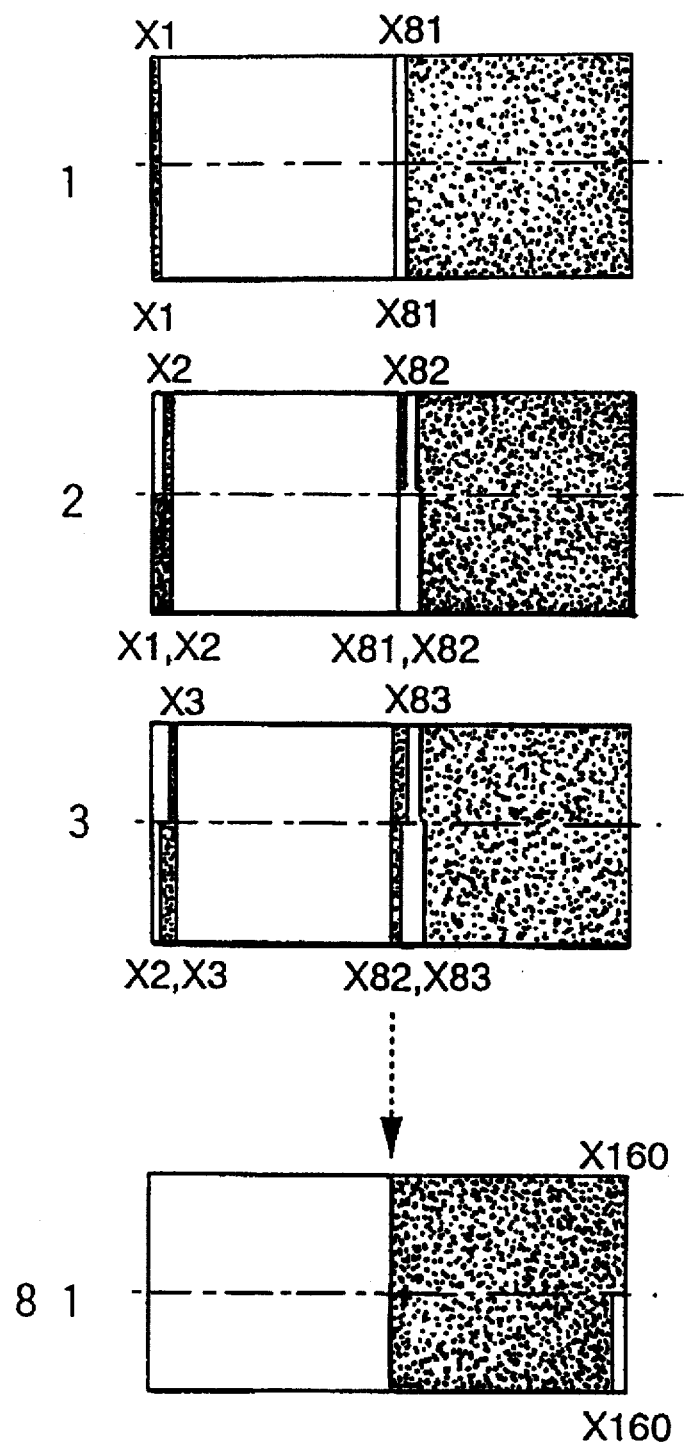
FIG. 43 shows a schematic diagram indicating a relationship between a liquid crystal display panel and a scan type of a liquid crystal display device integrated with an input device of the sixth embodiment of this invention.

FIG. 43 shows the schematic of the relationship between the liquid crystal display and the scan of the liquid crystal display of the liquid crystal display device integrated with an input device in the 6th embodiment of this invention.

Just like the 5th embodiment, this embodiment is also almost the same as the 4th embodiment in configuration. The scan pulse width and the voltage polarity are used to identify the type of scan pulses. However, as explained in the display shown in FIG. 43, locations of a combination of the pulse width and the voltage polarity of scan pulses in this embodiment differs from those in the 5th embodiment. ON voltage is used to scan the left part of the panel and OFF voltage is used to scan the right part of the panel.

Concretely, in the 4th embodiment, the scan pulse widths are 1 to 4 clocks. In this embodiment, however, the scan pulse widths are 1 and 2 clocks, and the voltage polarity is ON and OFF just like in the 5th embodiment. In this embodiment, locations of a combination of the pulse width and the voltage polarity differ from those in the 5th embodiment. In region 1 corresponding to X1 to X80 electrodes in upper regions, the scan pulse width is 1 clock and the voltage polarity is ON. In region 2 corresponding to X81 to X160 in upper regions, the scan pulse width is 1 clock and the voltage polarity is OFF. In region 3 corresponding to X1 to X80 in one lower regions, the scan pulse width is 2 clocks and the voltage polarity is ON. In region 4 corresponding to X81 to X160 in lower regions, the scan pulse width is 2 clocks and the voltage polarity is OFF.

Next, only the overall circuit configuration and the X-coordinate detection circuit will be explained briefly using FIGS. 6 and 21.

Figure 21:
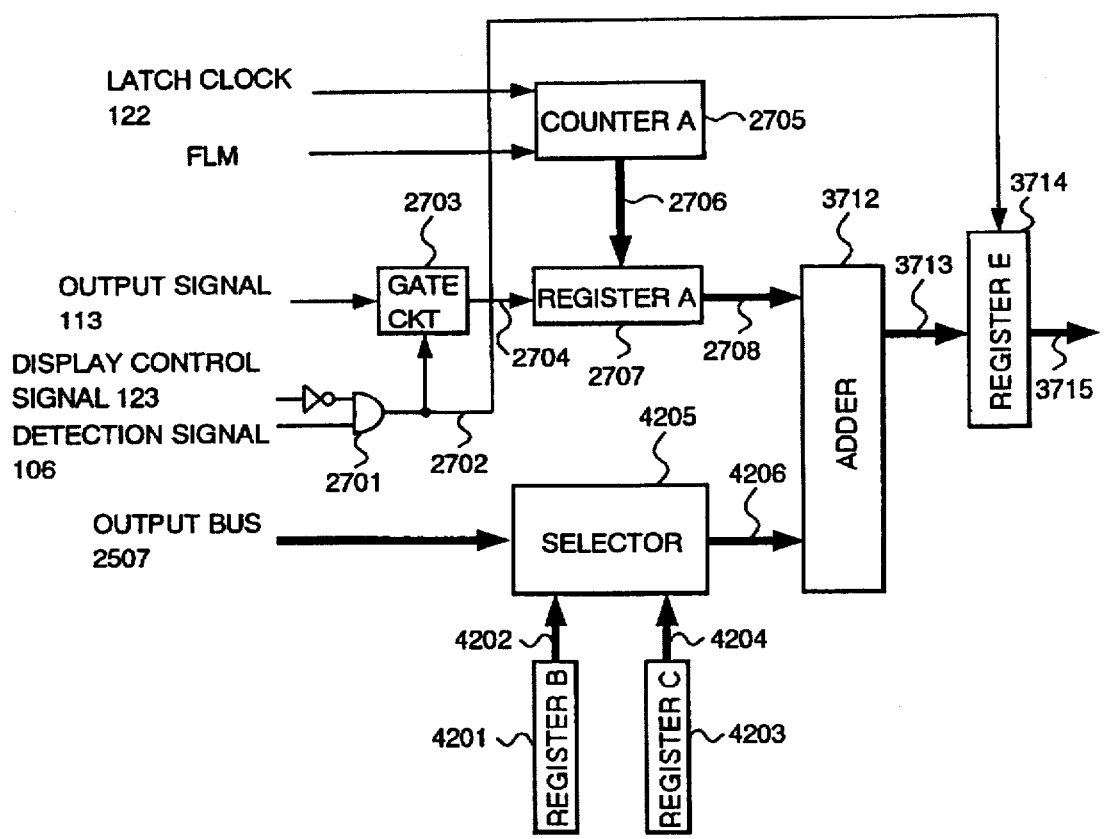
FIG. 21 shows a block diagram of a configuration of a Y-coordinate detection circuit of the liquid crystal display device integrated with an input device related to the sixth embodiment of this invention.

FIG. 21 shows the block diagram of the Y-coordinate detection circuit configuration of the liquid crystal display device integrated with an input device in the 6th embodiment of this invention.

In FIG. 6, the liquid crystal display controller 3801 converts and transfers control signals for the upper and lower regions to the column circuit 601 and the common circuit 103, and processes coordinate detection data.

In FIG. 21, the register B 4201 stores data "0". The register C 4203 stores data "80". The selector 4205 outputs data "0" from the output bus 4202 to the output bus 4206 when b0 output from the output bus 2507 is "high" and data "80" from the output bus 4204 to the output bus 4206 when b1 output from the 2507 is "high".

The display operation in this embodiment is the same as that in the 4th embodiment, so the explanation is omitted here.

How to determine X coordinates, and how to detect relative Y coordinates in regions are also the same as those in the 4th embodiment, so the explanation is omitted here.

Figure 20:
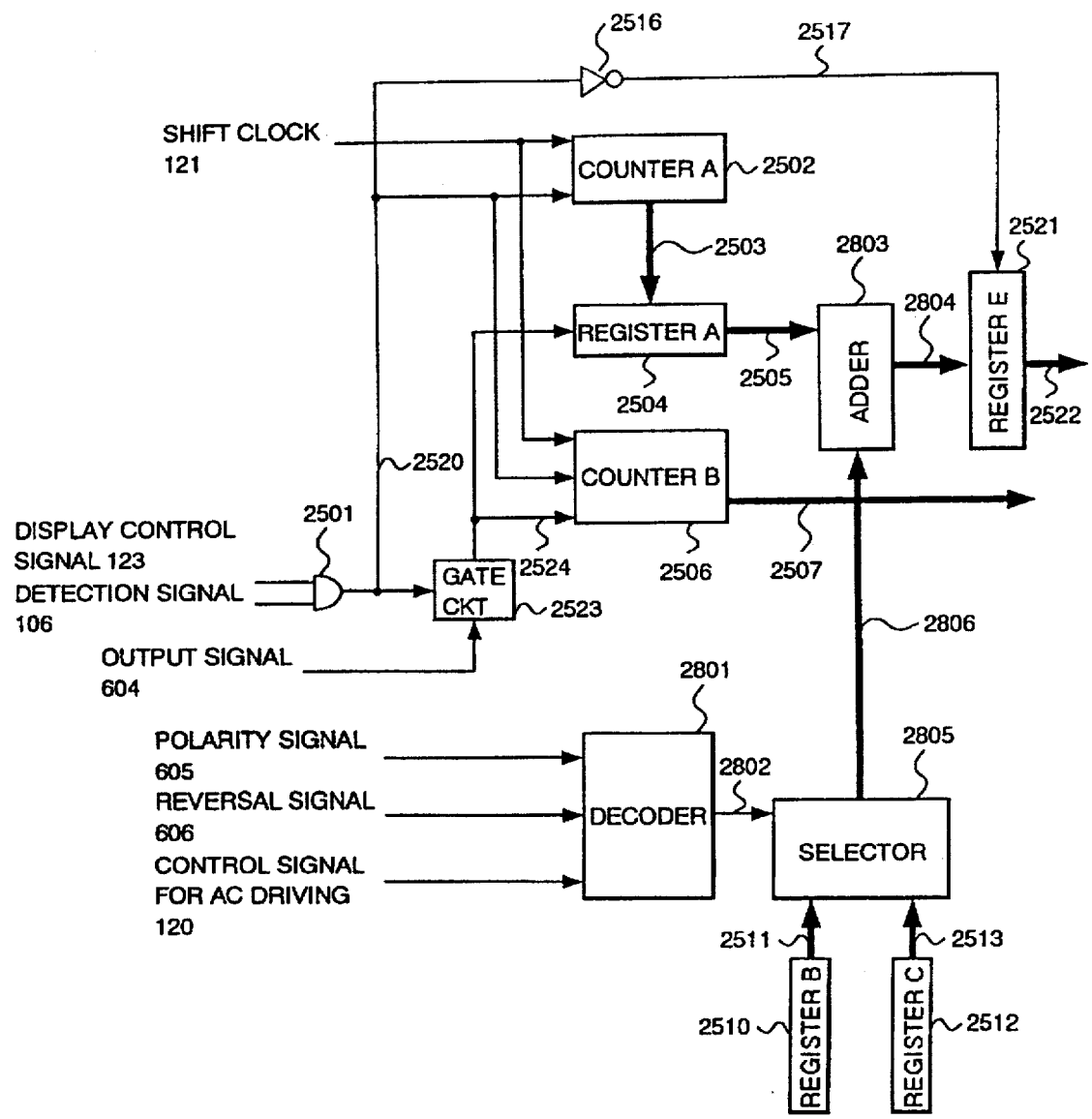
FIG. 20 shows a block diagram of a configuration of an X-coordinate detection circuit of the liquid crystal display device integrated with an input device related to the sixth embodiment of this invention.

This section will explain the operation of the Y-coordinate detection circuit using FIGS. 20 and 21, focusing on the identification of the subject region.

FIG. 20 shows the block diagram of the X-coordinate detection circuit configuration of the liquid crystal display device integrated with an input device in the 6th embodiment of this invention.

The pulse width data of the output signal 604 obtained in the X-coordinate detection circuit shown in FIG. 20 is transferred to the Y-coordinate detection circuit through the output bus 2507.

For example, assume now that the pen 105 points to one of the lower regions. In this case, the output signal 2507 becomes "2", which indicates the number of clocks corresponding to the scan width of the subject lower region. And, the selector 4205 interprets data "2" of the output signal 2507 to output data "80" to the output bus 4206. The adder 3712 adds the data "80" (a value to be added to the relative Y coordinate in regions 3 and 4) from the output bus 4206 to the data from the output bus 2708, which is a relative Y coordinate, to determine the Y coordinate, and then it outputs the result to the output bus 3713. The data from this output bus 3713 is stored in the register E 3714 as a Y coordinate synchronously with the negative edge of the display control signal 123, then output to the output bus 3715.

As explained above, coordinates can be determined in the liquid crystal display device integrated with an input device, which adopts the driving scheme by division of a display area into upper and lower regions.

Embodiment 7

Next, the 7th embodiment of this invention will be explained using FIGS. 7, 22, 25, and 33.

Figure 7:
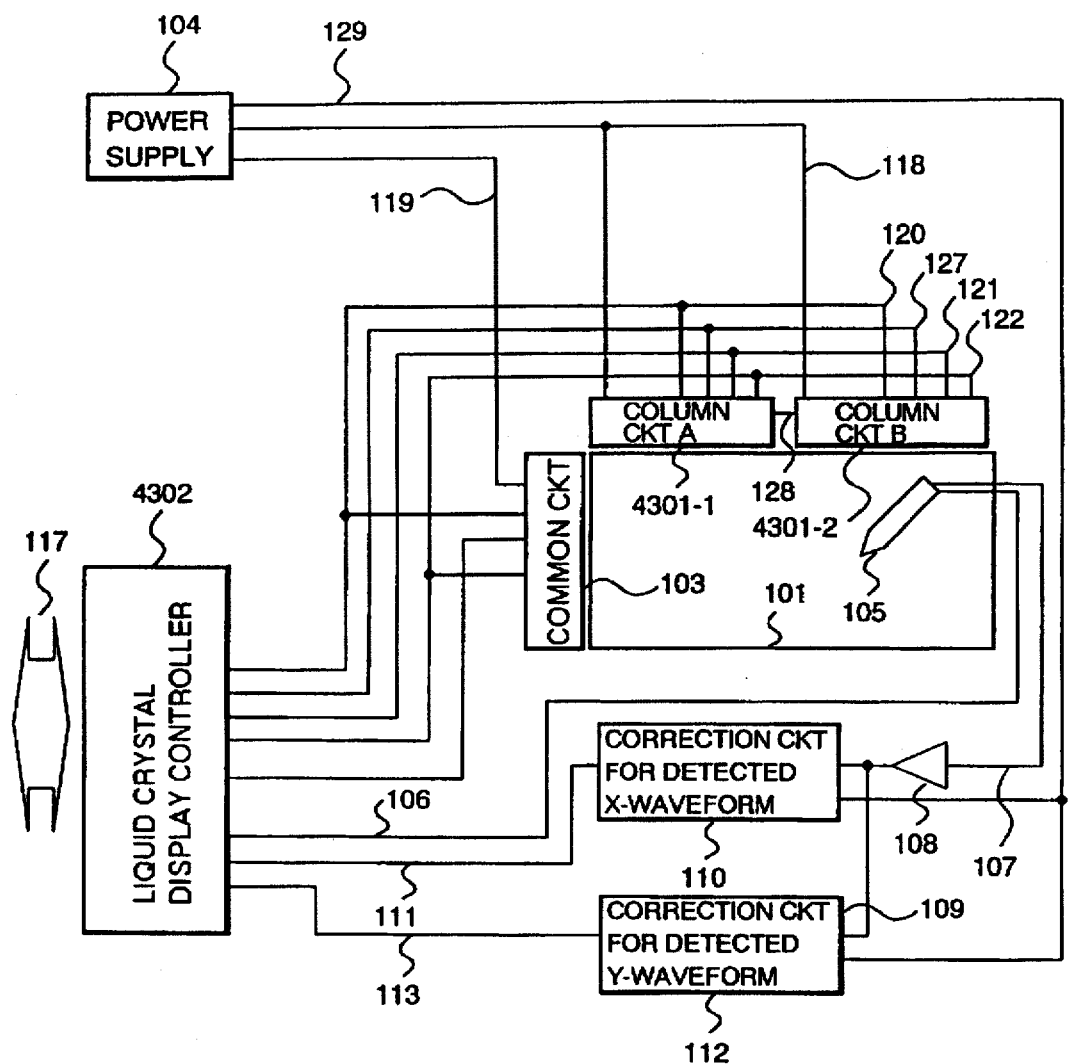
FIG. 7 shows a block diagram of a configuration of a liquid crystal display device integrated with an input device of a seventh embodiment of this invention.

FIG. 7 shows the block diagram of the configuration of the liquid crystal display device integrated with an input device in the 7th embodiment of this invention.

Figure 22:
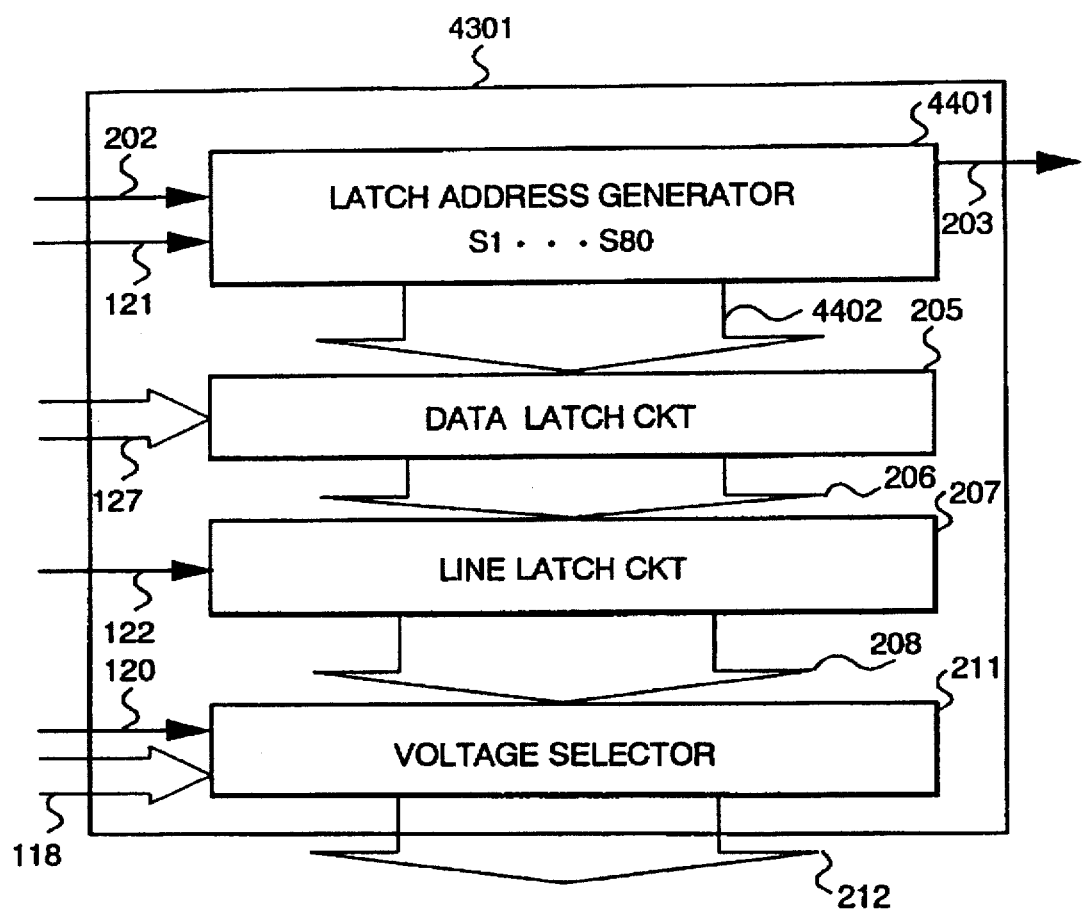
FIG. 22 shows a block diagram of a configuration of a column circuit related to the seventh embodiment of this invention.

FIG. 22 shows the block diagram of the column circuit configuration in the 7th embodiment of this invention.

One of the features of this embodiment is that the column circuit configuration differs from that of the liquid crystal display device integrated with an input device in the previous embodiments of this invention.

In FIG. 7, the liquid crystal display controller 4302 converts control signals and display data, and transfers them to the column circuits A and B 4301 and the common circuit 103.

This section will explain the configuration of the column circuit in this embodiment using FIG. 22.

In FIG. 22, the latch address generator 4401 drives outputs S1 to S80 into "high" sequentially and synchronously with the shift clock 121. The column circuits A and B 4301 store display data synchronously with the shift clock 121, and outputs a voltage according to the data from the output bus 208 and the control signal for AC driving 120 synchronously with the latch clock 122. Unlike the column circuit shown in FIG. 11, the column circuit shown in FIG. 22 cannot output scan pulses synchronously with the latch clock 122.

In a liquid crystal display device integrated with an input device that uses such the column circuit 4301, a mechanism that differs from that in the said embodiments is required to generate scan pulses. Such a mechanism will be explained below using FIGS. 7, 25, and 33.

Figure 33:
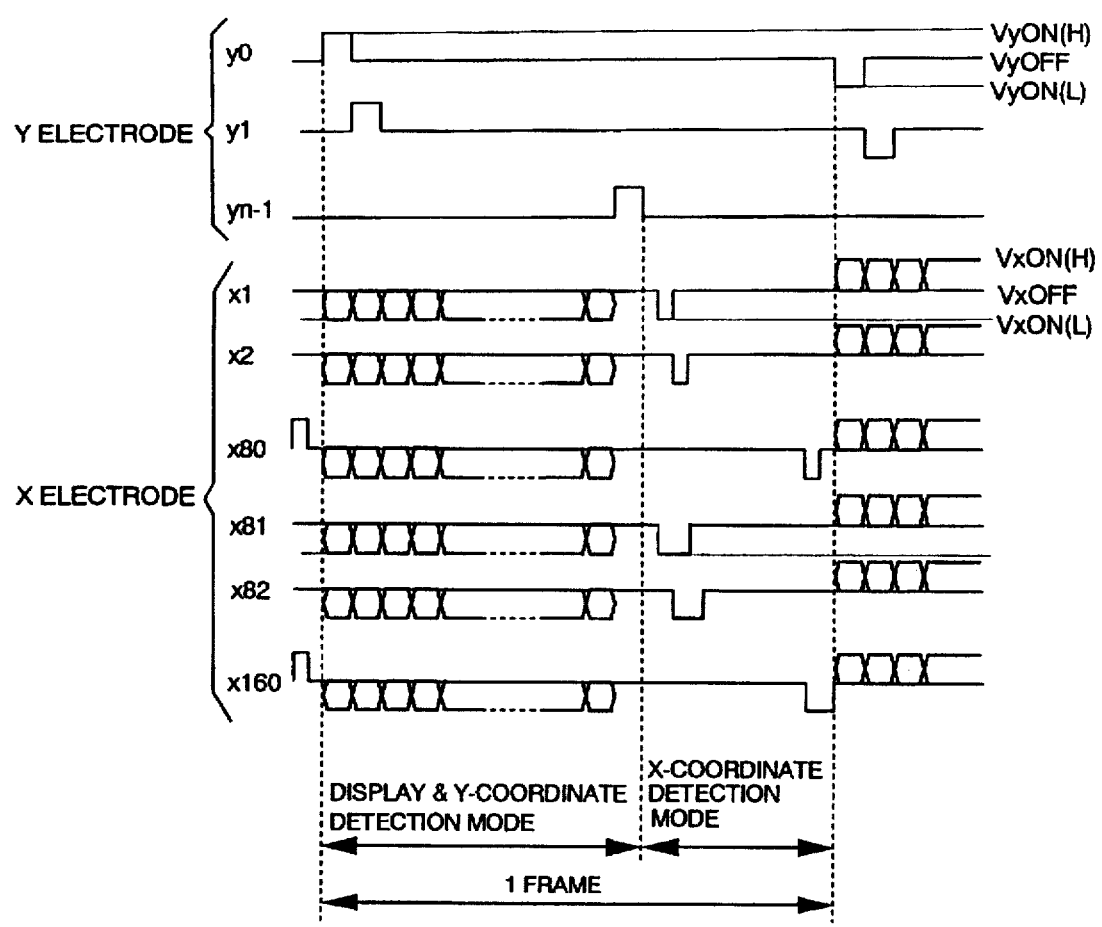
FIG. 33 shows a timing chart of signals applied on X and Y electrodes related to the seventh embodiment of this invention.

FIG. 33 shows the timing chart of the outputs from the X and Y electrodes in the 7th embodiment of this invention. To make the scanning as shown in FIG. 25, the display controller shown in FIG. 7 generates display data for applying ON voltage on X1 and X81 at first, then enters the display data to the column circuit during an X coordinate detection period as shown in FIG. 33. Then, the display controller 4302 generates display data for applying ON voltage on X2 and X82, and enters the display data to the column circuit. In the same way, the display controller 4302 repeats generating display data corresponding to the subject scan pattern. With this, a conventional column circuit can also be used for scanning. And, the display controller 4302 shown in FIG. 7 generates scan pulses shown in FIG. 33 during the said X coordinate detection mode period and outputs them to the column circuit 4301. Thus, the scan system shown in FIG. 25 can be realized even when the column circuit 4301 is used. The counter in the the X coordinate detection circuit provided in the liquid crystal display controller operates synchronized with the latch clock 122.

Embodiment 8

Next, the 8th embodiment of this invention will be explained using FIGS. 8, 34, and 44.

Figure 34:
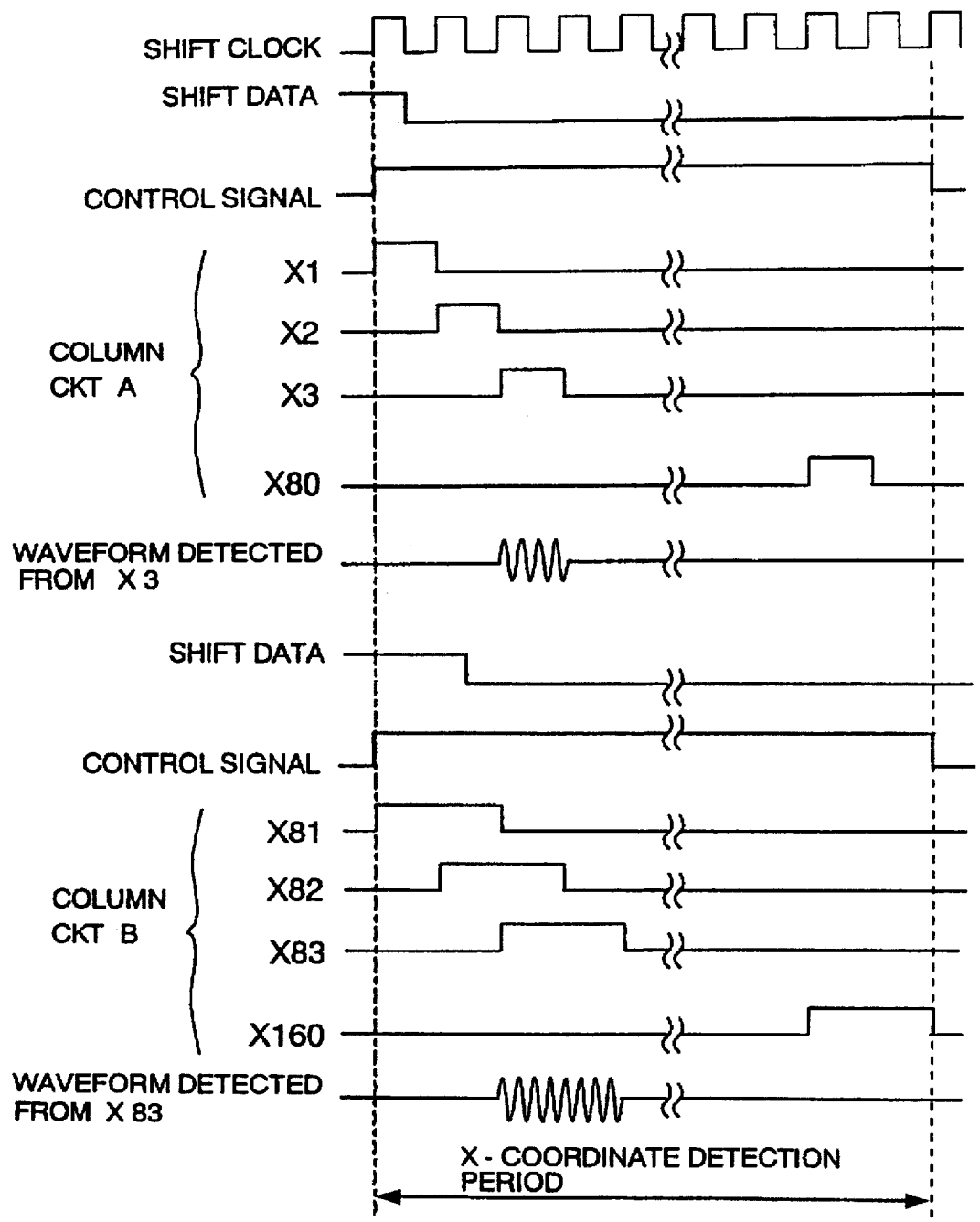
FIG. 34 shows a timing chart of signals from a column circuit for coordinate detection related to the eighth embodiment of this invention.

FIG. 34 shows the timing chart of the outputs from the column circuit in the 8th embodiment of this invention.

In the previous embodiments, pulse-like waveforms are used as detection waveforms. One of the features of this embodiment is using high frequency pulses as detection waveforms as shown in FIG. 34.

With this, coordinates can be determined without being disturbed by noise when a filter is used to eliminate low frequency waves from waveforms.

At first, the overall configuration of the liquid crystal display device integrated with an input device in this embodiment will be explained below using FIG. 8.

Figure 8:
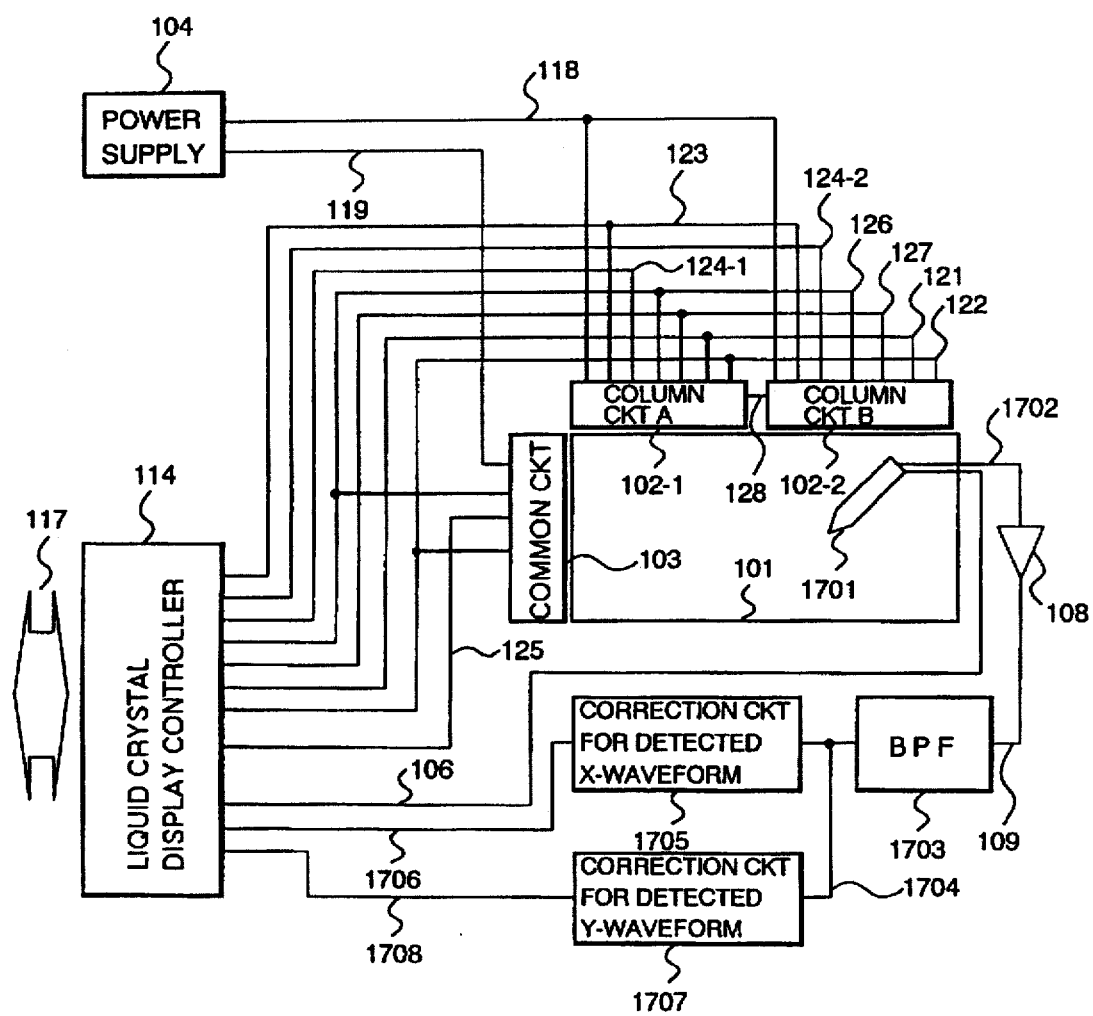
FIG. 8 shows a block diagram of a configuration of a liquid crystal display device integrated with an input device of a eighth embodiment of this invention.

FIG. 8 shows the block diagram of the configuration of the liquid crystal display device integrated with an input device in the 8th embodiment of this invention.

The pen 1701 shown in FIG. 8 uses the electrostatic coupling system. This is the same as in the said embodiments, but the pen 1701 in this embodiment has an internal coil. The band pass filter 1703 shown in FIG. 8 is a filter circuit that passes the signals only in the specified frequency band.

The correction circuit for detected X-waveform 1705 generates digital pulses from the output signal 1704 of the AC band pass filter 1703. The correction circuit for detected Y-waveform 1707 generates digital pulses from the output signal 1704 of the AC band pass filter 1703.

Next, the structure of the pen in this embodiment will be explained below using FIG. 44.

Figure 44:
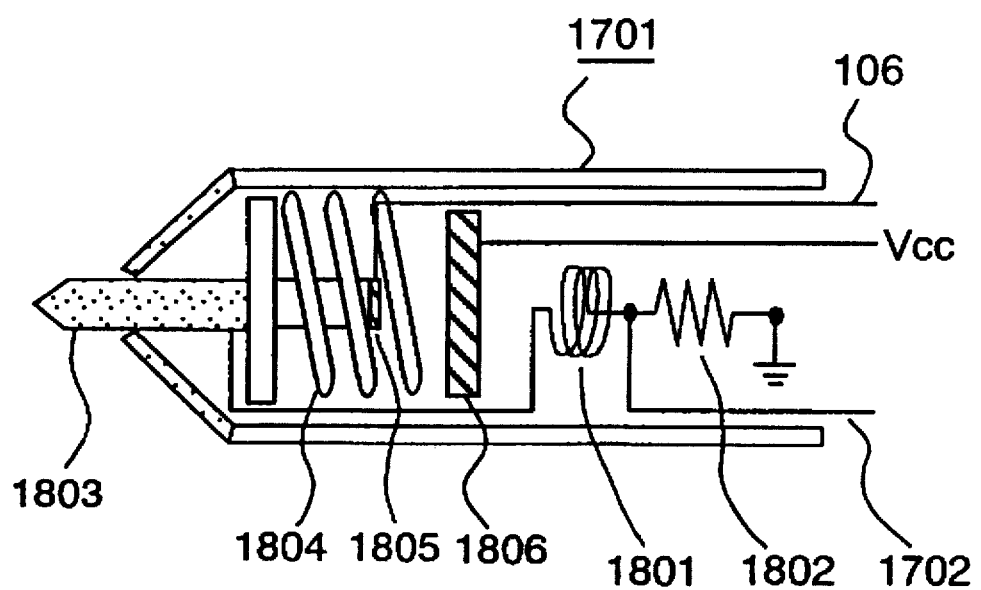
FIG. 44 shows a sectional view of a pen.

FIG. 44 shows the cross section of the pen structure. In the pen 1701, the pen tip 1803 is intended for electrostatic coupling, and a coil 1801 and a resistor 1802 are connected as shown in FIG. 44.

When the pen 1701 touches the liquid crystal panel 101, the pen tip 1803 slides into the inside of the pen 1701 while repelling against the force of the spring 1804. Then, the contact 1805 of the switch 1 touches the other contact 1806 of the switch 1, so that the level of the detection signal 106 changes from "high" to "low". With this detection signal 106, the liquid crystal display controller 114 can recognize that the pen tip 1803 has touched the liquid crystal panel 101.

If the potential of the electrode electrostatically coupled with the pen tip 1803 changes, then the potential of the pen tip 1803 also changes. This potential change of the pen tip 1803 oscillates when the signal passes through the coil 1801, then the signal is output as the coordinate detection signal 1702.

Next, control of the X-coordinate determination in this embodiment will be explained using FIG. 34.

Assume now that the pen 1701 points to "3" on an X coordinate.

As shown in FIG. 34, if scan pulses are applied to the X3 electrode electrostically coupled with the pen tip 1803, then the potential of the pen tip 1803 shown in FIG. 44 changes, and the output 1702 is obtained through the coil 1801. Therefore, while a select voltage is applied to the X3 electrode, the AC-converted waveform is obtained for X3 as shown in FIG. 34. The oscillation frequency f can be determined from the electrostatic coupling capacity C and the reactance L of the coil 1801 using the following formula.

$$f = 1/(2\pi\sqrt{LC})$$

This detected waveform 1702 is amplified in the buffer circuit 108 shown in FIG. 8, and output as the signal 109. If this output signal 109 is passed through a band pass filter 1703 that passes only the signals in this oscillation frequency f band, eliminating signals at other frequencies, then it can be output as the signal 1704. This output signal 1704 is converted into rectangular pulses in the correction circuit for detected X-waveform 170B and output to the output bus 1706. The correction circuit for detected Y-waveform 1707 also functions in the same way when a Y coordinate is detected.

As an example of the correction circuit for detected X-waveform used to convert signals into rectangular pulses, there is a frequency–voltage circuit.

To realize this embodiment, it is only needed to change the coordinate detection system of the liquid crystal display device integrated with an input device in the previous embodiments 1 to 7 to the one provided with a pen 1701, a band pass filter 1703, a correction circuit for detected X-waveform 1705, and a correction circuit for detected Y-waveform 1707.

Embodiment 9

Hereafter, the 9th embodiment of this invention will be explained using FIGS. 9, 23, and 35.

One of the features of this embodiment is to suppress noise while coordinates are determined by changing the polarity of the control signal for AC driving with a frame period when the pen points to the liquid crystal panel.

At first, the overall configuration of the liquid crystal display device integrated with an input device and a selector for the control signal for AC driving in this embodiment will be explained using FIGS. 9 and 23.

Figure 9:
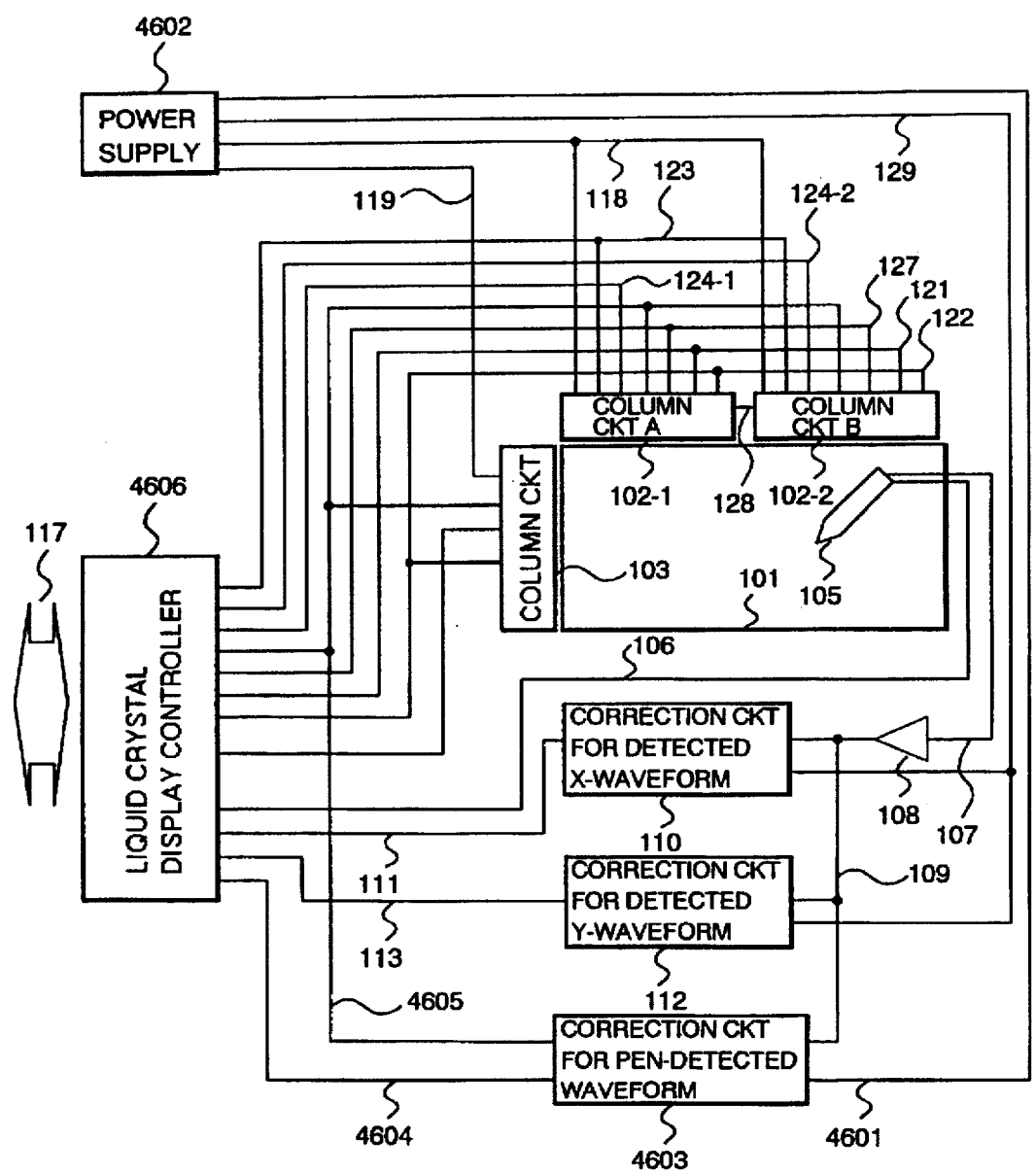
FIG. 9 shows a block diagram of a configuration of a liquid crystal display device integrated with an input device of a ninth embodiment of this invention.
Figure 10:
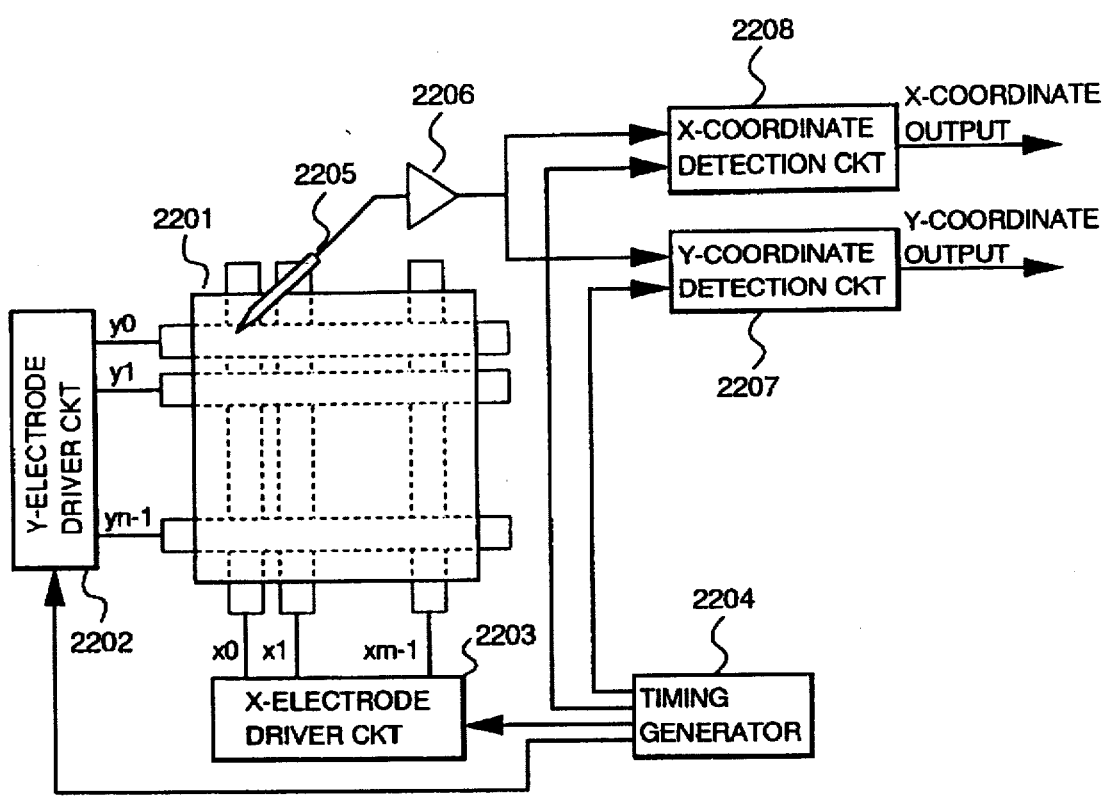
FIG. 10 shows a block diagram of a configuration of a conventional tablet integrated with a display device.

FIG. 9 shows the block diagram of the configuration of the liquid crystal display device integrated with an input device in the 9th embodiment of this invention.

Figure 23:
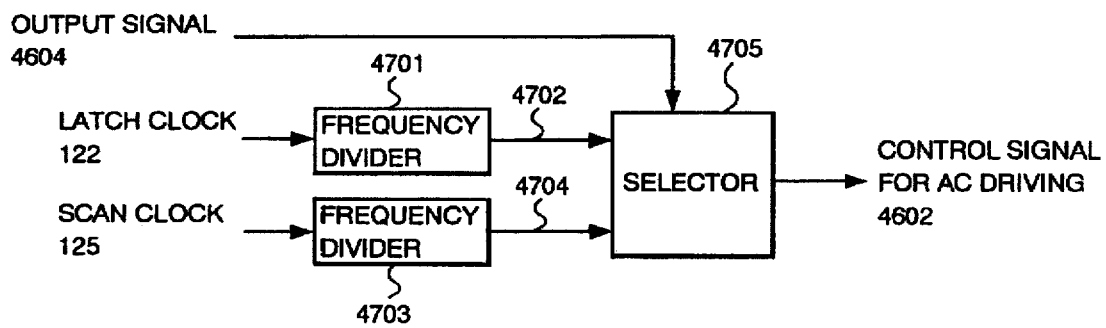
FIG. 23 shows a block diagram of a control signal selecting circuit for AC driving, which is incorporated in a liquid crystal controller related to the ninth embodiment of this invention.

FIG. 23 shows the block diagram of a selector for the control signals for AC driving incorporated in the liquid crystal display controller in the 9th embodiment of this invention.

Unlike other embodiments, the correction circuit for pen-detected waveform 4603 is connected in parallel to the correction circuit for detected X-waveform 110 and the correction circuit for detected Y-waveform 112.

The selector for the control signals for AC driving shown in FIG. 23 is incorporated in the liquid crystal display controller 4606. The selector comprises a frequency divider 4701 for dividing the latch clock 122; a frequency divider 4703 for dividing the scan clock 125; a selector 4705 for changing the control signals for AC driving 4602 according to the value of the output signal 4604.

Next, changing of the control signals for AC driving in this embodiment will be explained below using FIG. 35.

Figure 35:
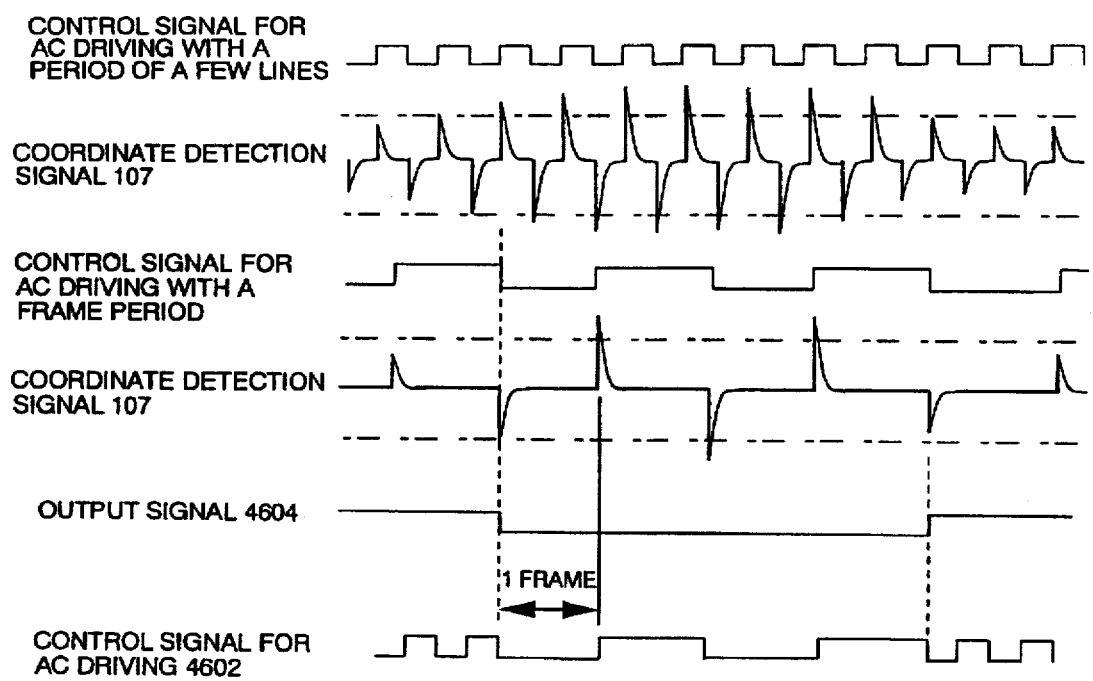
FIG. 35 shows a timing chart for changing signals for AC driving in the ninth embodiment of this invention.

FIG. 35 shows the timing chart of the signals related to changing of the control signals for AC driving in the 9th embodiment of this invention.

As shown at the top of FIG. 35, a period of conversion of signals into alternating ones is usually a few lines. If the pen 105 is brought closely to the liquid crystal panel 101, then spike-like waveforms can be detected as the coordinate detection signal 107 at transitional points as shown in FIG. 35. The voltage of the detected waveform 107 is a function of the distance between the liquid crystal panel 101 and the pen 105. The shorter the distance becomes, the more the voltage rises. Therefore, this relationship can be used to set the AC driving period to be a frame period so that the influence of spike-like waveform can be minimized, by judging the device is in the input status when a voltage is detected for indicating that the distance has becomes shorter than a certain value. This is the conception of this invention.

The conception will be explained below more in detail.

As explained above, if the pen 105 approaches the liquid crystal panel 101, spike-like waveforms can be detected at transitional points as the coordinate detection signal 107. This coordinate detection signal 107 is amplified in the buffer circuit 108 and output as the signal 109. The output signal 109 is entered to the correction circuit for pen-detected waveform 4603 and output as the signal 4604. This output signal 4604 is driven into "low" when it exceeds the reference voltage 4601 generated in the power supply 4602.

If the output signal 4604 exceeds the reference voltage 4601 in synchronism with the control signal for AC driving, it may be judged that the pen 105 is brought closely to the liquid crystal panel 101 within a certain distance.

The output signal 4604 is entered to the display controller 4606. It is then entered to the selector for the control signals for AC driving provided in this display controller 4606, and to start the processing to be executed when the pen 105 is brought closely to the liquid crystal panel 101.

As shown in FIG. 35, the control signal for AC driving having a period of a few scanning lines is generated in the divider 4701 shown in FIG. 23, which divides the line clock 122 in units of scanning lines, and output as the signal 4702. On the other hand, the control signal for AC driving having a period of a frame period is generated in the divider 4703 that halves the scan clock 125 in frequency, and output as the signal 4704. This selection of output signals is made in the selector 4705 and controlled by the output signal 4604. In other words, when the pen 105 is brought closely to the liquid crystal panel and the reference voltage 4601 is exceeded, the output signal 4604 is driven into "high" and the control signal for AC driving 4702 having a period of a frame period is output as the control signal for AC driving 4602. On the contrary, when the pen 105 is pulled back from the panel after an entry and the voltage goes under the reference voltage 4601, the output signal 4604 becomes "low" and the control signal for AC driving 4704 having a period of a few scanning lines is output as the control signal for AC driving 4602.

The use of this system is very effective to reduce the influence of so-called trigger noise.

In this embodiment, the said effect can be achieved by providing a pen detector 4603, two different control signals for AC driving, and a selector 4705 used to select either of those control signals for AC driving for the liquid crystal display device integrated with an input device in any of the embodiments 1 to 8.

Unlike the said method, the said effect can also be achieved by changing the control signals for AC driving at an entry time and at a non-entry time using the pen-detection signal 106 which becomes "high" clearly when the pen 105 touches the liquid crystal panel.

Embodiment 10

Next, the liquid crystal display device integrated with an input device in the 10th embodiment of this invention will be explained using FIGS. 47 through 52.

Figure 47:
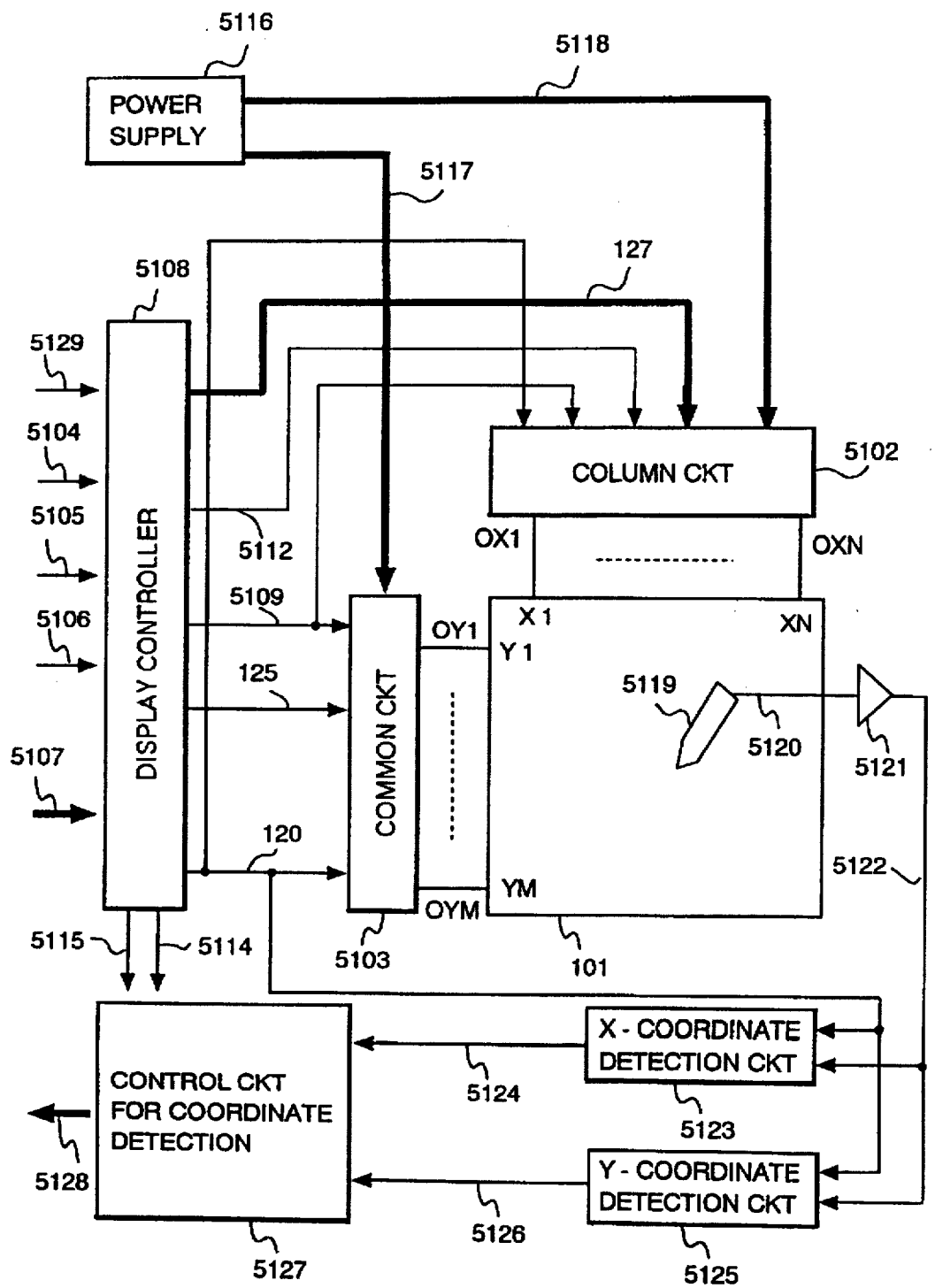
FIG. 47 shows a schematic configuration of a liquid crystal display device integrated with an input device of a tenth embodiment of this invention.

FIG. 47 shows the schematic configuration of the said liquid crystal display device integrated with an input device. In FIG. 47, 101 is a liquid crystal panel forming a matrix of M rows and N columns having a picture element at each intersection of Y and X electrodes with liquid crystal sandwiched between one glass or plastic plate having Y1 to Yn electrodes and the other glass or plastic plate having X1 to Xm electrodes orthogonal to the Y electrodes, 5102 is a column circuit having N output lines OX1 to OXN, 5103 is a common circuit having M output lines OY1 to OYM. The outputs OX1 to OXN of the column circuit 5102 are connected to the electrodes X1 to XN of the liquid crystal panel 101, respectively. The outputs OY1 to OYM of the common circuit 5103 are connected to the electrodes Y1 to YM of the liquid crystal panel 101, respectively. 5104 is a horizontal synchronization signal, 5105 is a vertical synchronization signal, 5106 is a dot clock, 127 is a display data bus, 5129 is a blank signal that indicates whether or not display data is valid, 5108 is a display controller that controls display of the liquid crystal and determination of coordinates, 5109 is a CL3 clock synchronized with the said horizontal synchronization signal, 125 is a first line marker (FLM), 127 is a liquid crystal display data bus, 5112 is a CL2 clock synchronized with display data, 120 is the control signal for AC driving, which becomes "high" for positive polarity and "low" for negative polarity, 5114 is the display/detection control signal, which becomes "high" during a display period and "low" when an X coordinate is determined, and 5115 is a clock synchronized with the scan clock for determining coordinates. The display controller 5108 generates the CL3 clock 5109, the CL2 clock 5112, the FLM 125, the display data for the display data bus 127, and the control signal for AC driving 120 from the blank signal 5129, as control and display data for liquid crystal using the horizontal synchronization signal 5104, the vertical synchronization signal 5105, the dot clock 5106, the display data from the display data bus 5107 and the blank signal 5129. The display controller 5108 generates the display/detection control signal 5114 and the clock 5115 as detection signals. Furthermore, the controller 5108 generates detection scan data during X coordinate detection periods.

5116 is a power supply that supplies a scan voltage to the common circuit and gray scale voltages to the column circuit, 5117 is a scan voltage bus that supplies scan and non-scan voltages of positive polarity, and scan and non-scan voltages of negative polarity, which are output from the power supply 5116. 5118 is a gray scale voltage bus that supplies positive and negative polarity gray scale voltages, which are output from the power supply 5116. Scan and gray scale voltages of positive polarity satisfy the relationship of "gray scale voltage>scan voltage". This relation is reversed for scan and gray scale voltages of negative polarity.

5119 is a coordinate pointer (hereafter, to be referred to as a pen) that uses the electrostatic coupling. 5120 is the output signal of the pen 5119 and 5121 is an amplifier that amplifies the output signal 5120. 5122 is the output signal from the amplifier 5121, and 5123 is the X-coordinate detection circuit that converts the output signal 5122 from the amplifier 5121 into digital signals. 5124 is the X output signal from the X coordinate detection circuit 5123, and 5125 is the Y-coordinate detection circuit that converts the output signal 5122 from the amplifier 5121 into digital signals. 5126 is the Y output signal from the Y coordinate detection circuit 5125, and 5127 is the control circuit for coordinate detection that, detects coordinates synchronously with the X and Y output signals. 5128 is an output bus that transmits coordinate data detected by the control circuit for coordinate detection 5127.

Figure 48:
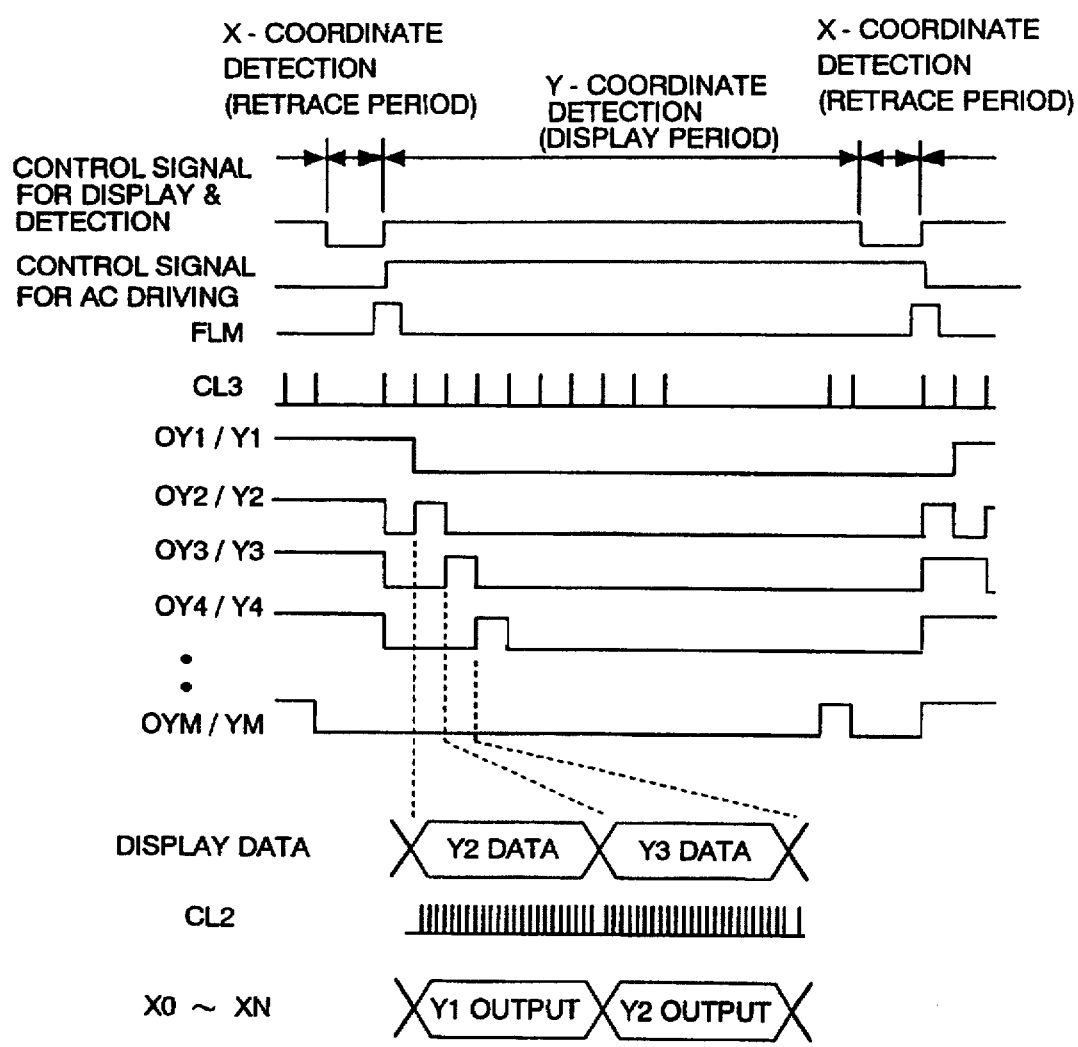
FIG. 48 shows a timing chart related to the tenth embodiment of this invention.

FIG. 48 shows the timing chart of the said liquid crystal display device integrated with an input device.

Figure 49:
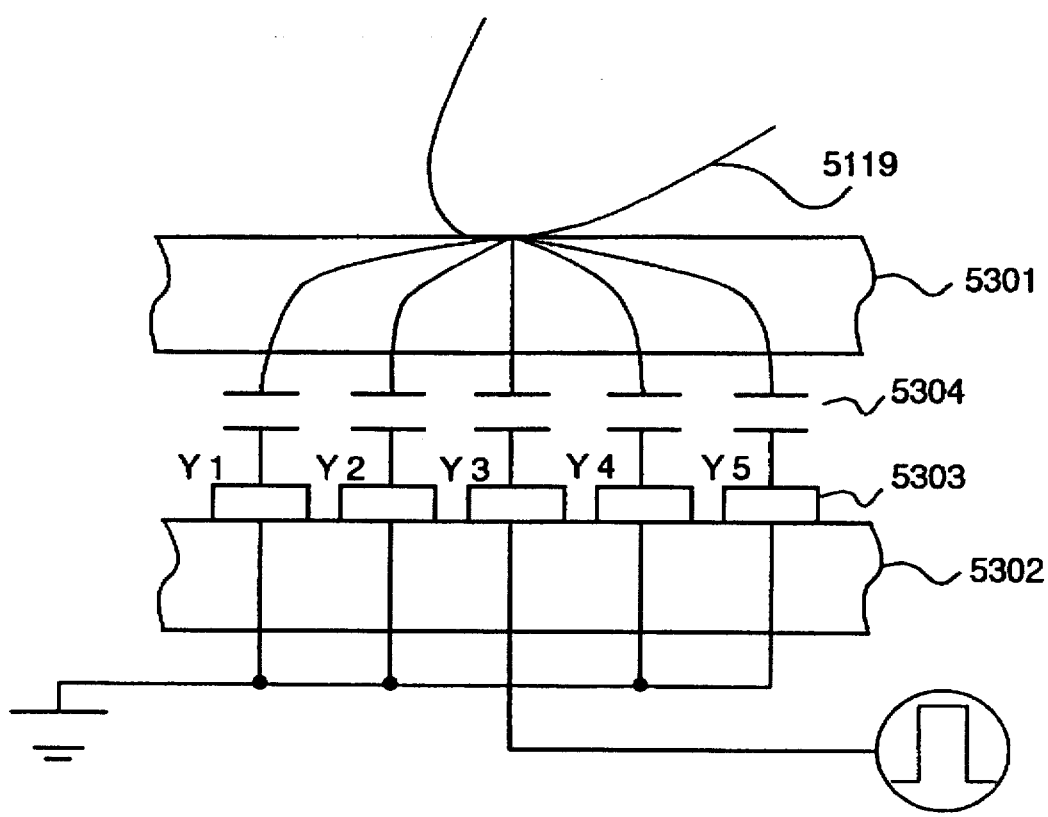
FIG. 49 shows a conception of electrostatic coupling related to the tenth embodiment of this invention.

FIG. 49 shows the conception of the electrostatic coupling between a pen tip and electrodes of the liquid crystal panel.

In FIG. 49, 5301 is one of glass or plastic plates of the said liquid crystal panel and 5302 is the other glass or plastic plate of the said liquid crystal panel. 5303 is the Y electrodes arranged on the other glass or plastic plate. 5304 is a capacity of the electrostatic coupling between one of the Y electrodes and the pen tip.

Figure 50:
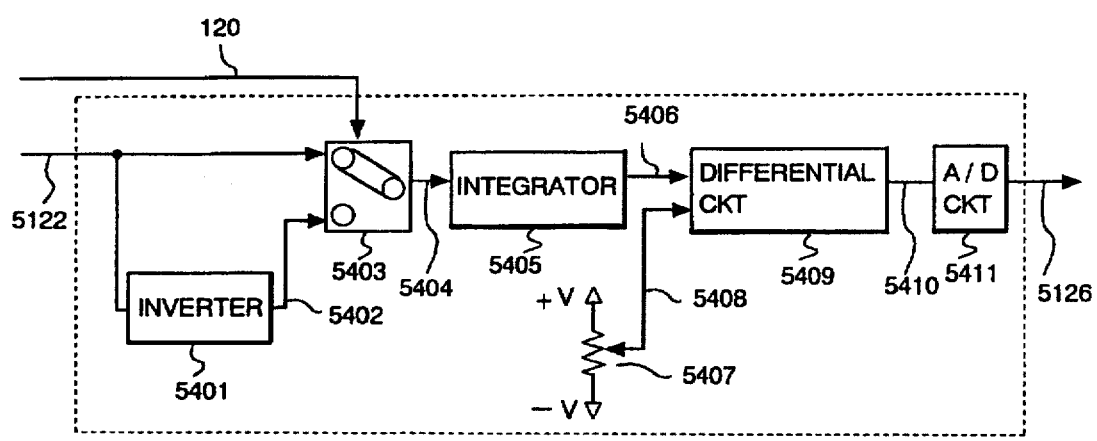
FIG. 50 shows a block diagram of a Y-coordinate detection circuit related to the tenth embodiment of this invention.

FIG. 50 shows the block diagram of the Y-coordinate detection circuit. In FIG. 50, 5401 is an inverter that inverts the Y output signal 5122 and 5402 is the output signal from the inverter 5401. 5403 is a selector that selects the output signal 5402 from the inverter 5401 when the control signal for AC driving is "high" and the Y output signal 5122 when the control signal is "low". 5404 is the output signal from the selector 5403, 5405 is an integrator, 5406 is the output signal from the integrator 5405, 5407 is a variable resistor that receives voltages +V and −V at both its ends, respectively, 5408 is the reference voltage divided by the variable resistor 5407, and 5409 is a differential circuit that assumes the difference between the reference voltage 5408 and the output signal 5406 from the integrator 5405. 5410 is the output signal from the differential circuit 5409, and 5411 is an analog/digital converter (hereafter, to be referred to as an A/D converter) that converts the output signal 5410, which is analog data, into digital signals.

Figure 51:
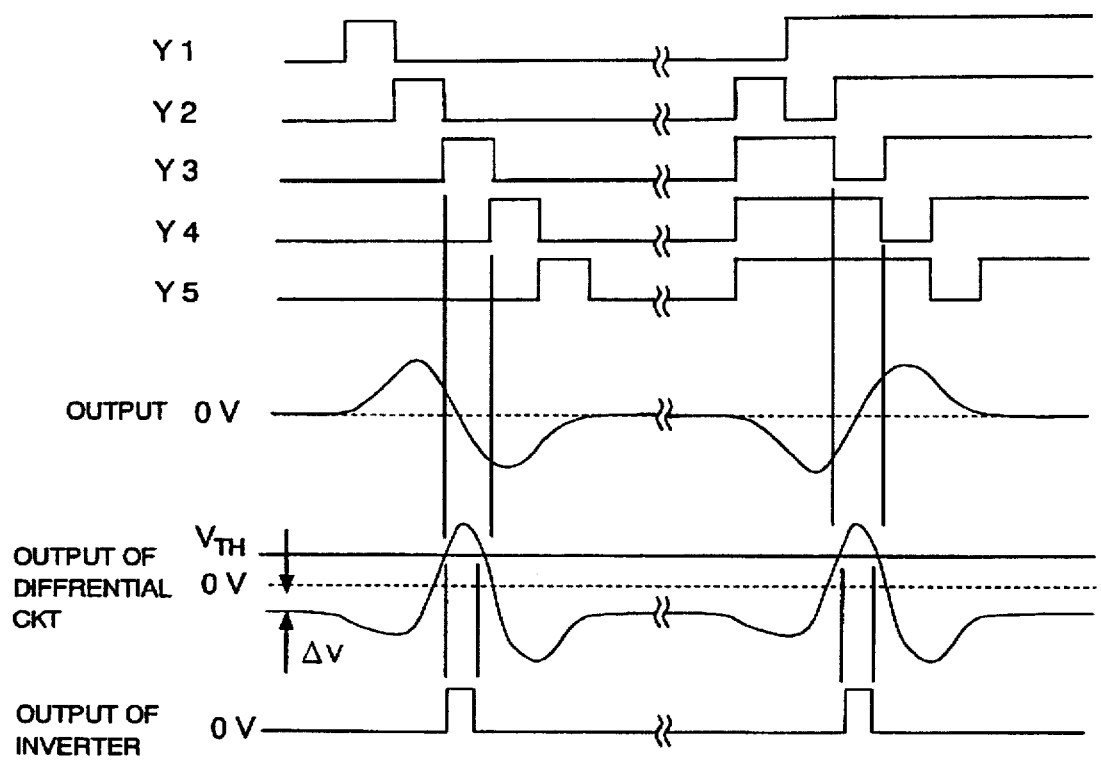
FIG. 51 shows a timing chart related to the tenth embodiment of this invention.

FIG. 51 shows the timing chart of the Y-coordinate detection circuit.

Figure 52:
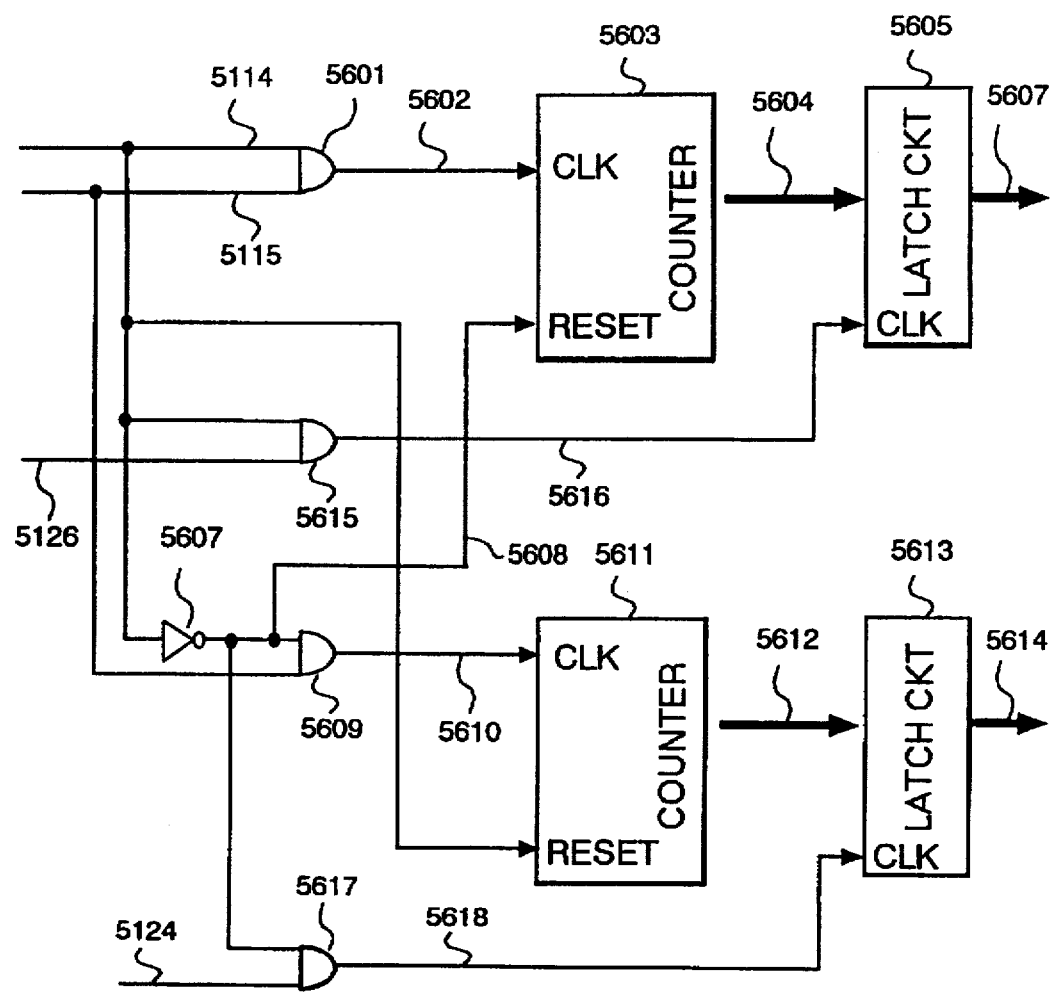
FIG. 52 shows a block diagram of a coordinate memory related to the tenth embodiment of this invention.

FIG. 52 shows the block diagram of the coordinate memory provided in the control circuit for coordinate detection. In FIG. 52, 5601 is an AND circuit, 5602 is the output signal from the AND circuit 5601, 5603 is a counter having $\log_2 n$ bits or over, 5604 is an output bus that outputs count data from the counter 5603, 5605 is a latch circuit that stores the data from the output bus 5604, and 5606 is an output bus that outputs the latch data stored in the latch circuit 5605. 5607 is an inverter that inverts and outputs input signals, 5608 is the output signal from the inverter 5607, 5609 is an AND circuit, 5610 is the output signal from the AND circuit 5609, 5611 is a counter having $\log_2 m$ bits or over, 5612 is an output bus that outputs count data from the counter 5611, and 5613 is a latch circuit that stores data from the output bus 5612. 5614 is an output bus that outputs latch data stored in the latch circuit 5613, 5615 is an AND circuit, 5616 is the output signal from the AND circuit 5615, 5617 is an AND circuit, and 5618 is the output signal from the AND circuit 5617.

FIGS. 47 and 43 are used again here to explain in detail the display operation of the said liquid crystal display device integrated with an input device in this embodiment.

In the liquid crystal panel 101 of FIG. 47, a scan voltage selected in the common circuit 5103 and a gray scale voltage selected in the column circuit 5102 are applied to each liquid crystal picture element to display white, black, or half-tone according to the effective value determined by the voltage across the picture element and the time during which the voltages are applied.

In this section, operation for displaying two levels of gray scale (white and black) will be explained using FIGS. 47 and 48.

As shown in FIG. 48, the common circuit 5103 applies the scan voltage on electrodes Y1 to YM of the liquid crystal panel 101 shown in FIG. 47 by selecting electrode by electrode sequentially and synchronously with the CL3 clock 5109 after the FLM 125 becomes "high", while the common circuit 5103 applies the non-scan voltage on non-selected Y electrodes at the same time. On the other hand, the column circuit 5102 applies the gray scale voltage according to display data on the X electrodes facing the Y electrodes selected and supplied with the scan voltage by the common circuit 5103. The operation of this column circuit 5102 will be explained below. The column circuit 5102 stores display data for one scanning line output from the display data bus 127 at a time sequentially synchronously with the CL2 clock 5112, then selects the gray scale voltage from the voltages from the gray scale voltage bus 5118 according to the stored display data and outputs it to OX1 to OXN synchronously with the CL3 clock 5109.

The column circuit 102 stores the next display data while this gray scale voltage is output. For example, if the common circuit 5103 outputs a scan voltage to the Y1 electrode synchronously with the CL3 clock 5109, then the column circuit 5102 outputs the gray scale voltage according to each picture element display data associated with the Y1 electrode. Furthermore, the column circuit 5102 stores display data for each picture element associated with the Y2 electrode corresponding to the next line synchronously with the CL2 clock 5112.

One screen can be displayed by repeating this operation from Y1 up to YM. The column circuit 5102 and the common circuit 5103 use scan voltage, non-scan voltage, and gray scale voltage of positive polarity, respectively when the control signal for AC driving 120 is "low". When the control signal for AC driving is "high", both the circuits use scan voltage, non-scan voltage, and gray scale voltage of negative polarity, respectively. In FIG. 47, the control signal for AC driving 120 changes with each screen, that is, changes the polarity of the voltage to be applied to liquid crystal with frames. This prevents phenomena such as an image burn which is caused by long-continued application of a voltage of the same polarity to liquid crystal and results in deterioration of display quality and further of the liquid crystal itself.

Next, the Y coordinate determination in the liquid crystal display device integrated with an input device will explained below.

In FIG. 47, if the pen 5119 points to the Y3 electrode, then a capacity of electrostatic coupling 5304 is formed between the tip of the pen 5119 and the Y electrode. This electrostatic capacity 5304 is largest between the pen 5119 and the Y3 electrode. The capacity 5304 between the pen 5119 and an other Y electrode decreases with increasing distance between the pen 5119 and the Y electrode. If a scan voltage is applied to the Y3 electrode, change in the voltage of the Y3 electrode which is the voltage of one electrode of a capacitor having the capacity 5304 causes change in the potential of the pen 5119 which is the other electrode of the capacitor. If scanning is made from Y1 to YM sequentially, therefore, the potentials of those Y electrodes change sequentially as shown in the output signals shown in FIG. 51. This change in potential is very small, so the output signal 5120 from the pen 5119 is amplified in the amplifier 5121. The output signal 5122 from the amplifier 5121 is entered to the X-coordinate detection circuit 5123 and the Y-coordinate detection circuit 5125 respectively.

In the Y-coordinate detection circuit 5125 shown in FIG. 50, the output signal 5122 is entered to the selector 5403 and the inverter 5401. The signal 5122 entered to the inverter 5401 is inverted and entered to the selector 5403 as the output signal 5402. The selector 5403 outputs the output signal 5122 as the output signal 5404 when the control signal for AC driving 120 is "high". When the control signal for AC driving 120 is "low", the signal 5402 is output from the inverter 5401 as the output signal 5404. The influence of changes in detected signals due to AC driving can be eliminated.

The output signal 5404 is entered to the integrator 5405 and its phase is shifted by about 90° so that it can synchronize with the change in the voltage of the Y electrode period to by the pen, then it is output as the output signal 5406. The output signal 5406 is entered to the differential circuit 5409, and a value obtained by subtracting the voltage ΔV, the output signal 5408 obtained by the voltage-dividing variable resistor 5407 from this output signal 5406 is output as the signal 5410. The output signal 5410 is entered to the A/D converter 5411, then the digital signal that becomes "high" only during the period in which the threshold level (VTH) of the A/D converter 5411 is exceeded is output as the Y output signal 5126. If the dividing ratio of the variable resistor 5407 is changed, the period in which the output signal 5408 exceeds the threshold level of the A/D converter 5411 can be changed, and the pulse width of the Y output signal 5126 from the A/D converter 5411 can be changed. The digital Y output signal 5126 thus obtained is synchronized with the scan voltage applied on Y3 electrode pointed to by the pen 5119. Display data is transmitted from the display controller 5108 to the column circuit 5102 so that the column circuit 5102 can apply a black-level voltage to X electrodes from OX1 to OXN electrode by electrode sequentially and apply a white-level voltage to the other X electrodes during the X-coordinate detection period. The output signal 5122 is converted to a digital one as the X output signal 5124 in the same operation as that of Y-coordinate detection, that is, by detecting the change in the electrode potential caused by this application of a black-level voltage.

The X output signal 5124 and the Y output signal 5126 are entered to the coordinate memory of the coordinate detection control circuit 5127 to store the coordinate pointed to by the pen. This operation will be explained below using FIG. 52.

The output signal 5126 obtained by digitizing the change in voltage of the pen-pointed Y electrode is entered to the AND circuit 5615. In this AND circuit 5615 is already entered the display/detection control signal 5114 having been inverted in the inverter 5607. When this display/detection control signal 5114 is "high", the output signal 5126 is output as the output signal 5616 from the AND circuit 5615. When the control signal 5114 is "low", the AND circuit 5615 always outputs the "low" as the signal 5616 and masks the data of the output signal 5126. In the same way, the AND circuit 5601 outputs the clock 5115 as the output signal 5602 only while the display/detection control signal 5114 is "high".

The counter 5603 counts up synchronously with this output signal 5602 and outputs the count to the output bus 5604. If pulses of the output signal 5126 are entered to the latch circuit 5605 as the output signal 5616 at this time, then the latch circuit can store the current count data and output it to the output bus 5606. On the other hand, the output signal 5608 obtained by inverting the display/detection control signal 5114 in the inverter 5607 is already entered to the RESET terminal of the counter 5603. This output signal 5608 becomes "high" during the X coordinate detection period, so the counter 5603 is initialized. Thus, the counter can count up starting from the initial value when the next Y coordinate is detected. Y coordinate values can be determined this way in this embodiment. While an X coordinate is detected, the output signal 5608 from the inverter 5607 becomes "high" and the clock 5115 is output as the output signal 5610 from the AND circuit 5609 and the output data 5124 is output as the output signal 5618 from the AND circuit 5617 respectively. The counter 5611 counts up synchronously with the output signal 5610 and outputs the count data to the output bus 5612. If pulses of the output signal 5618 are entered at this time, this count value is stored in the latch circuit 5613, then output to the output bus 5614. While a Y coordinate is detected, a "high" signal is entered to the RESET terminal of the counter 5611. So, the counter 5611 is initialized. When the next X coordinate is detected, the counter can count up starting from the initial value. X coordinates can be detected this way in this embodiment.

This coordinate memory does not store Y coordinates when X coordinates are determined and does not store X coordinates when Y coordinates are determined. The stored X and Y coordinates are output to the output bus 5128 from the coordinate detection control circuit.

If an integrator is added to the coordinate detection circuit such way, digital signals synchronized with the changes in voltages of pen-pointed X/Y electrodes can be obtained, enabling highly accurate determination of coordinates.

Embodiment 11

Next, the system that detects only the signals in the specified frequency band will be explained below as the 11th embodiment of this invention using FIGS. 53 and 54.

Figure 53:
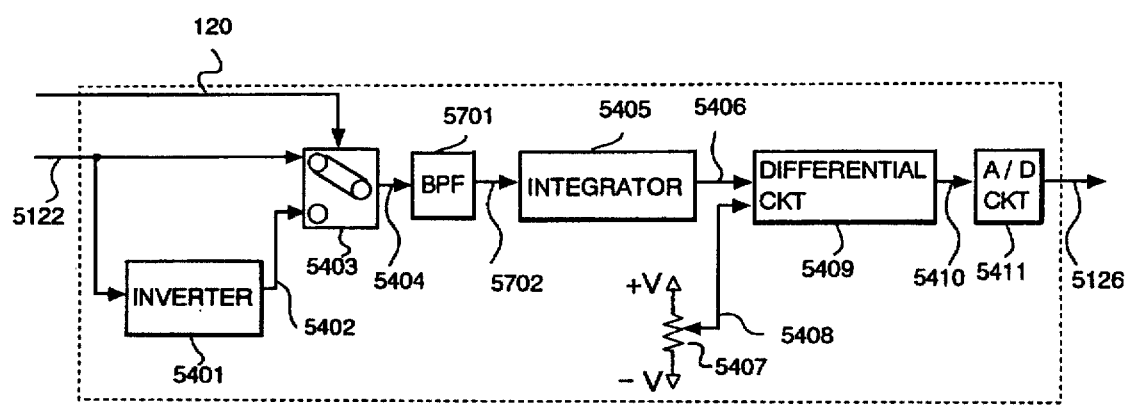
FIG. 53 shows a block diagram of a Y-coordinate detection circuit provided with a filter, of a eleventh embodiment of this invention.

FIG. 53 shows the block diagram of the Y coordinate detection circuit with a filter added. The Y coordinate detection circuit is obtained by adding a filter to the Y coordinate detection circuit in the 10th embodiment. In FIG. 53, 5701 is a band pass filter (BPF) that passes only the signals in the specified frequency band. 5702 is the output signal from this BPF 5701.

Figure 54:
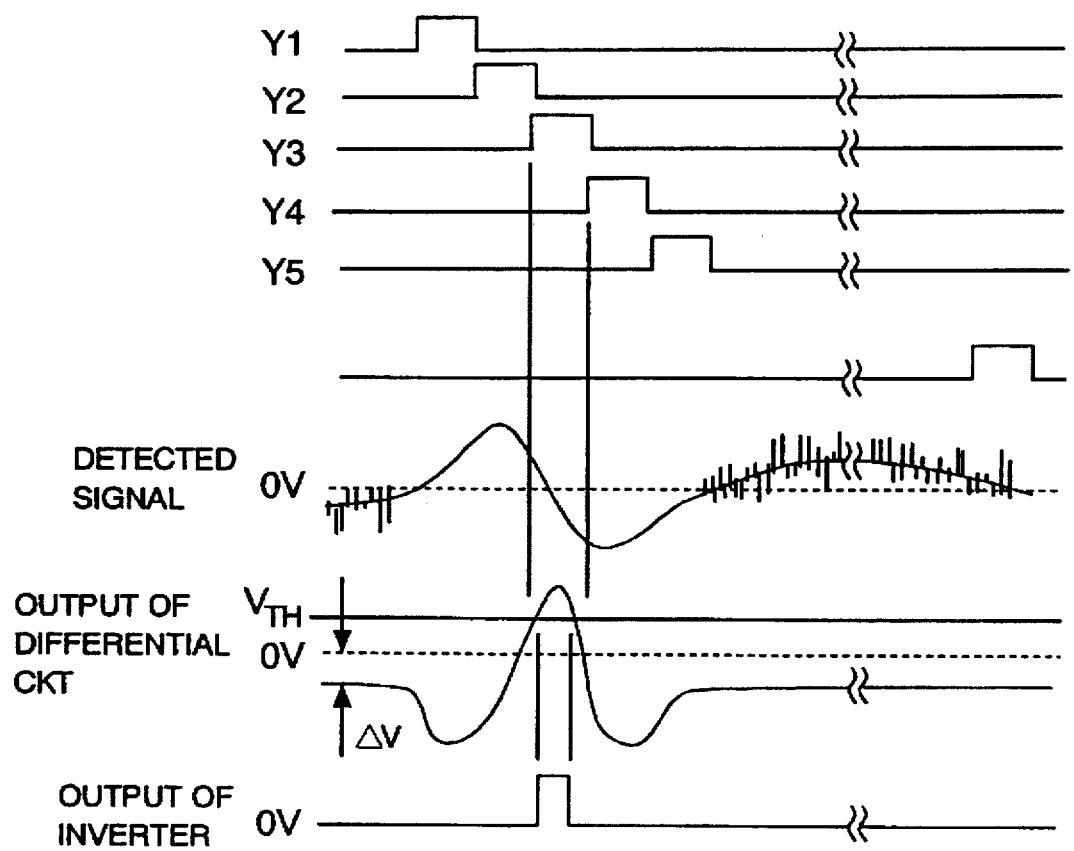
FIG. 54 shows a timing chart related to the eleventh embodiment of this invention.

FIG. 54 shows the timing chart of the Y coordinate detection circuit with filter.

If a Y coordinate is to be determined during a display period, noises of low frequencies in the range of a frame frequency and of high frequencies are superposed on the output signal 5120 of the pen 5119, due to the influence of the gray scale voltage corresponding to the display data applied on the X electrodes as shown in FIG. 54. Those noises must be eliminated and only the signals in the necessary frequency band must be passed. A system that meets such the requirements will be explained below using FIGS. 53 and 54.

As shown in FIG. 54, by passing the output signal 5120 from the pen 5119 through the BPF 5701, only the signals in the frequency band necessary to determine coordinates are passed from among the detection signals shown in FIG. 54, and are output as the output signal 5702. After this, just like in the first embodiment, it is possible to obtain digital signals synchronized with application of the scan voltage on the pen-pointed Y electrode through the integrator 5405, the differential circuit 5409, and the A/D converter 5411.

The operations of the other circuits are the same as those in the 10th embodiment, so the explanation is omitted here.

The said same effects can also be obtained by adding a BPF 5701 to the X coordinate detection circuit 5213.

Embodiment 12

Next, the 12th embodiment of this invention will be explained below using FIGS. 55, 56, and 57. In this embodiment, the liquid crystal display device integrated with an input device used in the 10th embodiment is provided with an active matrix type liquid crystal panel having an active element at each intersection point of X and Y electrodes as its liquid crystal panel.

Figure 55:
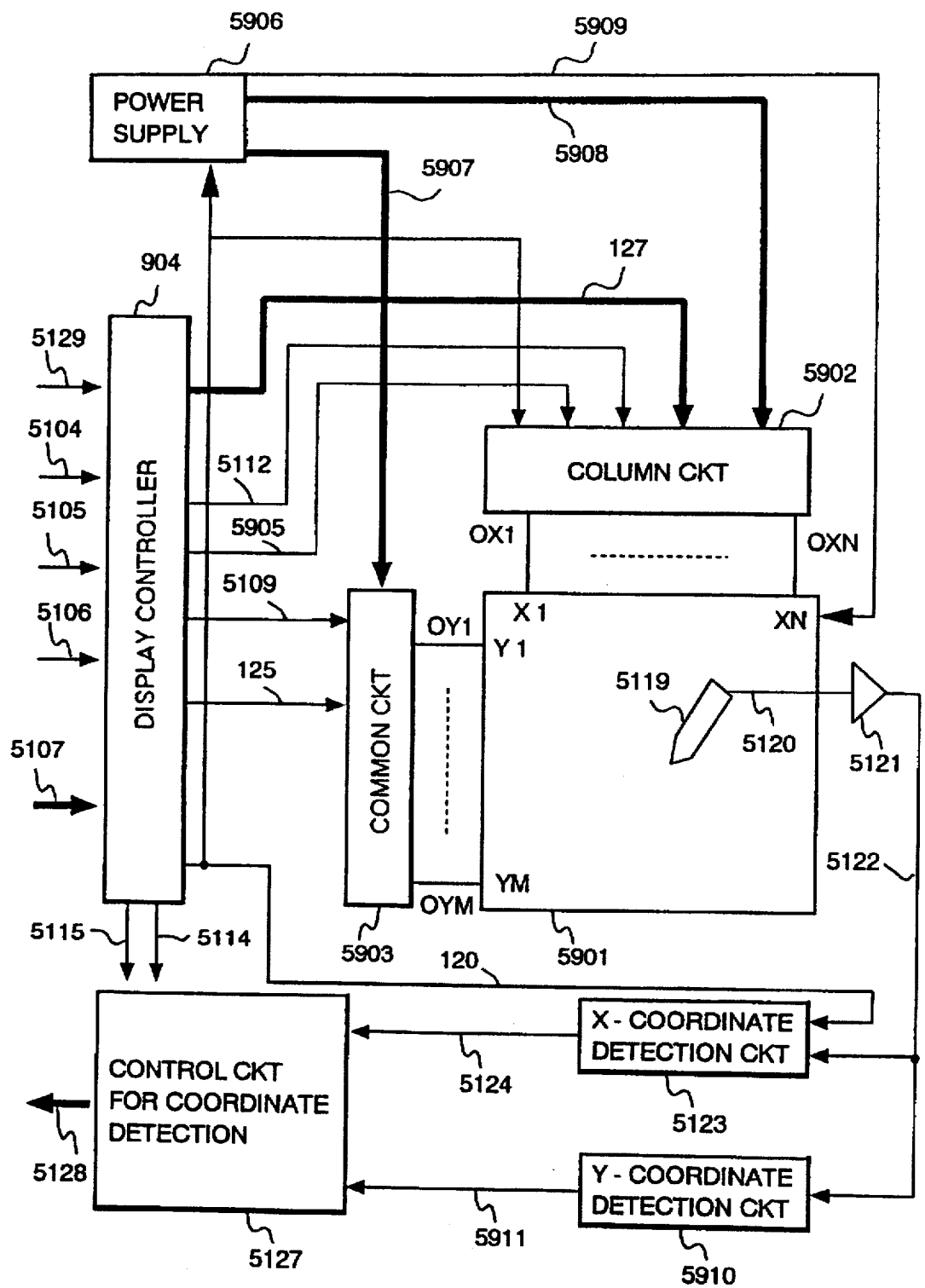
FIG. 55 shows a schematic configuration of a liquid crystal display device integrated with an input device of a twelfth embodiment of this invention.

FIG. 55 shows the schematic configuration of the said liquid crystal display device integrated with an input device. In FIG. 55, 5901 is a liquid crystal panel forming a matrix of M rows×N columns having an active element such as a thin-film transistor (TFT) and a picture element electrode connected to an output of said active element as one picture element at each intersection of Y electrodes and X electrodes X1 to XN orthogonal to the Y electrodes Y1 to YM. The liquid crystal is sandwiched between two glass plates on one of which is electrodes Y1 to YM and electrodes X1 to XN perpendicular to the Y electrodes, are disposed and on the other of which a counter electrode opposing the picture element electrodes is disposed. 5902 is a column circuit having N output lines from 0X1 to OXN. 5903 is a common circuit having M output lines from OY1 to OYM.

The outputs OX1 to OXN of the column circuit 5902 are connected to the electrodes X1 to XN of the liquid crystal panel 5901 respectively. The outputs OY1 to OYM of the common circuit 5903 are connected to the electrodes Y1 to YM of the liquid crystal panel 5901 respectively. The active elements of the liquid crystal panel 5901 are turned ON with the scan voltage output from the common circuit 5903, and at the same time the gray scale voltages from the column circuit 5902 are applied to the picture element electrodes. The difference between this gray scale voltage and the electrode voltage on the counter electrode is the voltage to be applied across the said liquid crystal picture elements. The display brightness can be controlled according to this voltage level. This is why images can be displayed in gray scale. When a non-scan voltage is applied, the said active elements are turned OFF, and no gray scale voltage is applied to the liquid crystal.

5904 is a display controller that controls the display of liquid crystal and determination of coordinates. 5905 is a CL1 clock synchronized with the horizontal synchronization signal. 5906 is a power supply that supplies a scan voltage to the common circuit and a gray scale voltage to the column circuit. 5907 is a scan voltage bus that outputs voltages from the power supply. 5908 is a gray scale voltage bus that outputs gray scale voltages of positive and negative polarity from the power supply. 5909 is a voltage line that supplies a voltage to the counter electrode of the liquid crystal panel 5901. The relation between the gray scale voltage of positive polarity and the counter electrode voltage 5909 is "gray scale voltage>counter electrode voltage". For the gray scale voltage of negative polarity, this relation is reversed. 5910 is a Y coordinate detection circuit that converts signals output from the amplifier to digital pulse signals and 5911 is the Y output signal from the Y coordinate detection circuit.

Figure 56:
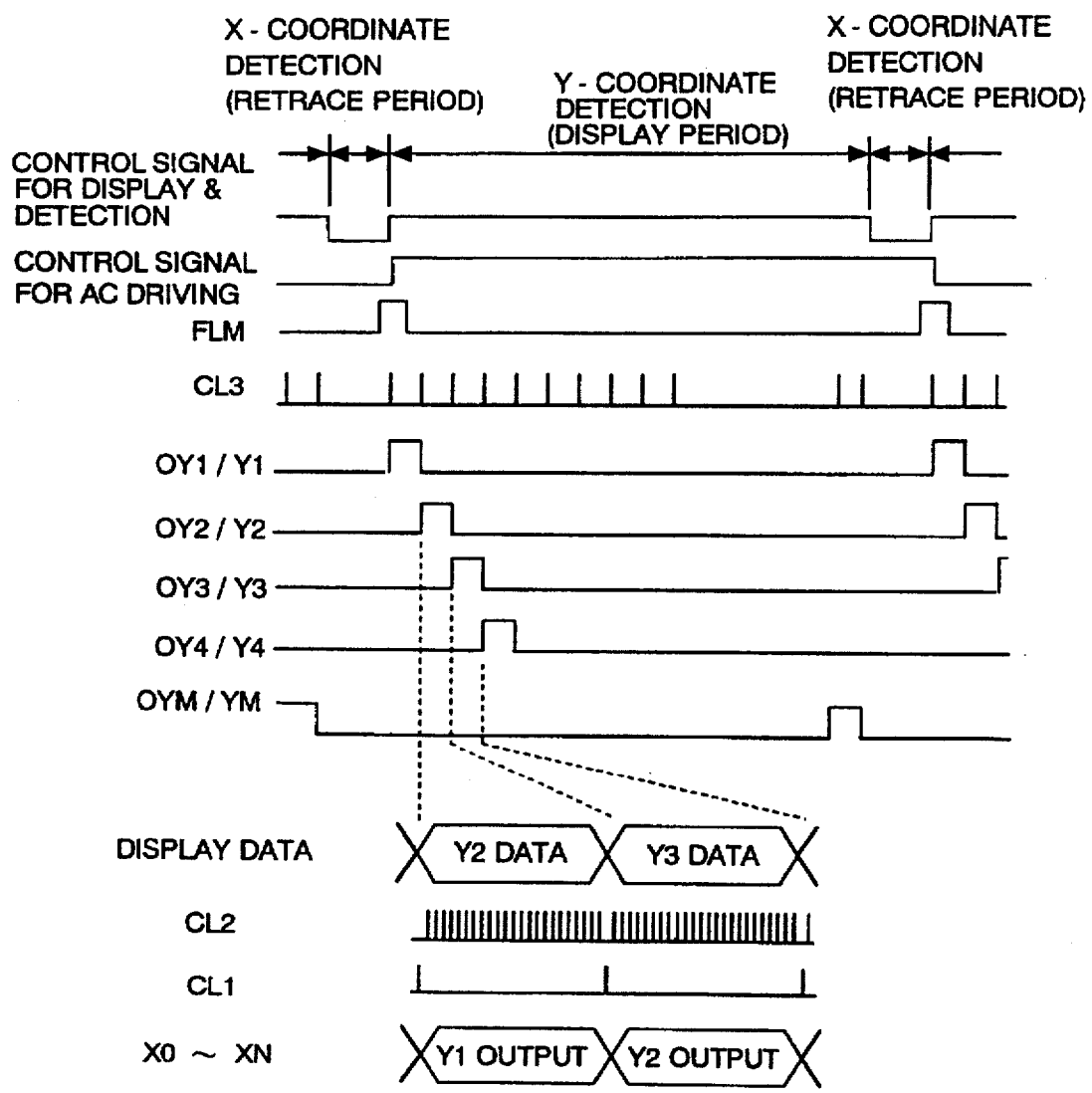
FIG. 56 shows a timing chart related to the twelfth embodiment of this invention.

FIG. 56 shows the timing chart of the said liquid crystal display device integrated with an input device.

Figure 57:
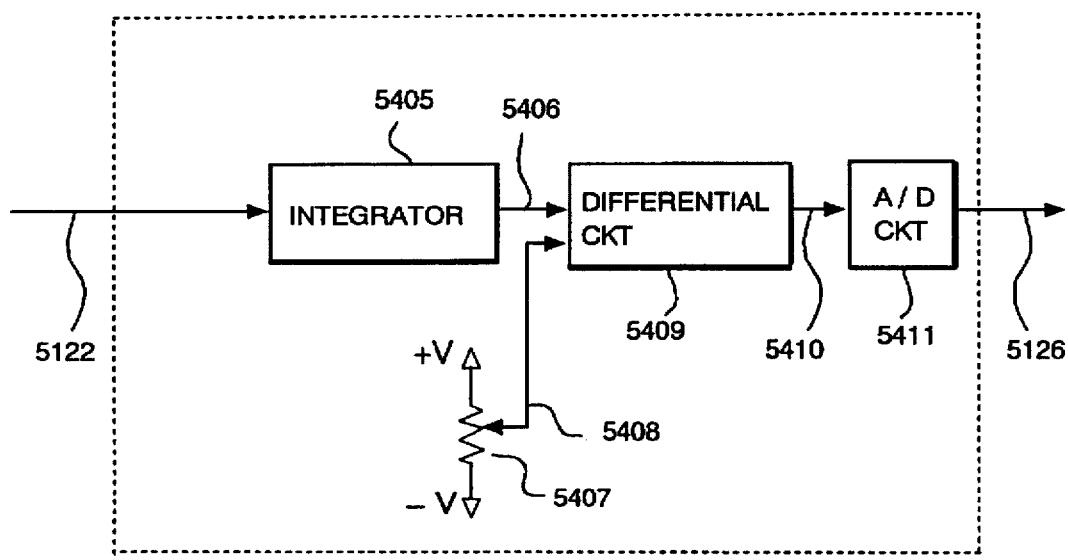
FIG. 57 shows a block diagram of a Y-coordinate detection circuit related to the twelfth embodiment of this invention.

FIG. 57 shows the block diagram of the said Y coordinate detection circuit.

Next, how the coordinate detection circuit functions when the said active matrix type liquid crystal panel is used will be explained below using FIGS. 55, 56, and 57.

At first, the display operation will be explained briefly.

The common circuit 5903, as shown in FIGS. 55 and 56, outputs scan voltage to OY1 to OYM sequentially synchronously with the CL3 clock when the FLM 125 signal becomes "high". Thus, the active elements of the picture elements associated with the Y electrode are turned ON. At this time, the column circuit 5902 outputs the gray scale voltage corresponding to display data to OX1 to OXN synchronously with the CL1 clock 5905 to apply a voltage to each picture element electrode for displaying data. The column circuit 5902 stores the display data for the next line synchronously with the CL2 clock 5112. The common circuit 5903 outputs a non-scan voltage to non-selected electrodes to turn OFF the active element of each picture element associated with the non-selected electrodes. In this way, the said liquid crystal panel displays data corresponding to display data.

When this active matrix type liquid crystal panel is used, the relation between the scan voltage and the non-scan voltage of the common circuit 5903 is fixed, and both the voltages are not affected by the control signal for AC driving 120. This is why the inverter 5401 and the selector 5403 in the 10th embodiment shown in FIG. 50 can be eliminated from the Y coordinate detection circuit 5910 as shown in FIG. 57. In this case, the same effect as that in the 10th embodiment can also be obtained.

If the gray scale voltage is not affected by the control signal for AC driving 120 during the X coordinate detection period, that is, if the scan voltage is fixed in the X coordinate detection circuit, then the inverter 5401 and the selector 5403 can be eliminated from the circuit configuration just like shown in FIG. 57. The said effect can also be obtained in this configuration.

Furthermore, if a BPF 5701 explained in the 11th embodiment is added to the X coordinate detection circuit and the Y coordinate detection circuit respectively, the same effect as that in the 11th embodiment can be obtained.

Embodiment 13

Next, the 13th embodiment of this invention will be explained focusing on the detection circuit obtained by combining the said X coordinate detection circuit and the said Y coordinate detection circuit in the said liquid crystal display device integrated with an input device using FIGS. 58, 59, and 60.

Figure 58:
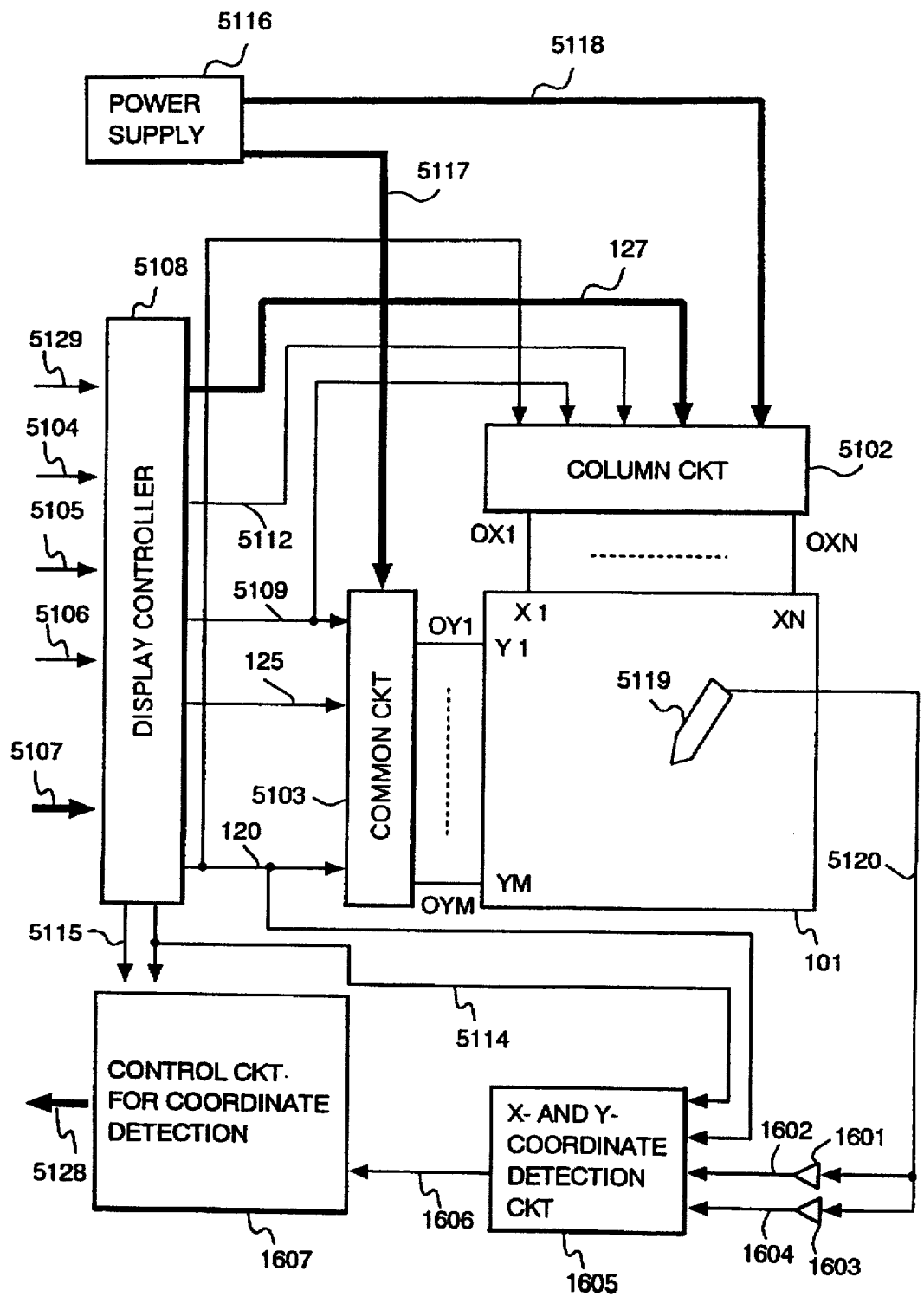
FIG. 58 shows a schematic configuration of a liquid crystal display device integrated with an input device of a thirteenth embodiment of this invention.

FIG. 58 shows the schematic configuration of the liquid crystal display device integrated with an input device explained in the 10th embodiment, in which X and Y coordinate detection circuits are united into one.

1601 is an amplifier having a first amplification used to convert detected X waveforms to pulses, 1602 is the output signal from the amplifier 1601, and 1603 is an amplifier having a second amplification used to convert detected Y waveforms to pulses. 1604 is the output signal from the amplifier 1603, 1605 is an X/Y coordinate detection circuit that converts detected output signals 1602 and 1604 to pulses, and 1606 is the output signal from the X/Y coordinate detection circuit. 1607 is a control circuit for coordinate detection that determines X and Y coordinates synchronously with the output signal 1606 from the X/Y coordinate detection circuit 1605, and output them to the output bus 5128. FIG. 59 shows the schematic block diagram of the said X/Y coordinate detection circuit.

1701 is a selector that selects and outputs the output signal 1602 when the display/detection control signal 5114 is "low", that is, during a retrace period/X coordinate detection period and selects and outputs the output signal 1604 when the display/detection control signal 5114 is "high", that is, during a display period/Y coordinate detection period. 1502 is the output signal from the selector 1501.

Figure 60:
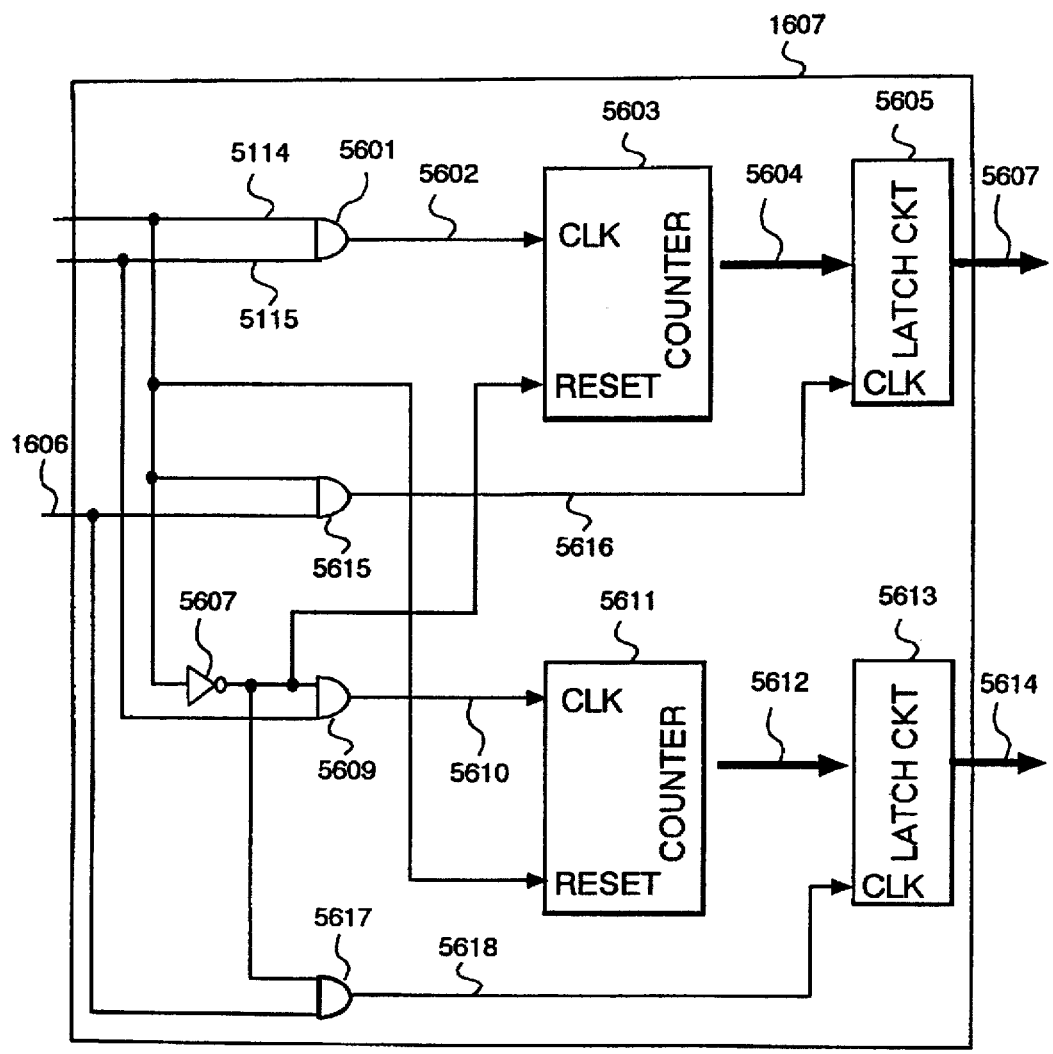
FIG. 60 shows a block diagram of a coordinate memory related to the thirteenth embodiment of this invention.

FIG. 60 shows the block diagram of the coordinate memory provided in the coordinate detection control circuit.

Next, the operation of the said detection circuit will be explained below using FIGS. 58, 59, and 60. The operations of the other circuits are the same as those in the 10th embodiment, so the explanation is omitted here.

At first, the operation of the Y coordinate determination will be explained below.

The signal detected by the pen 5119 during a display period (Y coordinate detection period) is entered to the amplifiers 1601 and 1603 as the detected signal 5120. The signal 5120 amplified with a first amplification is then output as the output signal 1620. The signal 5120 amplified with a second amplification is output as the output signal 1604 and entered to the X/Y coordinate detection circuit 1605. This X/Y coordinate detection circuit operation will be explained below using FIG. 59. Of the output signals 1602 and 1604 entered to the X/Y coordinate detection circuit 1605, the output signal 1604 is selected and output as the output signal 1502, since the display/detection control signal 5114 is "high" during the Y coordinate detection period.

After this, the X/Y coordinate detection circuit functions just like in the 10th embodiment. Thus, the output signal 1604 is output to the output signal 1606 as detected pulses. The output signal 1606 is then entered to the control circuit for coordinate detection 1607 shown in FIG. 60. In the control circuit for coordinate detection 1607, the AND circuit 5601 outputs the clock 5115 to the output 5602 and the AND circuit 5615 outputs the signal 1606 to the output 5616, since the display/detection control signal 5114 is "high". Then, the counter 5603 counts up synchronously with the output signal 5602. The count value is entered to the latch circuit 5605 through the output bus 5604. The latch circuit 5605 stores the count value synchronously with the output signal 5616, then outputs the value to the output bus 5607 as a Y coordinate.

Figure 59:
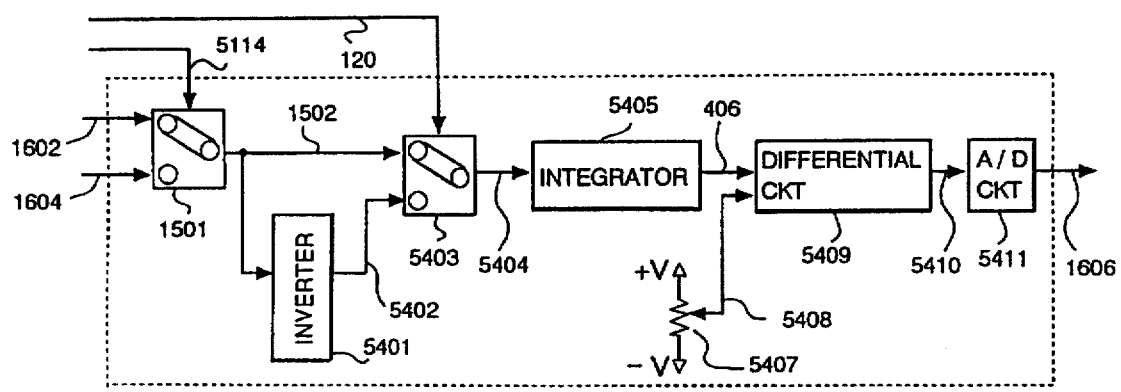
FIG. 59 shows a block diagram of the X- and Y-coordinate detection related to the thirteenth embodiment of this invention.

In the X/Y coordinate detection circuit 1605 when an X coordinate is detected, the selector 1501 shown in FIG. 59 selects the output signal 1602, since the display/detection control signal 5114 is "low" and outputs it to the output signal 1502. Then, the digitized signal is output to the output signal 1606. In the control circuit for coordinate detection 1607, the AND circuit 5609 outputs the clock 5115 to the output 5610 and the AND circuit 5617 outputs the output signal 1606 to the output 5618, since the display/detection control signal 5114 is "low". The counter 5611 counts up synchronously with the output signal 5610. The count value is then entered to the latch circuit 5613 through the output bus 5612. The latch circuit 5613 stores the count value synchronously with the output signal 5618, then outputs it to the output bus 5614 as an X coordinate.

With such a circuit configuration, the X and Y coordinate detection circuits can be united into one.

Furthermore, if a band pass filter explained in the 11th embodiment is added just before the integrator in the X/Y coordinate detection circuit shown in FIG. 59, the same effect as that in the 11th embodiment can be obtained.

The same effect can also be obtained in Embodiments 10 to 13 by using "the tablet integrated with a display device" disclosed in Japanese Patent Laid-Open No. 31842/1990 filed by Hitachi as an X coordinate detection system.

In Embodiments 10 to 12, if an amplifier, an X coordinate detection circuit, and a Y coordinate detection circuit are provided in the casing of the pen 5119, then the interface between the control circuit for coordinate detection 5127 and the pen 5119 can be digitized to reduce the influence of noise caused by external electromagnetic waves. If the said amplifier and the said X and Y coordinate detection circuits are packaged in an LSI, the packaging area can be reduced significantly, and by incorporating the control circuit for coordinate detection or the display controller into the LSI, the packaging area can be reduced further.

In Embodiment 13, if an amplifier and an X/Y coordinate detection circuit are provided in the casing of the pen 5119, then the interface between the control circuit for coordinate detection 5127 and the pen 5119 can be digitized to reduce the influence of noise caused by external electromagnetic waves. If the said amplifier and the said X/Y coordinate detection circuit are packaged in an LSI, the packaging area can be reduced significantly, and by incorporating the control circuit for coordinate detection or the display controller into the LSI, the packaging area can be reduced further.

In Embodiments 10 to 13, if the size, etc. of the liquid crystal panel, therefore the frequency band of detected signals are changed, then the same effect can be obtained with the same circuit configuration only by changing the constants to determine the operational frequency of the integrator and the frequency pass band of BPF. And, if the coordinate detection control circuit and the display controller are packed in one LSI, the packaging area can be reduced significantly.

INDUSTRIAL FIELD OF APPLICATION

Hereafter, the industrial field of application for the liquid crystal display device integrated with an input device of this invention will be explained using FIGS. 45(a) to 45(c) and 46.

At first, the circuit configuration and operation of the information processor of this invention will be explained briefly using FIG. 46.

Figure 46:
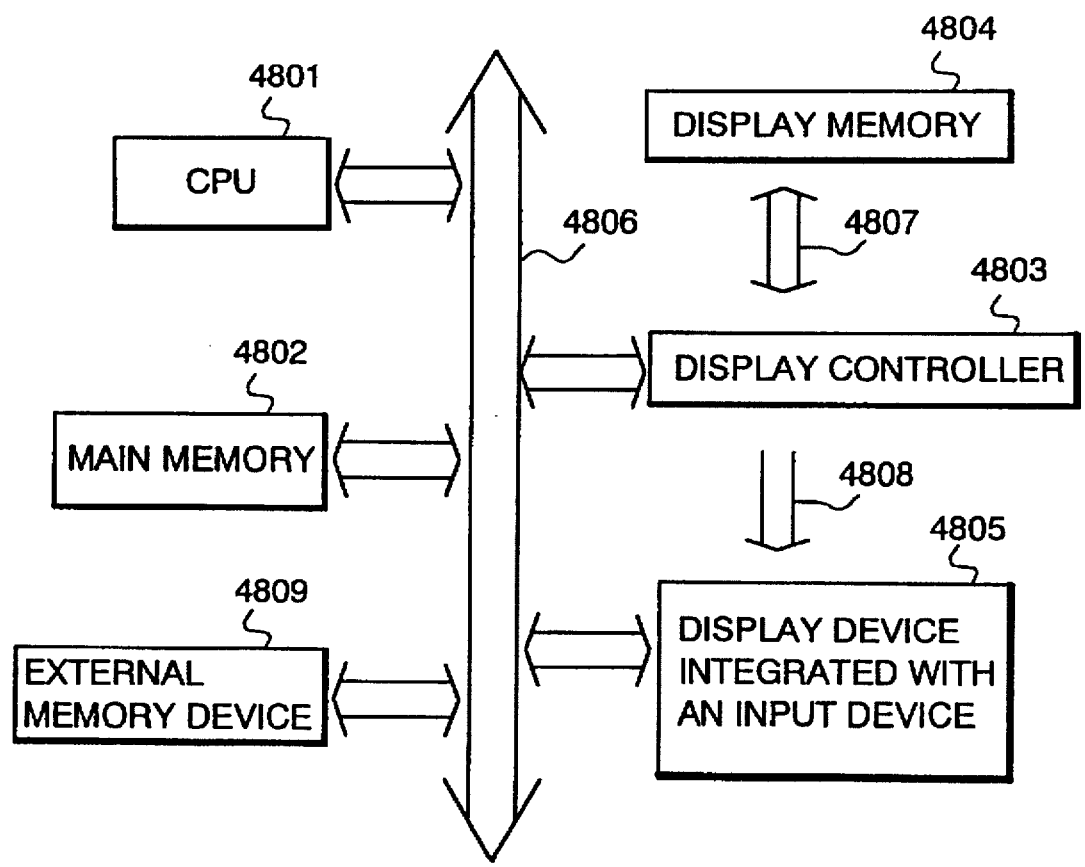
FIG. 46 shows a block diagram of a circuitry configuration of an information processor incorporated in a liquid crystal display device integrated with an input device of this invention.

FIG. 46 shows the block diagram of the circuit configuration of the said information processor in which the liquid crystal display device integrated with an input device of this invention is incorporated.

The CPU 4801 controls each circuit of the said information processor and executes instructions. The main memory 4802 stores programs and data. The display controller 4803 controls display data and display clocks. The display memory 4804 stores display data. The liquid crystal display device integrated with an input device 4805 may be any one explained in the said embodiments 1 to 13.

The system bus 4806 transmits data and clocks between blocks. The display memory bus 4807 transfers data and clocks between the display controller 4803 and the display memory 4804. The local bus 4808 transfers data and clocks between the display controller 4803 and the liquid crystal display device integrated with an input device.

The CPU 4801 reads programs stored in the main memory 4802 through the system bus 4806 and outputs the processing results through the system bus 4806 to the main memory 4802, the external memory, and other devices connected to the system bus 4806.

The display controller 4803 reads data from the display memory 4804 through the display memory bus 4807 and outputs it to the liquid crystal display device integrated with an input device 4805 through the local bus 4808. The liquid crystal display device integrated with an input device 4805 outputs determined X/Y coordinates to the CPU 4801 and the main memory 4802 through the system bus 4806. Next, various types of information processors that use the liquid crystal display device integrated with an input device of this invention will be explained using FIGS. 45(a) to 45(c).

Figure 45A:
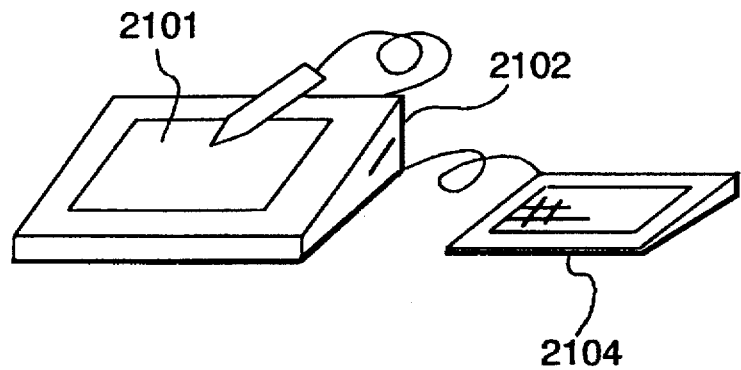
FIGS. 45(a) to 45(c) show external view of a lap-top, desk-top, and handy information processors incorporating a liquid crystal display device integrated with an input device of this invention, respectively.
Figure 45B:
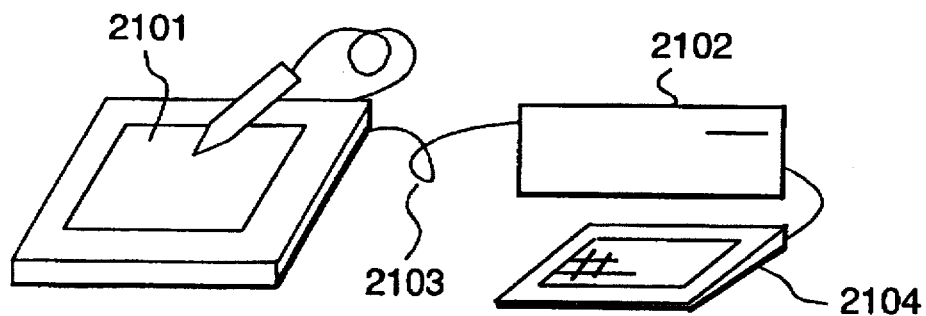
Figure 45C:
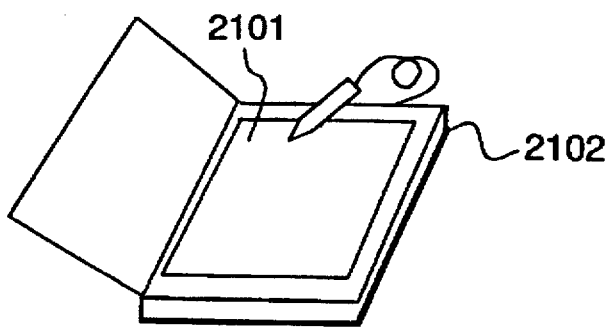

FIG. 45(a) to 45(c) show the external views of the information processors that use the liquid crystal display device integrated with an input device of this invention.

FIG. 45(a) shows an embodiment of the liquid crystal display device integrated with an input device of this invention used for a notebook type or lap-top type information processor. In this figure, the liquid crystal display device integrated with an input device 2101 is provided on the top of the information processor 2102. Both a pen and a keyboard 2104 can be used to enter data.

FIG. 45(b) shows an embodiment of the liquid crystal display device integrated with an input device used for a desk-top type information processor. The liquid crystal display device integrated with an input device 2101 is separated from the information processor body 2102 mechanically, although both are connected using the control signal bus 2103. Both a pen and a keyboard 2104 can be used to enter data.

FIG. 45(c) shows an embodiment of the liquid crystal display device integrated with an input device used for a handy type or a small information processor. The liquid crystal display device integrated with an input device 2101 is provided on the top of the information processor 2102. A pen is used to enter data. The liquid crystal display device integrated with an input device of this invention can be used for various types of information processors.

According to this invention, it is possible to provide a liquid crystal display device integrated with an input device that can determine coordinates speedily by dividing one frame period into the display/Y coordinate detection mode and the X coordinate detection mode to shorten the X coordinate detection mode period without making its circuit configuration complicate so much.

Furthermore, according to one embodiment of this invention, it is possible to provide a said liquid crystal display device integrated with an input device that is less affected by noise by using high frequency pulses as coordinate detection waveforms.

Furthermore, according to one embodiment of this invention, it is possible to provide a liquid crystal display device integrated with an input device that detects display coordinates using a technology to convert signals to AC ones and that is less affected by noise caused by AC driving by changing the control signal for AC driving with a frame period.

Furthermore, according to one embodiment of this invention, it is possible to eliminate a deviation between a pen-pointed coordinate and a determined coordinate caused by influence of electrodes adjacent to the pen-pointed electrode and to improve the accuracy of coordinate determination by providing an integrator in the coordinate detection circuit in the said liquid crystal display device integrated with an input device, which is a liquid crystal display device provided with tablet functions. In addition, since the said liquid crystal display device integrated with an input device is not affected by the diameter of the pen tip in coordinate determination, the manufacturing cost of the pen can be reduced and accurate coordinate determination can be expected.

Furthermore, the said liquid crystal display device integrated with an input device can be made free from influence of noise for accurate coordinate determination using a band pass filter that passes only the signals in the specified frequency band. Furthermore, if an amplifier, an X coordinate detection circuit, and a Y coordinate detection circuit are incorporated in the casing of the pen, the interface between the pen and the said liquid crystal display device integrated with an input device can be digitized so that the signals from the pen can be made free from influence of noise.

Furthermore, if an amplifier and an X/Y coordinate detection circuit are incorporated in the casing of the pen, the interface between the pen and the said liquid crystal display device integrated with an input device can be realized with only one digital signal, reducing the number of signals.

Furthermore, if the constants of the integrator and the band pass filter are changed, the operation frequency band can also be changed to allow the same circuit configuration to be used with liquid crystal panels with various types of resolution.

What is claimed is:

1. A display device integrated with an input device comprising:

a display panel having M×N picture elements arranged in a matrix of M rows×N columns, said M×N picture elements being scanned line-at-a-time with a period comprising a display period and a non-display period, a detector for detecting a voltage pulse applied on one of said M×N picture elements through electrostatic coupling by being pointed to said one of said M×N picture elements, a first circuit for applying a first voltage pulse of a type differing with a plurality of regions into which said matrix of M rows×N columns are divided column-wise, on electrodes associated with corresponding ones of said N columns in one of said plurality of regions during said non-display period, a second circuit for determining one of said plurality of regions in which said one of said M×N picture elements pointed to by said detector lies, by said type of said first voltage pulse detected by said detector, a third circuit for determining a relative Y coordinate in said determined region by counting clock pulses synchronized with sequential application of a second voltage pulse on electrodes associated with said M rows until said third circuit receives said second voltage pulse detected by said detector during said display period, a fourth circuit for determining a relative X coordinate in said determined region by counting clock pulses synchronized with sequential application of said first voltage pulse on electrodes associated with said N columns until said fourth circuit receives said first voltage pulse detected by said detector during said non-display period, and a fifth circuit for determining an absolute X-coordinate and an absolute Y-coordinate by said determined region, said relative X-coordinate and said relative Y-coordinate.

2. The display device integrated with an input device defined in claim 1, wherein said first voltage pulses to be applied during said non-display period are a plurality of pulses whose width differs with said plurality of regions.

3. The display device integrated with an input device defined in claim 1, wherein said first voltage pulses to be applied during said non-display period are a plurality of pulses whose polarity differs with said plurality of regions.

4. The display device integrated with an input device defined in claim 1, wherein said first voltage pulses to be applied during said non-display period are a plurality of pulses whose combination of one of different widths and one of different polarities differs with said plurality of regions.

5. A display device integrated with an input device to be driven with a control unit period comprising a display period and a non-display period, comprising a display panel comprising M×N picture elements for a display arranged as a matrix of M rows and N columns, M pieces of Y electrodes, each of said M piece of Y electrodes being connected to all of N pieces of said picture elements in one of said M rows for applying a voltage on said N pieces of picture elements, and N pieces of X electrodes, each of said N pieces of X electrodes being connected to all of M pieces of said picture elements in one of said N columns for applying a voltage on said M pieces of picture elements;

a Y electrode driver circuit for applying a scan voltage pulse on said Y electrodes sequentially during said display period;

means for supplying a train of data indicating voltage pulses corresponding to a pattern to be displayed in each one of said M rows sequentially during said display period; and an X electrode driver circuit for applying said voltage pulses indicated by said train of data on said N pieces of X electrodes;

said display device displaying an image by turning said picture elements on by being supplied with specified voltages on said X electrodes and Y electrodes associated with said picture elements by said X and Y electrode driver circuits, respectively; and said display device further including means for generating a display control signal for distinguishing between said display period and non-display periods;

means for applying a first voltage pulse for coordinate determination of one of types differing with L regions into which said matrix of M rows and N columns are divided column-wise, on electrodes associated with corresponding ones of said N columns in one of L regions sequentially-during said non-display period;

a detector for detecting said first voltage pulse for coordinate determination and said scan voltage pulse applied on one of said X electrodes and one of said Y electrodes, respectively, associated with one of said M×N picture elements at a location on a surface of said display panel pointed to by said detector, through electrostatic coupling;

means for determining a Y coordinate of said location according to said one of said Y electrodes on which said scan voltage pulse is applied when said detector detects said scan voltage pulse during said display period;

means for identifying said one of L regions by judging said type of said first voltage pulse;

means for determining a relative X coordinate of said location in one of said L regions according to said one of said X electrodes on which said first voltage pulse for coordinate determination is applied when said detector detects said first voltage pulse; and means for determining an absolute X coordinate according to said relative coordinate and said identified region.

6. The liquid crystal display device integrated with an input device defined in claim 5, wherein said types differ in voltage pulse width with said L regions.

7. The display device integrated with an input device defined in claim 5, wherein said types differ in polarity of said voltage pulse.

8. A display device integrated with an input device to be driven with a control unit period comprising a display period and a non-display period, comprising a pair of upper and lower display panels disposed in a plane comprising M×N picture elements for a display arranged as a matrix of M rows and N columns, M pieces of Y electrodes, each of said M pieces of Y electrodes being connected to all of N pieces of said picture elements in one of said M rows for applying a voltage on said N pieces of picture elements, and N pieces of X electrodes, each of said N pieces of X electrodes being connected to all of M pieces of said picture elements in one of said N columns for applying a voltage on said M pieces of picture elements;

a Y electrode driver circuit for applying a scan voltage pulse on corresponding ones of said Y electrodes of said pair of upper and lower display panels at a time sequentially during said display period;

means for supplying a train of data indicating voltage pulses corresponding to a pattern to be displayed in each one of said M rows sequentially during said display period; and X electrode driver circuits for applying said voltage pulses indicated by said train of data on said N pieces of X electrodes of said pair of display panels;

said display device displaying an image by turning said picture elements on by being supplied with specified voltages on said X electrodes and Y electrodes associated with said picture elements by said x and Y electrode driver circuits, respectively; and said display device further including means for generating a display control signal for distinguishing between said display period and non-display periods;

means for applying a first voltage pulse for coordinate determination of one of types differing with 2×L regions into which said matrix of M rows and N columns of said pair of upper and lower display panels are divided column-wise, on electrodes associated with corresponding ones of said N columns in one of 2×L regions sequentially during said non-display period;

a detector for detecting said first voltage pulse for coordinate determination and said scan voltage pulse applied on one of said X electrodes and one of said Y electrodes, respectively, associated with one of said M×N picture elements at a location on a surface of said display panel pointed to by said detector, through electrostatic coupling;

means for determining a relative Y coordinate of said location on said pair of upper and lower display panels according to said one of said Y electrodes on which said scan voltage pulse is applied when said detector detects said scan voltage pulse during said display period;

means for identifying said one of 2×L regions by judging said type of said first voltage pulse;

means for determining a relative X coordinate of said location in one of said 2×L regions according to said one of said X electrodes on which said first voltage pulse for coordinate determination is applied when said detector detects said first voltage pulse; and means for determining absolute X and Y coordinates according to said relative coordinates and said identified region.

9. The display device integrated with an input device defined in claim 8, wherein said types differ in voltage pulse width with said 2×L regions.

10. The display device integrated with an input device defined in claim 8, wherein said types differ in polarity of said voltage pulse.

11. The display device integrated with an input device defined in claim 7 or 10, wherein said polarity of said voltage pulses is inverted once per said control unit.

12. A display device integrated with an input device to be driven with a control unit period comprising a display period and a non-display period, comprising a display panel comprising M×N picture elements for a display arranged as a matrix of M rows and N columns, M pieces of Y electrodes, each of said M pieces of Y electrodes being connected to all of N pieces of said picture elements in one of said M rows for applying a voltage on said N pieces of picture elements, and N pieces of X electrodes, each of said N pieces of X electrodes being connected to all of M pieces of said picture elements in one of said N columns for applying a voltage on said M pieces of picture elements;

a Y electrode driver circuit for applying a scan voltage pulse on said Y electrodes sequentially during said display period;

means for supplying a train of data indicating voltage pulses corresponding to a pattern to be displayed in each one of said M rows sequentially during said display period; and an X electrode driver circuit for applying said voltage pulses indicated by said train of data on said N pieces of X electrodes;

said display device displaying an image by turning said picture elements on by being supplied with specified voltages on said X electrodes and Y electrodes associated with said picture elements by said X and Y electrode driver circuits, respectively; and said display device further including means for generating a display control signal for distinguishing between said display period and non-display periods;

means for applying a first voltage pulse for coordinate determination on electrodes associated with corresponding ones of said N columns sequentially during said non-display period;

a detector for detecting said first voltage pulse for coordinate determination and said scan voltage pulse applied on one of said X electrodes and one of said Y electrodes, respectively, associated with one of said M×N picture elements at a location on a surface of said display panel pointed to by said detector, through electrostatic coupling;

means for determining a Y coordinate of said location according to said one of said Y electrodes on which said scan voltage pulse is applied when said detector detects said scan voltage pulse during said display period;

means for generating an oscillating signal induced by said first voltage pulse for coordinate determination in a circuit comprising an electrostatic capacity of said electrostatic coupling and a coil connected to said detector;

a filter for passing a frequency band of said oscillating signal; and means for determining an X coordinate of said location according to said one of said X electrodes on which said first voltage pulse for coordinate determination is applied when said detector detects said voltage pulse by said oscillating signal passed through said filter.

13. The display device integrated with an input device defined in one of claims 5 to 10, further comprising means for generating an oscillating signal induced by said first voltage pulse for coordinate determination in a circuit comprising an electrostatic capacity of said electrostatic coupling and a coil connected to said detector; and a filter for passing a frequency band of said oscillating signal;

wherein said means for determining an X coordinate determines said X coordinate by said oscillating signal passed through said filter.

14. The display device integrated with an input device defined in claim 11, further comprising means for generating an oscillating signal induced by said first voltage pulse for coordinate determination in a circuit comprising an electrostatic capacity of said electrostatic coupling and a coil connected to said detector; and a filter for passing a frequency band of said oscillating signal;

wherein said means for determining an X coordinate determines said X coordinate by said oscillating signal passed through said filter.

15. A display device integrated with an input device to be driven with a control unit period comprising a display period and a non-display period, comprising a display panel comprising M×N picture elements for a display arranged as a matrix of M rows and N columns, M pieces of Y electrodes, each of said M pieces of Y electrodes being connected to all of N pieces of said picture elements in-one of said M rows for applying a voltage on said N pieces of picture elements, and N pieces of X electrodes, each of said N pieces of X electrodes being connected to all of M pieces of said picture elements in one of said N columns for applying a voltage on said M pieces of picture elements;

a Y electrode driver circuit for applying a scan voltage pulse on said Y electrodes sequentially during said display period;

means for supplying a train of data indicating voltage pulses corresponding to a pattern to be displayed in each one of said M rows sequentially during said display period; and an X electrode driver circuit for applying said voltage pulses indicated by said train of data on said N pieces of X electrodes;

said display device displaying an image by turning said picture elements on by being supplied with specified voltages on said X electrodes and Y electrodes associated with said picture elements by said X and Y electrode driver circuits, respectively; and said display device further including means for generating a display control signal for distinguishing between said display period and non-display periods;

means for applying a first voltage pulse for coordinate determination on electrodes associated with corresponding ones of said N columns sequentially during said non-display period;

a detector for detecting said first voltage pulse for coordinate determination and said scan voltage pulse applied on one of said X electrodes and one of said Y electrodes, respectively, associated with one of said M×N picture elements at a location on a surface of said display panel pointed to by said detector, through electrostatic coupling;

means for determining a Y coordinate of said location according to said one of said Y electrodes on which said scan voltage pulse is applied when said detector detects said scan voltage pulse during said display period;

means for determining an X coordinate of said location according to said one of said X electrodes on which said first voltage pulse for coordinate determination is applied when said detector detects said first voltage pulse;

means for detecting proximity of said detector to said display panel; and means for controlling polarity of voltages to be applied on said X and Y electrodes with a first period when said detector is not held close to said display panel, and with a second period longer than said first period when said detector is held close to said display panel.

16. The display device integrated with an input device defined in one of claims 1 to 10, further comprising means for detecting proximity of said detector to said display panel; and means for controlling polarity of voltages to be applied on said X and Y electrodes with a first period when said detector is not held close to said display panel, and with a second period longer than said first period when said detector is held close to said display panel.

17. The display device integrated with an input device defined in claim 11, further comprising means for detecting proximity of said detector to said display panel; and means for controlling polarity of voltages to be applied on said X and Y electrodes with a first period when said detector is not held close to said display panel, and with a second period longer than said first period when said detector is held close to said display panel.

18. A display device integrated with an input device to be driven with a control unit period comprising a display period and a non-display period, comprising a display panel comprising M×N picture elements for display arranged as a matrix of M rows and N columns, M pieces of Y electrodes, each of said M pieces of Y electrodes being connected to all of N pieces of said picture elements in one of said M rows for applying a voltage on said N pieces of picture elements, and N pieces of X electrodes, each of said N pieces of X electrodes being connected to all of M pieces of said picture elements in one of said N columns for applying a voltage on said M pieces of picture elements;

a Y electrode driver circuit for applying a scan voltage pulse on said Y electrodes sequentially during said display period;

means for supplying a train of data indicating voltage pulses corresponding to a pattern to be displayed in each one of said M rows sequentially during said display period; and an X electrode driver circuit for applying said voltage pulses indicated by said train of data on said N pieces of X electrodes;

said display device displaying an image by turning said picture elements on by being supplied with specified voltages on said X electrodes and Y electrodes associated with said picture elements by said X and Y electrode driver circuits, respectively; and said display device further including means for generating a display control signal for distinguishing between said display period and non-display periods;

means for applying a first voltage pulse for coordinate determination on electrodes associated with corresponding ones of said N columns sequentially during said non-display period;

a detector for detecting said first voltage pulse for coordinate determination and said scan voltage pulse applied on one of said X electrodes and one of said Y electrodes, respectively, associated with one of said M×N picture elements at a location on a surface of said display panel pointed to by said detector, through electrostatic coupling;

means for determining a Y coordinate of said location according to said one of said Y electrodes on which said scan voltage pulse is applied when said detector detects said scan voltage pulse during said display period;

means for determining an X coordinate of said location according to said one of said X electrodes on which said first voltage pulse for coordinate determination is applied when said detector detects said first voltage pulse;

means for detecting contact of said detector with said display panel; and means for controlling polarity of voltages to be applied on said X and Y electrodes with a first period when said detector is not in contact with said display panel, and with a second period longer than said first period when said detector is in contact with said display panel.

19. The display device integrated with an input device defined in one of claims 5 to 10, further comprising means for determining an X coordinate of said location in one of said L regions according to said one of said X electrodes on which said first voltage pulse for coordinate determination is applied when said detector detects said first voltage pulse;

means for determining an absolute X coordinate according to said relative coordinate and said identified region; and means for detecting contact of said detector with said display panel; and means for controlling polarity of voltages to be applied on said X and Y electrodes with a first period when said detector is not in contact with said display panel, and with a second period longer than said first period when said detector is in contact with said display panel.

20. The liquid crystal display device integrated with an input device, comprising a matrix panel forming picture element at each of intersection points of a plurality of scan electrodes and a plurality of data electrodes, scanning means for applying a select voltage or non-select voltage to a plurality of said scan electrodes, means for a applying a data voltage to a plurality of said data electrodes, coordinate detecting means for detecting voltage levels of said plurality of scan and data electrodes, wherein a coordinate of one of said plurality of scan electrodes is determined by detecting an output voltage from said scanning means and a coordinate of one of said plurality of data electrodes is determined by detecting an output other than said data voltage from said means for applying said data voltage, said liquid crystal display device integrated with an input device further comprising a flat display panel comprising M×N display elements arranged as a matrix of M rows and N columns, M pieces of Y electrodes being connected to said display elements in each row and N pieces of X electrodes being connected to said display elements in each column, a Y electrode driver circuit that applies voltage pulses to said Y electrodes sequentially during a display period, an X electrode driver circuit that applies voltage pulses to said N pieces of X electrodes according to a voltage pulse application pattern specified for a data string, a detector that detects voltage pulses applied to said Y and X electrodes corresponding to a position pointed to by said detector on a surface of said flat display panel through electrostatic coupling, and means for amplifying signals from said detector;

said liquid crystal display device displaying images by turning on each of said picture elements when specified voltages are applied to both said Y and X electrodes connected therewith, and said liquid crystal display device integrated with an input device is further provided with means for generating a signal specifying polarity of a voltage to be applied between said plurality of scan electrodes and said plurality of data electrodes, means for generating a signal specifying both said display period and an X coordinate detection period, Y coordinate detection means for digitizing a first signal output from said detector during a display period associated with one of said Y electrodes to which voltage pulses are applied when said detector detects said first signal, X coordinate detection means for digitizing a second signal output from said detector during said non-display period associated with one of said X electrodes to which voltage pulses are applied when said detector detects said second signal, and coordinate determination means for determining an X coordinate according to said second signal and determining a Y coordinate according to said first signal, and an integrator in said X and Y coordinate detection means respectively.

21. The liquid crystal display device integrated with an input device, comprising a matrix panel forming a picture element at each of intersection points of a plurality of scan electrodes and a plurality of data electrodes, scanning means for applying a select voltage or non-select voltage to a plurality of said scan electrodes, means for applying a data voltage to a plurality of said data electrodes, coordinate detecting means for detecting voltage levels of said plurality of scan and data electrodes, wherein a coordinate of one of said plurality of scan electrodes is determined by detecting an output voltage from said scanning means and a coordinate of one of said plurality of data electrodes is determined by detecting an output other than said data voltage from said means for applying said data voltage, said liquid crystal display device integrated with an input device further comprising a flat display panel provided with M×N display elements arranged as a matrix of M rows×N columns;

M pieces of Y electrodes being connected to said display elements in each row and N pieces of X electrodes being connected to said display elements in each column, a Y electrode driving circuit that applies voltage pulses to said Y electrodes sequentially during a display period, an X electrode driving circuit that applies voltage pulses to said N pieces of X electrodes according to a voltage pulse application pattern specified for a data string, a detector that detects voltage pulses applied to said Y and X electrodes corresponding to a position pointed to by said detector on a surface of said flat display panel through electrostatic coupling, means for amplifying said signals from said detector with a first amplification, and means for amplifying said signals from said detector with a second amplification, and said liquid crystal display device displaying images when specified voltages are applied to both said Y and X electrodes, and said liquid crystal display device integrated with an input device further including, means for generating a signal specifying polarity of a voltage to be applied between said plurality of scan electrodes and said plurality of data electrodes, means for generating a signal specifying said display period and an X coordinate detection period, X and Y coordinate detecting means for digitizing a first output signal amplified with said means for amplifying with said first amplification after it is output from said detector associated with said Y electrode to which voltage pulses are applied during said display period when said detector detects said first signal and for digitizing a second output signal amplified with said means for amplifying with said second amplification after it is output from said detector associated with said X electrode to which voltage pulses are applied during a non-display period when said detector detects said second output signal, coordinate determination means for determining X and Y coordinates according to said first and second output signals from said X and Y coordinate detecting means and said signal specifying said display period and said X coordinate detection period, and an integrator in the said X and Y coordinate detecting means.

22. The liquid crystal display device integrated with an input device defined in claim 20, including a filter that passes only signals in a specified frequency band in both said X coordinate detecting means and said Y coordinate detecting means respectively.

23. The liquid crystal display device integrated with an input device defined in claim 20, including means for inverting said output signal from said detector and means for selecting a signal inverted in said inverting means or said signal from said detector using a control signal for AC driving in said X coordinate detecting means and said Y coordinate detecting means respectively.

24. The liquid crystal display device integrated with an input device defined in claim 20, including means for amplifying detected signals, said X coordinate detecting means, and said Y coordinate detecting means inside said detector.

25. The liquid crystal display device integrated with an input device defined in claim 20, wherein means for amplifying said detected signals, said X coordinate detecting means, and said Y coordinate detecting means are packaged into one LSI.

26. The liquid crystal display device integrated with an input device defined in claim 20, wherein means for amplifying said detected signals, said X coordinate detecting means, said Y coordinate detecting means, said coordinate determination means, and means for supplying said data string are packaged into one LSI.

27. The liquid crystal display device integrated with an input device defined in claim 20, wherein said coordinate determination means and said means for supplying said data string are packaged into one LSI.

28. The liquid crystal display device integrated with an input device defined in claim 21, including a filter that passes only signals in a specified frequency band in said X and Y coordinate detecting means.

29. The liquid crystal display device integrated with an input device defined in claim 21, including means for inverting said output signal from said detector, and means for selecting said signal inverted in said inverting means or said signal from said detector using a control signal for AC driving in said X and Y coordinate detecting means.

30. The liquid crystal display device integrated with an input device defined in claim 21, wherein said detector is provided therein with means for amplifying said detected signals with said first amplification, means for amplifying said detected signals with said second amplification, and said X and Y coordinate detecting means.

31. The liquid crystal display device integrated with an input device defined in claim 21, wherein said means for amplifying said detected signals with said first amplification, means for amplifying said detected signals with said second amplification, and said X and Y coordinate detecting means are packaged in one LSI.

32. The liquid crystal display device integrated with an input device defined in claim 21, wherein said means for amplifying said detected signals with said first amplification, said means for amplifying said detected signals with said second amplification, said X and Y coordinate detecting means, and said coordinate determination means are packaged into one LSI.

33. The liquid crystal display device integrated with an input device defined in claim 21, wherein said means for amplifying said detected signals with said first amplification, said means for amplifying said detected signals with said second amplification, said X and Y coordinate detecting means, said coordinate determination means, and said means for supplying said data string are packaged into one LSI.

34. The liquid crystal display device integrated with an input device defined in claim 21, wherein said coordinate determination means, and said means for supplying said data string are packaged into one LSI.

35. An information processor, comprising a CPU that processes M-bit (N≦M) data according to received N bit instruction codes and processes address data represented by L bits synchronously with clocks, means for generating clocks with which said CPU operates, a memory that can write and read data and instruction codes in and from positions specified with L-bit address signals, an external memory that can write and read data and instruction codes with one of an electric, magnetic, and optical means, a display memory that can write and read display data in and from positions specified with L-bit address signals, a system bus that outputs I/O data and address data from said CPU, a local bus that connects each of said means locally independently of said system bus, a display control means that outputs data from said display memory to a display device sequentially and outputs display data to said display memory, means for displaying data corresponding to said data output by said display control means sequentially, means for specifying coordinate positions on said display means, and coordinate detecting means that detects specified positions and output coordinates corresponding to said specified positions, wherein said display device defined in one of claims 8, 12, 15 and 18 is used as a display means and coordinate determination means.

* * * * *